US011974084B1

(12) United States Patent
Xu et al.

(10) Patent No.: US 11,974,084 B1
(45) Date of Patent: Apr. 30, 2024

(54) EARPHONES

(71) Applicant: SHENZHEN SHOKZ CO., LTD., Guangdong (CN)

(72) Inventors: Jiang Xu, Shenzhen (CN); Zeying Zheng, Shenzhen (CN); Haofeng Zhang, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 0 days.

(21) Appl. No.: 18/510,603

(22) Filed: Nov. 15, 2023

Related U.S. Application Data

(63) Continuation of application No. PCT/CN2023/083538, filed on Mar. 24, 2023.

(30) Foreign Application Priority Data

Oct. 28, 2022 (CN) ......................... 202211336918.4
Dec. 1, 2022 (CN) ......................... 202223239628.6
(Continued)

(51) Int. Cl.
*H04R 25/00* (2006.01)
*H04R 1/10* (2006.01)

(52) U.S. Cl.
CPC ........... *H04R 1/1016* (2013.01); *H04R 1/105* (2013.01); *H04R 1/1091* (2013.01)

(58) Field of Classification Search
CPC ...... H04R 2460/13; H04R 9/06; H04R 11/02; H04R 2400/03; H04R 1/1075
See application file for complete search history.

(56) References Cited

U.S. PATENT DOCUMENTS 7,050,598 B1 5/2006 Ham
2007/0009133 A1 1/2007 Gerkinsmeyer
(Continued)

FOREIGN PATENT DOCUMENTS

CN 203968330 U 11/2014
CN 210053540 U 2/2020
(Continued)

OTHER PUBLICATIONS

International Search Report in PCT/CN2023/083538 dated Jul. 11, 2023, 7 pages.

(Continued)

*Primary Examiner* — Amir H Etesam
(74) *Attorney, Agent, or Firm* — METIS IP LLC

(57) ABSTRACT

An earphone which includes a sound production component and an ear hook may be provided. The sound production component includes a transducer and a housing accommodating the transducer. A first portion of the ear hook is hung between an auricle and the head of a user, and a second portion extends toward a side of the auricle away from the head and is connected to the sound production component. In a non-wearing state, the ear hook and the sound production component form a first projection on a first plane; in a wearing state, the ear hook and the sound production component form a second projection on a sagittal plane of a human body. Each of the first projection and the second projection includes an outer contour, a first end contour, an inner contour, and a second end contour.

20 Claims, 19 Drawing Sheets

(30) Foreign Application Priority Data

| | | |
|---|---|---|
| Dec. 30, 2022 | (WO) ................ | PCT/CN2022/144339 |
| Mar. 2, 2023 | (WO) ................ | PCT/CN2023/079400 |
| Mar. 2, 2023 | (WO) ................ | PCT/CN2023/079401 |

(56) References Cited

U.S. PATENT DOCUMENTS

2016/0134957 A1* 5/2016 Jentz ...................... H04R 1/105
381/380
2020/0196062 A1 6/2020 Zhang

FOREIGN PATENT DOCUMENTS

| | | | |
|---|---|---|---|
| CN | 210868097 | U | 6/2020 |
| CN | 212909891 | U | 4/2021 |
| CN | 113301463 | A | 8/2021 |
| CN | 113573215 | A | 10/2021 |
| CN | 214429681 | U | 10/2021 |
| CN | 215682610 | U | 1/2022 |
| CN | 114286228 | A | 4/2022 |
| CN | 114286234 | A | 4/2022 |
| CN | 114286240 | A | 4/2022 |
| CN | 217011123 | U | 7/2022 |
| CN | 115175069 | A | 10/2022 |
| CN | 115460496 | A | 12/2022 |
| CN | 115550783 | A | 12/2022 |
| CN | 218352706 | U | 1/2023 |
| JP | 2010193344 | A | 9/2010 |
| JP | 2015073204 | A | 4/2015 |

OTHER PUBLICATIONS

Written Opinion in PCT/CN2023/083538 dated Jul. 11, 2023, 7 pages.

* cited by examiner

EARPHONES

CROSS-REFERENCE TO RELATED APPLICATIONS

This application is a Continuation of International Patent Application No. PCT/CN2023/083538, filed on Mar. 24, 2023, which claims priority from International Application No. PCT/CN2023/079400, filed on Mar. 2, 2023, International Application No. PCT/CN2023/079401, filed on Mar. 2, 2023, Chinese Application No. 202211336918.4 filed on Oct. 28, 2022, Chinese Application No. 202223239628.6 filed on Dec. 1, 2022, and International Application No. PCT/CN2022/144339 filed on Dec. 30, 2022, the entire contents of each of which are hereby incorporated by reference.

TECHNICAL FIELD

The present disclosure relates to the field of acoustic technology, specifically relates to earphones.

BACKGROUND

With the development of acoustic output technology, an acoustic device (e.g., an earphone) has been widely used in people's daily lives. The acoustic device may be used in conjunction with an electronic device such as a mobile phone, a computer, etc., to provide a user with an auditory feast. According to a mode of wearing, the acoustic device is usually categorized as a head-mounted acoustic device, an ear-hook acoustic device, or an in-ear acoustic device. The output performance and the wearing experience of the acoustic device have a significant impact on user comfort.

Therefore, it is necessary to provide an earphone to enhance the output performance of the acoustic device and improve the wearing comfort and stability.

SUMMARY

Embodiments of the present disclosure provide an earphone which includes a sound production component and an ear hook. The sound production component includes a transducer and a housing accommodating the transducer. A first portion of the ear hook is hung between an auricle and the head of a user, and a second portion of the ear hook extends toward a side of the auricle away from the head and is connected to the sound production component, the sound production component is worn near an ear canal without blocking an opening of the ear canal. In a non-wearing state, the ear hook and the sound production component form a first projection on a first plane; in a wearing state, the ear hook and the sound production component form a second projection on a sagittal plane of a human body. Each of the first projection and the second projection includes an outer contour, a first end contour, an inner contour, and a second end contour. The outer contour, the first end contour, the second end contour, and a tangent segment connecting the first end contour and the second end contour of the first projection jointly define a first closed curve; and the outer contour, the first end contour, the second end contour, and a tangent segment connecting the first end contour and the second end contour of the second projection jointly define a second closed curve. The first closed curve has a first area, and the second closed curve has a second area, the first area being smaller than the second area. In the wearing state, the housing and the first portion of the ear hook clamp the auricle of the user and provide a clamping force of 0.03 N to 1 N to the auricle of the user.

Embodiments of the present disclosure further provide an earphone which includes a sound production component and an ear hook. The sound production component includes a transducer and a housing accommodating the transducer. A first portion of the ear hook is hung between an auricle and the head of a user, and a second portion of the ear hook extends toward a side of the auricle away from the head and is connected to the sound production component, the sound production component is worn near an ear canal without blocking an opening of the ear canal. In a non-wearing state, the ear hook and the sound production component form a fifth projection on a first plane; in a wearing state, the ear hook and the sound production component form a sixth projection on a sagittal plane of a human body. Each of the fifth projection and the sixth projection includes an outer contour, a first end contour, an inner contour, and a second end contour. The outer contour, the first end contour, the second end contour, and a tangent segment connecting the first end contour and the second end contour of the fifth projection jointly define a first closed curve; and the outer contour, the first end contour, the second end contour, and a tangent segment connecting the first end contour and the second end contour of the sixth projection jointly define a second closed curve. The fifth closed curve has a fifth area, and the sixth closed curve has a sixth area, the fifth area being smaller than the sixth area. In the wearing state, the housing and the first portion of the ear hook clamp the auricle of the user and provide a clamping force of 0.03 N to 3 N to the auricle of the user.

BRIEF DESCRIPTION OF THE DRAWINGS

The present disclosure will be further illustrated by way of exemplary embodiments, which will be described in detail through the accompanying drawings. These embodiments are not limiting, and in these embodiments the same numbering indicates the same structure, wherein.

DETAILED DESCRIPTION

Figure 1:
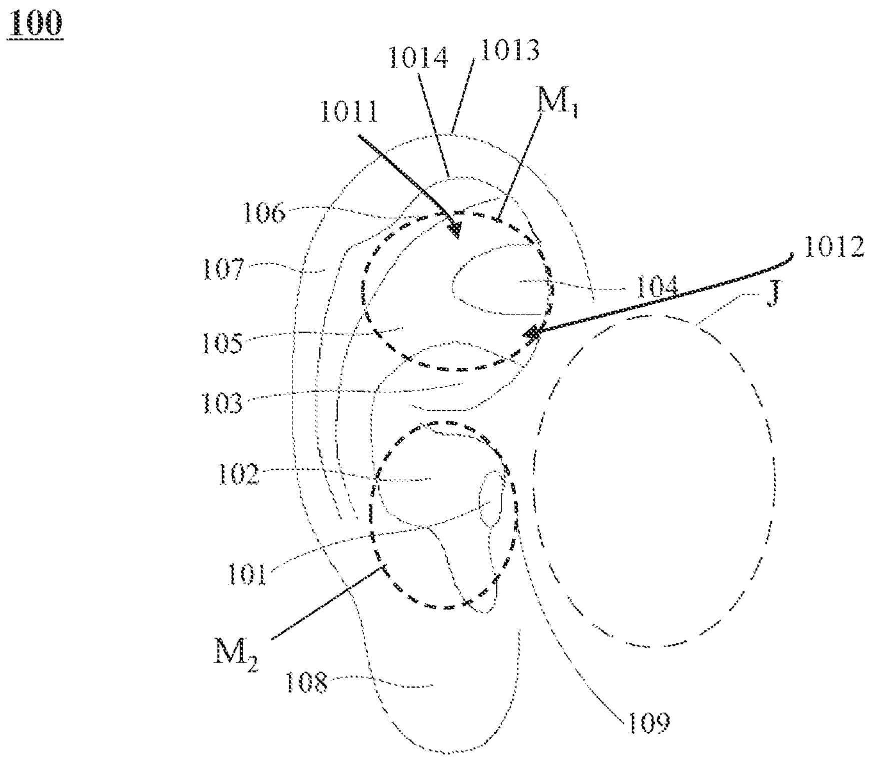
FIG. 1 is a schematic diagram illustrating an exemplary ear according to some embodiments of the present disclosure.

To better illustrate the technical aspects of the embodiments of the present application, a brief introduction to the drawings required for the description of the embodiments will be provided below. It is evident that the drawings described below are merely examples or embodiments of the present application. Those skilled in the art may apply the present disclosure to other similar scenarios without exercising inventive effort based on these drawings, unless it is explicitly stated or apparent from the context. Unless otherwise specified, the same reference numerals in the drawings represent the same structures or operations.

It should be understood that the terms “system,” “device,” “unit,” and/or “module” used in the present disclosure are employed as a way to distinguish different components, elements, parts, or assemblies at various levels. However, if other words may serve the same purpose, they may be substituted with alternative expressions.

As shown in the present disclosure and the claims, unless the context explicitly indicates otherwise, words such as “one,” “a,” “an,” “a kind of,” and/or “the” do not necessarily denote singular entities and may also encompass plural forms. Generally, the terms “comprising” and “including” indicate the inclusion of specifically identified steps and elements, which do not constitute an exclusive list, and methods or devices may also include additional steps or elements.

Flowcharts are used in the present disclosure to illustrate operations performed by systems according to embodiments of the present disclosure. It should be understood that the operations may not necessarily be executed in a strictly sequential order, but instead, they may be performed in reverse order or concurrently. Additionally, other operations may be added to these processes or certain steps may be removed from these processes.

FIG. 1 is a schematic diagram illustrating an exemplary ear according to some embodiments of the present disclosure.

Referring to FIG. 1, an ear 100 may include an external ear canal 101, a cavum conchae 102, a cymba conchae 103, a triangular fossa 104, an antihelix 105, a scapha 106, a helix 107, an earlobe 108, a crus of helix 109, an outer contour 1013, and an inner contour 1014. It should be noted that, for the convenience of descriptions, in some embodiments of the present disclosure, a superior crus of antihelix 1011, an inferior crus of antihelix 1012, and the antihelix 105 are collectively referred to as an antihelix region. In some embodiments, one or more parts of the ear 100 may be used to support an acoustic device for stable wearing. In some embodiments, the external ear canal 101, the cavum conchae 102, the cymba conchae 103, the triangular fossa 104, etc., have a certain depth and volume in three-dimensional space, which may be used to meet wearing requirements of the acoustic device. For example, the acoustic device (e.g., an in-ear earphone) may be worn in the external ear canal 101. In some embodiments, the acoustic device may be worn with an aid of parts of the ear 100 other than the external ear canal 101. For example, the acoustic device may be worn with the aid of the cymba conchae 103, the triangular fossa 104, the antihelix 105, the scapha 106, the helix 107, or the like, or combinations thereof. In some embodiments, to improve the wearing comfort and reliability of the acoustic device, parts such as the earlobe 108 of a user may also be used. By using parts other than the external ear canal 101 in the ear 100 to wear the acoustic device and transmit sound, the external ear canal 101 of the user is “freed”. The acoustic device (the earphone) does not block the external ear canal 101 when worn by the user, the user may receive a sound from the acoustic device and an ambient sound (e.g., a car horn sound, a doorbell sound, an ambient human voice, a traffic directing sound, etc.), thereby reducing the probability of traffic accidents. In some embodiments, according to a structure of the ear 100, the acoustic device may be designed with a structure that matches the ear 100 to achieve wearing of the acoustic device at different positions in the ear 100. For example, when the acoustic device is an earphone, the earphone may include a suspension structure (e.g., an ear hook) and a sound production component. The sound production component is physically connected to the suspension structure and the suspension structure may be matched to a shape of an auricle, so that an entire or partial structure of the sound production component of the ear may be placed on a front side of the crus of helix 109 (e.g., a region J enclosed by dashed lines in FIG. 1). As another example, when the user wears the earphone, the entire or partial structure of the sound production component may contact an upper part of the external ear canal 101 (e.g., locations where one or more of the crus of helix 109, the cymba conchae 103, the triangular fossa 104, the antihelix 105, the scapha 106, or the helix 107, etc., are located). As yet another example, when the user wears the earphone, the entire or partial structure of the sound production component may be located in a cavity (e.g., regions enclosed by dashed lines in FIG. 1, including at least a region M1 containing the cymba conchae 103 and the triangular fossa 104 and a region M2 containing at least the cavum conchae 102) formed by one or more parts (e.g., the cavum conchae 102, the cymba conchae 103, the triangular fossa 104, etc.) of the ear 100.

Different users may have individual differences, resulting in differences in shapes, sizes, and other dimensions of the ears. For convenience of description and understanding, unless otherwise specified, the embodiments of the present disclosure primarily describe wearing modes of acoustic devices on an ear model with a "standard" shape and size as an example. For example, a simulator (e.g., GRAS KEMAR) with a head and (left and right) ears obtained based on standards such as ANSI: S3.36, S3.25, and IEC: 60318-7 may be used as an example for wearing the acoustic devices, so as to present scenarios where a majority of users wear the acoustic devices normally. Merely by way of example, an exemplary ear may have the following relevant features. An area of a projection of the auricle on a sagittal plane of a human body falls within a range of 1300 $mm^2$ to 1700 $mm^2$. Therefore, in the present disclosure, descriptions such as "worn by the user" and "in a wearing state" may refer to that the acoustic device described in the present disclosure is worn on the ears of the aforementioned simulator. Of course, considering individual differences among different users, a structure, a shape, a size, a thickness, etc., of one or more parts of the ear 100 may be differentially designed based on ears of different shapes and sizes. These differential designs may manifest as feature parameters of one or more parts of the acoustic device (e.g., the sound production component and the ear hook mentioned later) having numerical values within different ranges to accommodate different ears.

It should be noted that in the fields of medicine, anatomy, etc., three basic sections of a human body, including a sagittal plane, a coronal plane, and a horizontal plane, as well as three basic axes, including a sagittal axis, a coronal axis, and a vertical axis, may be defined. The sagittal plane refers to a plane perpendicular to ground along an anterior-posterior direction of the human body, which divides the human body into left and right parts. The coronal plane refers to a plane perpendicular to ground along a left-right direction of the human body, which divides the human body into front and rear parts. The horizontal plane refers to a plane parallel to the ground along a direction perpendicular to an up-down direction of the human body, which divides the human body into upper and lower parts. Correspondingly, the sagittal axis refers to an axis along the anterior-posterior direction of the human body and perpendicular to the coronal plane. The coronal axis refers to an axis along the left-right direction of the human body and perpendicular to the sagittal plane. The vertical axis refers to an axis along the up-down direction of the human body and perpendicular to the horizontal plane. Furthermore, in the context of the present disclosure, "a front side of the ear" is a concept relative to "a rear side of the ear". The front side of the ear refers to a side along a direction of the sagittal axis and located in a region of the ear facing a facial region of the human body, while the rear side of the ear refers to a side along the direction of the sagittal axis and located on a side of the ear away from the facial region of the human body. When observing the ear of the aforementioned simulator in a direction of the coronal axis of the human body, a diagram of a contour of the front side of the ear as shown in FIG. 1 may be obtained.

The description of the ear 100 above is provided for illustrative purposes and is not intended to limit the scope of the present disclosure. Those skilled in the art may make various changes and modifications based on the description of the present disclosure. For example, certain structures of the acoustic device may shield a portion or all of the external ear canal 101. These changes and modifications are still within the scope of protection of the present disclosure.

Figure 2:
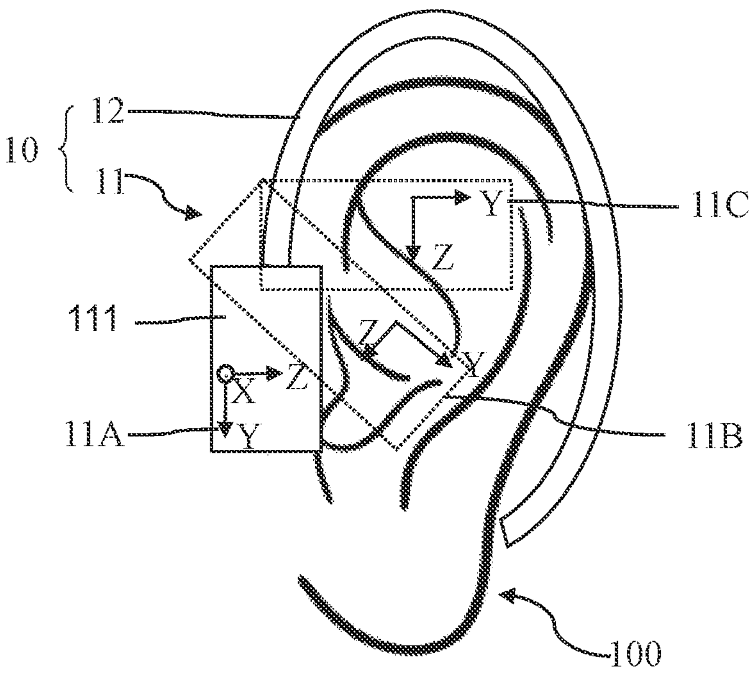
FIG. 2 is a schematic diagram illustrating an exemplary wearing of an earphone according to some embodiments of the present disclosure.

FIG. 2 is a schematic diagram illustrating an exemplary wearing state of an earphone according to some embodiments of the present disclosure. As shown in FIG. 2, an earphone 10 may include a sound production component 11 and a suspension structure 12. In some embodiments, the earphone 10 may enable the sound production component 11 to be worn on the body (e.g., the head, the neck, or the upper torso of the body) of a user through the suspension structure 12. In some embodiments, the suspension structure 12 may be an ear hook, with one end of connected to the sound production component 11, and configured in a shaped that matches an ear of the user. For example, the ear hook may be an arc-shaped structure. In some embodiments, the suspension structure 12 may also be a clamping structure that is adapted to an auricle of the user, allowing the suspension structure 12 to be clamped onto the auricle of the user. In some embodiments, the suspension structure 12 may include, but is not limited to, the ear hook, an elastic band, etc., enabling the earphone 10 to be better secured on the body of the user, preventing the earphone 10 from falling off during use.

In some embodiments, the sound production component 11 may be worn on the body of the user and may include a speaker to produce sound directed into the ear 100 of the user. In some embodiments, the earphone 10 may be combined with a product such as glasses, a head-worn earphone, a head-worn display device, an AR/VR helmet, etc. In this case, the sound production component 11 may be fixed near the ear 100 of the user using a suspension or a clamping manner. In some embodiments, the sound production component 11 may be circular, elliptical, polygonal (regular or irregular), U-shaped, V-shaped, semi-circular, etc., so that the sound production component 11 may be directly hung on the ear 100 of the user.

Combining FIGS. 1 and 2, in some embodiments, when the user wears the earphone 10, at least a portion of the sound production component 11 may be located above, below, in front (e.g., in a region J in front of the tragus as shown in FIG. 1) or within (e.g., the region M1 or the region M2 as shown in FIG. 1) the auricle. The following descriptions will provide illustrative explanations in the context of different wearing positions (11A, 11B, and 11C) of the sound production component 11. In some embodiments, the sound production component 11A is located on the side of the ear 100 of the user in the sagittal axis direction towards the facial region of the human body, i.e., the sound production component 11A is located on the ear 100 facing the facial region of the human body (e.g., in the region J as shown in FIG. 1). Further, a housing of the sound production component 11A is internally provided with the speaker, and the housing of the sound production component 11A may be provided with at least one sound outlet (not shown in FIG. 2). The at least one sound outlet may be located on a side wall of the housing, facing or near an external ear canal of the user. The speaker may output sound to the external ear canal of the user through the at least one sound outlet. In some embodiments, the speaker may include a diaphragm, and an interior chamber of the housing may be partitioned by the diaphragm into a front chamber and a rear chamber. The at least one sound outlet is acoustically coupled to the front chamber. Vibration of the diaphragm drives air in the front chamber to vibrate to generate air-conducted sound. The air-conducted sound generated in the front chamber propagates to an external environment through the at least one sound outlet. In some embodiments, the housing may also include one or more pressure relief holes, which may be located on a side wall of the housing adjacent to or opposite the side wall where the at least one sound outlet is located. The one or more pressure relief holes are acoustically coupled to the rear chamber. The vibration of the diaphragm also drives the air in the rear chamber to vibrate to generate air-conducted sound. The air-conducted sound generated in the rear chamber may be propagated to the external environment through the one or more pressure relief holes. Exemplarily, in some embodiments, the speaker inside the sound production component 11A may output sounds with a phase difference (e.g., opposite phases) through the at least one sound outlet and the one or more pressure relief holes. The at least one sound outlet may be located on a side wall of the housing of the sound production component 11 facing the external ear canal 101 of the user, and the one or more pressure relief holes may be located on a side of the housing of the sound production component 11 away from the external ear canal 101 of the user. In this case, the housing may act as a baffle, which increases a sound path difference between a sound path from the at least one sound outlet to the external ear canal 101 and a sound path from the one or more pressure relief holes to the external ear canal 101, thereby increasing a sound intensity at the external ear canal 101 and reducing a volume of far-field leakage sound. In some embodiments, the sound production component 11 may have a long axis direction Y and a short axis direction Z that are orthogonal to each other and perpendicular to a thickness direction X. The long axis direction Y may be defined as a direction having a maximum extension dimension in a shape of a two-dimensional projection plane of the sound production component 11 (e.g., a projection of the sound production component 11 on a plane on which an outer side of the sound production component 11 is located, or a projection of the sound production component 11 on the sagittal plane). For example, when a projection shape is a rectangle or a proximate rectangle, the long axis direction is a direction of a length of the rectangle or the proximate rectangle. The short axis direction Z may be defined as a direction that is perpendicular to the long axis direction Y in the shape of the projection of the sound production component 11 on the sagittal plane. For example, when the projection shape is rectangular or approximately rectangular, the short-axis direction is a direction of a width of the rectangle or approximate rectangle. The thickness direction X may be defined as a direction perpendicular to the two-dimensional projection plane, for example, consistent with a direction of the coronal axis, which points to the left-right direction of the human body. In some embodiments, as shown in FIG. 2, when the sound production component 11 is in an inclined state in the wearing state, the long axis direction Y and the short axis direction Z are still parallel or approximately parallel to the sagittal plane. The long axis direction Y may have a certain included angle with the sagittal axis, i.e., the long axis direction Y is inclined accordingly, and the short axis direction Z may have a certain included angle with the vertical axis, i.e., the short axis direction Z is inclined accordingly. In some embodiments, an entire or partial structure of the housing of the sound production component 11B may extend into the cavum conchae, in other words, the projection of the housing of the sound production component 11B on the sagittal plane has an overlapped portion with the projection of the cavum conchae on the sagittal plane. Specific details about the sound production component 11B may be referred to other parts of the present disclosure, such as FIG. 3A and its corresponding description. In some embodiments, as shown by the sound production component 11C in FIG. 2, in the wearing position, the sound production component 11 may also be in a horizontal state or an approximate horizontal state. The long axis direction Y may be consistent with or approximately consistent with the sagittal axis, pointing to the anterior-posterior direction of the human body, and the short axis direction Z may be consistent with or approximately consistent with the vertical axis, pointing to the up-down direction of the human body. It should be noted that in the wearing state, the sound production component 11C being in an approximate horizontal state may mean that the included angle between the long axis direction Y of the sound production component 11C and the sagittal axis falls within a specific range (e.g., not greater than 20°). Furthermore, the wearing position of the sound production component 11 is not limited to the sound production component 11A, the sound production component 11B, and the sound production component 11C as shown in FIG. 2; the sound production component 11 may be located in any position as long as it is in the regions J, M1, or M2 as shown in FIG. 1. For example, the entire or partial structure of the sound production component 11 may be located at a front side (e.g., the region J enclosed by the dashed line in FIG. 1) of the crus of helix 109. As another example, the entire or partial structure of sound production component 11 may be in contact with an upper part (e.g., locations of one or more parts of the crus of helix 109, the cymba conchae 103, the tragus 104, the antihelix 105, the scapha 106, or the helix 107, etc.) of the external ear canal 101. As yet another example, the entire or partial structure of the sound production component of the acoustic device may be located within cavities (e.g., the region M1 containing at least the cymba conchae 103 and the triangular fossa 104 enclosed by the dashed lines, and the region M2 containing at least the cavum conchae 102 as shown in FIG. 1) formed by one or more parts (e.g., the cavum conchae 102, the cymba conchae 103, the triangular fossa 104, etc.) of the ear 100.

In order to improve the stability of the earphone 10 in the wearing state, the earphone 10 may adopt any one or a combination of the following configurations. First, at least a portion of the suspension structure 12 may be configured as a profiling structure that fits at least one of the rear side of the ear or the head, to increase a contact area between the suspension structure 12 and the ear and/or the head, thereby increasing the resistance of the earphone 10 to prevent falling off from the ear. Second, at least a portion of the suspension structure 12 may be configured as an elastic structure, so that the suspension structure 12 may have a certain amount of deformation in the wearing state, to increase a positive pressure of the suspension structure 12 on the ear and/or the head, thereby increasing the resistance of the earphone 10 to prevent falling off from the ear. Third, at least part of the suspension structure 12 may be configured to abut against the ear and/or the head in the wearing state, to form a counteracting force that presses against the ear and make the sound production component 11 press against an ear region at a side away from the head in the coronal axis direction, thereby increasing the resistance of the earphone 10 to prevent falling off from the ear. Fourth, the sound production component 11 and the suspension structure 12 may be configured to clamp the antihelix region, the cavum conchae region, etc., from the front side and the rear side of the auricle in the wearing state, thereby increasing the resistance of the earphone 10 to prevent falling off from the ear. Fifth, the sound production component 11 or a structure connected thereto may be configured to at least partially extend into cavities such as the cavum conchae 102, the cymba conchae 103, the triangular fossa 104, and the scapha 106, thereby increasing the resistance of the earphone 10 to prevent falling off from the ear.

Figure 3:
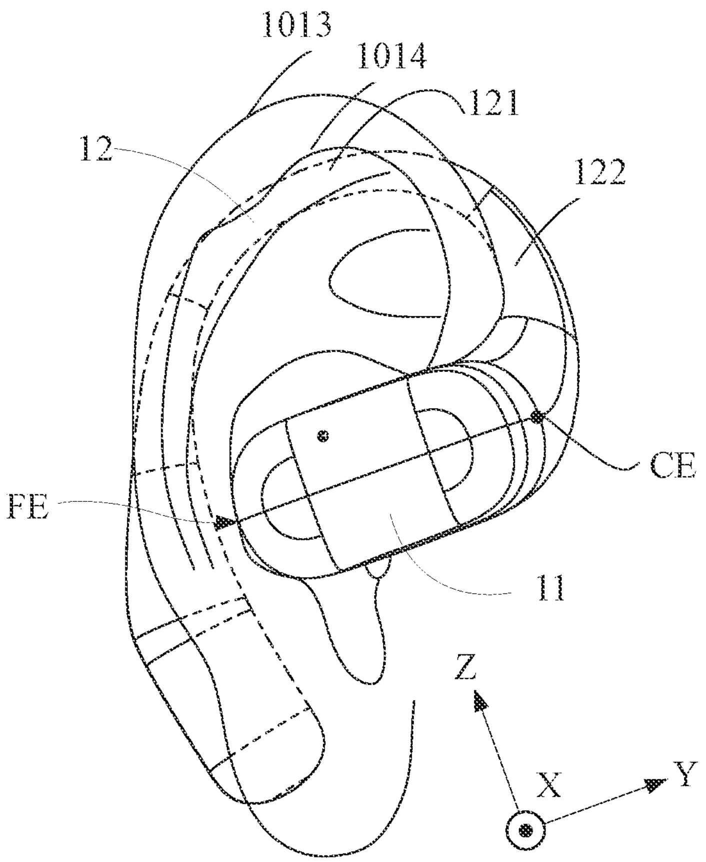
FIG. 3 is a schematic diagram illustrating an exemplary wearing state of the earphone according to some other embodiments of the present disclosure.

Exemplarily, in conjunction with FIG. 3, in the wearing state, an end FE (also referred to as the free end) of the sound production component 11 may extend into the cavum conchae. Optionally, the sound production component 11 and the suspension structure 12 may be configured to jointly clamp an ear region corresponding to the cavum conchae from front and rear sides of the aforementioned ear region, increasing the resistance of the earphone 10 to falling off the ear, and thereby improving the stability of the earphone 10 in the wearing state. For example, the free end FE of the sound production component 11 presses against the cavum conchae in the thickness direction X. As another example, the end FE abuts against the cavum conchae in the long axis direction Y and/or the short axis direction Z (e.g., abutting against an inner wall of the cavum conchae opposite to the end FE). It should be noted that the end FE of the sound production component 11 refers to an end of the sound production component 11 that is set opposite to a fixed end of the sound production component 11, also referred to as the free end. The sound production component 11 may be a regular or an irregular structure, and for illustrative purposes, the present disclosure provides some examples to further illustrate the end FE of the sound production component 11. For example, when the sound production component 11 is a rectangular structure, an end wall surface of the sound production component 11 is planar, and in this case, the end FE of the sound production component 11 refers to an end side wall that is set opposite to the fixed end of the sound production component 11 that is connected to the suspension structure. As another example, when the sound production component 11 is a spherical structure, an ellipsoidal structure, or an irregular structure, the end FE of the sound production component 11 may refer to a specific region obtained by cutting the sound production component 11 along a Y-Z plane (a plane formed by the short axis direction Z and the thickness direction X), which is far from the fixed end. A ratio of a dimension of the specific region along the long axis direction Y to a dimension of the sound production component along the long axis direction Y may be in a range of 0.05-0.2.

Figure 4:
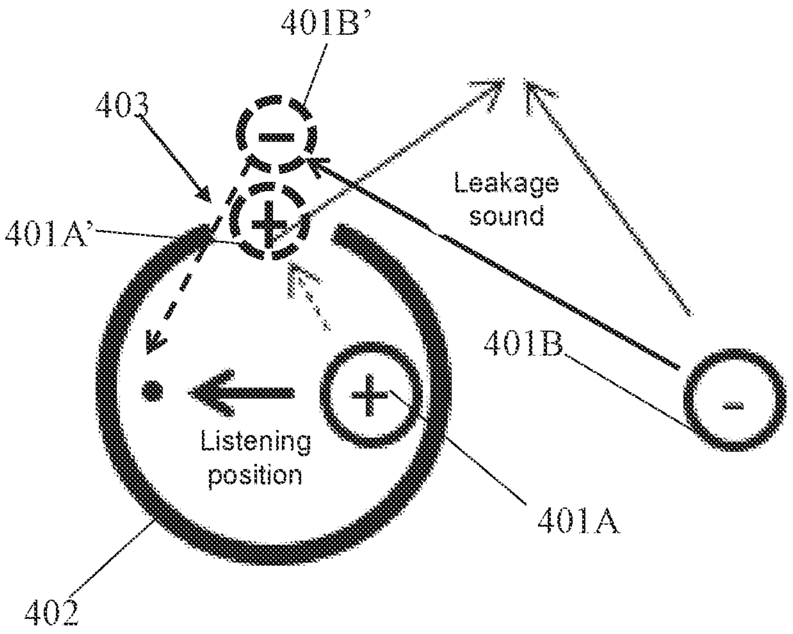
FIG. 4 is a schematic diagram illustrating an exemplary acoustic model formed by an earphone according to some embodiments of the present disclosure.

By extending at least a portion the sound production component 11 into the cavum conchae, a perceived sound volume at a listening position (e.g., at the opening of the ear canal), especially for sound volume in a mid-low frequency, may be increased, while a good sound leakage canceling effect in a far field can be maintained. For illustrative purposes only, when the entire or partial structure of the sound production component 11 extends into the cavum conchae 102, the sound production component 11 forms a structure similar to a cavity (hereinafter referred to as a cavity-like structure) with the cavum conchae 102. In the embodiments of the present disclosure, the cavity-like structure may be understood as a semi-enclosed structure enclosed by the side wall of the sound production component 11 and a structure of the cavum conchae 102. The semi-closed structure allows for acoustic communication between an internal environment and an external environment through a leakage structure (e.g., an opening, a gap, a channel, etc.), rather than completely isolating the internal and external environments. When the user wears the earphone 10, one or more sound outlets may be provided on a side of the housing of the sound production component 11 proximate to or toward the ear canal of the user, and one or more pressure relief holes 113 may be provided on other side walls (e.g., a side wall away from or departs from the ear canal of the user) of the housing of the sound production component 11. The one or more sound outlets are acoustically coupled to the front chamber of the earphone 10, and the one or more pressure relief holes are acoustically coupled to the rear chamber of the earphone 10. Taking the sound production component 11 including one sound outlet 112 and one pressure relief hole 113 as an example, a sound outputted from the sound outlet and a sound outputted from the pressure relief hole may be approximated to be two sound sources having equal sound levels but with opposite phases. The sound production component 11 and a corresponding inner wall of the cavum conchae 102 form the cavity-like structure, wherein the sound source corresponding to the sound outlet is located inside the cavity-like structure, while the sound source corresponding to the pressure relief hole is located outside the cavity-like structure, which form an acoustic model as shown in in FIG. 4. As shown in FIG. 4, a cavity-like structure 402 may include a listening position and at least one sound source 401A. Here, “include” may indicate that at least one of the listening position or the at least one sound source 401A is positioned inside the cavity-like structure 402, or it may indicate that at least one of the listening position or the at least one sound source 401A is at an inner edge of the cavity-like structure 402. The listening position may be equivalent to the opening of the ear canal, or be an acoustic reference point in the ear such as an ear reference point (ERP) or an eardrum reference point (DRP), etc., and the listening position may also be an entrance structure guiding to a listener, etc. A sound source 401B is positioned outside the cavity-like structure 402, and the sound sources 401A and 401B with opposite phases emit sound waves into the surrounding space, resulting in interference and cancellation of sound waves, thus achieving sound leakage canceling effect. Specifically, since the sound source 401A is enclosed by the cavity-like structure 402, most of the sound radiated by the sound source 401A reaches the listening position through direct or reflected paths. In contrast, without the cavity-like structure 402, most of the sound radiated by sound source 401A does not reach the listening position. Therefore, the cavity-like structure 402 significantly increases a volume of the sound reaching the listening position. At the same time, only a small portion of the sound radiated from the sound source 401B with the phase opposite to the phase of the sound source 401A outside the cavity-like structure 402 enters the cavity-like structure 402 through a leakage structure 403 of the cavity-like structure 402. This is equivalent to producing a secondary sound source 401B' at the leakage structure 403, the intensity of the secondary sound source 401B' is significantly smaller than the sound source 401B, and also significantly smaller than the sound source 401A. The sound produced by the secondary sound source 401B' may have a weak reverse cancellation on the sound source 401A in the cavity, which significantly increases the sound volume at the listening position. For the sound leakage, the sound source 401A radiates the sound to the outside through the leakage structure 403 of the cavity, which is equivalent to producing a secondary sound source 401A' at the leakage structure 403. As almost all the sound radiated by the sound source 401A is output from the leakage structure 403, and a size of the cavity-like structure 402 is much smaller than a spatial size for evaluating the sound leakage (the difference may be at least one order of magnitude), it may be considered that an intensity of the secondary sound source 401A' is equivalent to the intensity of the sound source 401A, and the effect for reducing sound leakage is still maintained.

In specific application scenarios, an outer wall surface of the sound production component 11 is typically a planar or curved plane, while a contour of the cavum conchae of the user is an uneven structure. By partially or entirely extending the sound production component 11 into the cavum conchae, the cavity-like structure between the sound production component 11 and the contour of the cavum conchae is formed that communicates with the outside world. Furthermore, by placing the one or more sound outlets at a position on the side of the sound production component facing the opening of the ear canal of the user and near the edge of the cavum conchae, and placing the one or more pressure relief holes on the side of the sound production component 11 away from or departing from the opening of the ear canal, the acoustic model as shown in FIG. 4 is formed, thereby improving the sound volume at the listening position at the opening of the ear canal and reducing far-field sound leakage effect when the user wears the earphone.

In some embodiments, the sound production component of the earphone may include a transducer and the housing that accommodates the transducer. The transducer is a component capable of receiving an electrical signal and converting the electrical signal into an audio signal for output. In some embodiments, a type of the transducer may be distinguished by frequency and may include a low-frequency (e.g., 30 Hz-150 Hz) speaker, a mid-low frequency (e.g., 150 Hz-500 Hz) speaker, a mid-high frequency (e.g., 500 Hz-5 kHz) speaker, a high-frequency (e.g., 5 kHz-16 kHz) speaker, a full-range (e.g., 30 Hz-16 kHz) speaker, or any combination thereof. The terms low-frequency, high-frequency, etc., represent approximate frequency ranges, and different categorizations may apply in various application scenarios. For example, a frequency division point may be determined, the low-frequency refers to a frequency range below the frequency division point and the high-frequency refers to a range above the frequency division point. The frequency division point may be any value within an audible range, e.g., 500 Hz, 600 Hz, 700 Hz, 800 Hz, 1000 Hz, etc.

In some embodiments, the transducer may include a diaphragm. When the diaphragm vibrates, sound may be emitted from front and rear sides of the diaphragm. In some embodiments, the front chamber (not shown) for transmitting sound is positioned on the front side of the diaphragm within a housing 120. The front chamber acoustically couples with the one or more sound outlets, allowing sound from the front side of the diaphragm to be emitted through the one or more sound outlets. The rear chamber (not shown) for transmitting sound is positioned on the rear side of the diaphragm within the housing. The rear chamber acoustically couples with the one or more pressure relief holes, allowing sound from the rear side of the diaphragm to be emitted through the one or more pressure relief holes.

Referring to FIG. 3A, here, an ear hook is used as an example of the suspension structure 12. In some embodiments, the ear hook may include a first portion 121 and a second portion 122 sequentially connected. The first portion 121 may hang between the auricle and the head of the user, and the second portion 122 may extend toward an outer side of the ear (a side of the ear away from the head along a coronal axis direction) and connect with the sound production component 11, so that the sound production component 11 is fixed at a position near the ear canal of the user without blocking the opening of the ear canal. In some embodiments, one or more sound outlets may be provided on a side wall of the housing facing the auricle, allowing sound generated by the transducer to exit the housing and be directed toward the opening of the ear canal of the user.

In some embodiments, due to inherent elasticity of the ear hook, a relative position of the sound production component 11 with respect to the ear hook may differ between the wearing and non-wearing states. For example, to facilitate wearing and ensure stability after wearing, a distance from the end FE of the sound production component 11 to the ear hook in the non-wearing state is smaller than a distance from the end FE of the sound production component 11 to the ear hook in the wearing state, which causes the sound production component 11 to tend to move closer to the ear hook in the wearing state to create a clamping force on the auricle. The wearing and non-wearing states of the earphone 10 may be further explained later in the present disclosure.

To facilitate understanding and describing forms of the earphone 10 in the non-wearing or wearing state, the earphone 10 may be projected onto a specific plane, a parameter related to a projection shape on the specific plane may be used to describe the earphone 10. Merely by way of example, in the wearing state, the earphone 10 may be projected on the sagittal plane of the human body to form a corresponding projection shape. In the non-wearing state, a first plane similar to the sagittal plane of the human body may be selected based on a relative position relationship between the sagittal plane of the human body and the earphone 10, so that a projection shape formed by projecting the earphone 10 onto the first plane closely approximates a projection shape of the earphone 10 formed on the sagittal plane of the human body. For convenience of description, with reference to FIG. 6, in some embodiments, when the user is not wearing the earphone 10, a first plane 60 may be determined based on a form of the ear hook. For example, the first plane 60 may be determined as follows. The ear hook may be placed on a flat supporting plane (e.g., a horizontal table, the ground, etc.). When the ear hook contacts with the supporting plane and is placed steadily, the supporting plane is the first plane 60 corresponding to the earphone 10. Of course, to maintain consistency of the specific plane corresponding to the wearing and non-wearing states, the first plane 60 may also be the sagittal plane of the human body, and the non-wearing state may be represented by removing an auricle structure from a human head model and fixing the sound production component 11 in a same posture as in the wearing state using a fixture or adhesive. In some embodiments, the first plane 60 may also be a plane formed by dividing the ear hook along its lengthwise direction into equal or approximately equal halves.

Figure 5A:
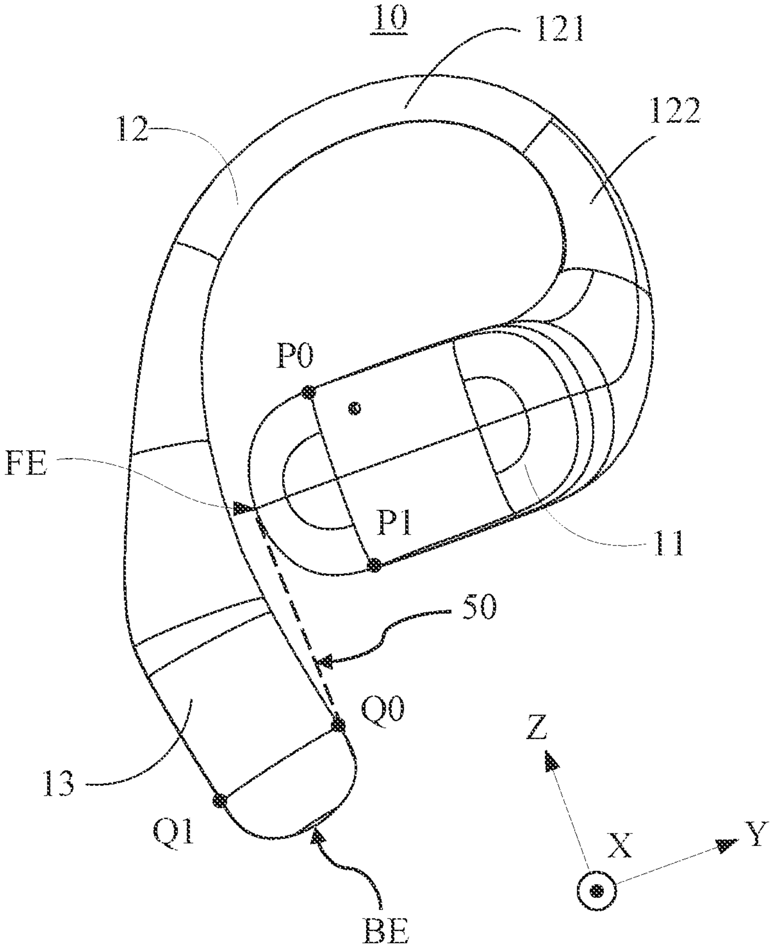
FIG. 5A is a schematic diagram illustrating an exemplary structure of an earphone in a non-wearing state according to some embodiments of the present disclosure.
Figure 5B:
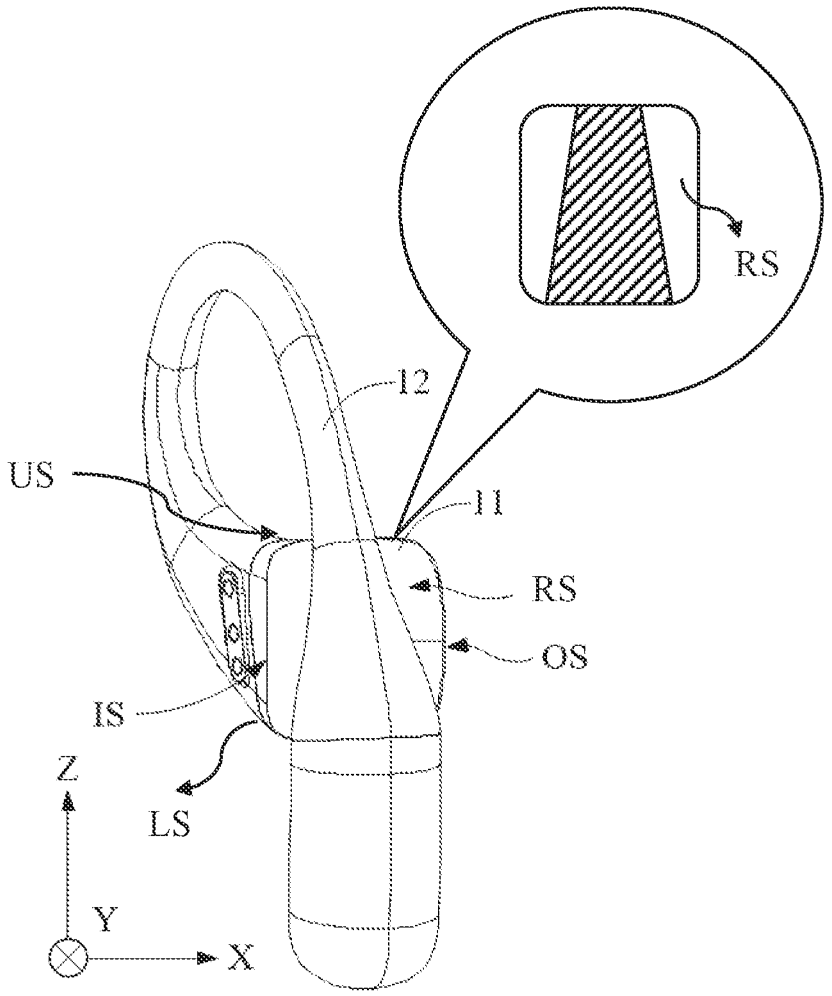
FIG. 5B is another schematic diagram illustrating an exemplary structure of the earphone in FIG. 3.
Figure 5C:
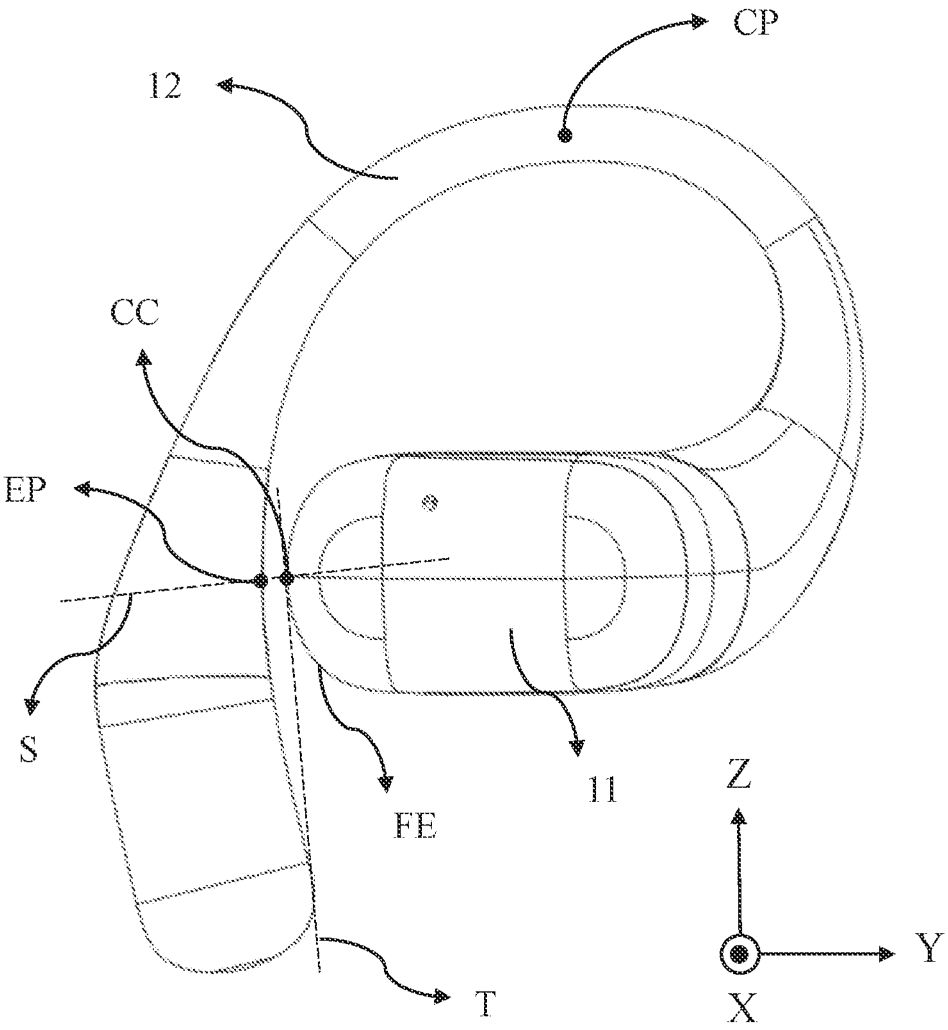
FIG. 5C is yet another schematic diagram illustrating an exemplary structure of the earphone in FIG. 3.

FIG. 5B is another schematic diagram illustrating an exemplary structure of the earphone in FIG. 3. FIG. 5C is yet another schematic diagram illustrating an exemplary structure of the earphone in FIG. 3. In some embodiments, in conjunctions with FIGS. 3, 4, 5B, and 5C, the housing of the sound production component 11 has an inner side IS facing the ear 100 along the thickness direction X and an outer side OS away from the ear 100 in the wearing state, and a connecting surface connecting the inner side IS and the outer side OS. It should be noted that when observed along the direction of the coronal axis (i.e., the thickness direction X) in the wearing state, the sound production component 11 may have a circular shape, an elliptical shape, a rounded square shape, a rounded rectangle shape, and other shapes. When the sound production component 11 has the circular shape or elliptical shape, the connecting surface mentioned above may refer to an arc-shaped side of the sound production component 11. When the sound production component 11 has the rounded square shape, rounded rectangle shape, or similar shapes, the connecting surface may include a lower side LS, an upper side US, and a rear side RS mentioned later. Therefore, for illustrative purposes, this embodiment provides an example using the sound production component 11 has the rounded rectangle shape. In this case, a length of the sound production component 11 in the long-axis direction Y may be greater than a width of the sound production component 11 in the short-axis direction Z. As shown in FIG. 5B, in the wearing state, the sound production component 11 may have the upper side US away from the external ear canal 101 in the short-axis direction Z, the lower side LS facing the external ear canal 101, and the rear side RS connecting the upper side US and the lower side LS. In the wearing state, the rear side RS is positioned at one end of the long-axis direction Y facing a back of the head and at least partially within the cavum conchae 102.

Furthermore, at least a portion of the housing may be inserted into the cavum conchae 102 of the user, and the portion inserted into the cavum conchae 102 of the user includes at least one clamping region in contact with a side wall of the cavum conchae 102 of the user. The at least one clamping region may be located at the end FE of the sound production component 11. In some embodiments, a positive projection of the ear hook 12 on a reference plane (e.g., the XZ plane in FIG. 5B), which is perpendicular to the long-axis direction Y, partially overlaps with a positive projection of the end FE on the reference plane (as shown in the shaded portion on the rear side RS in the figure). A clamping region may be defined as a region on the rear side RS whose projection on the reference plane forms the overlapping region between the positive projection of the ear hook 12 and the positive projection of the end FE. The overlapped region, formed by the positive projection of the ear hook 12 and the positive projection of the end FE on the reference plane, is located between the inner side IS and the outer side OS in the thickness direction X. In this way, both the sound production component 11 and the ear hook 12 may jointly clamp the ear 100 from the front and rear sides, and the clamping force formed mainly exhibits compressive stress, which is conducive to improving the stability and comfort of the earphone 10 in the wearing state. It may be understood that when the sound production component 11 has the circular shape, the elliptical shape, or similar shapes, the at least one clamping region may be defined as a region on the connecting surface (the arc-shaped side of the sound production component 11) corresponding to the overlapping region. The at least one clamping region may be a region on the sound production component 11 used to clamp the cavum conchae 102. However, due to individual differences among different users, leading to variations in shape, size, and other dimensions of the ear 100, in the actual wearing state, the at least one clamping region may not necessarily clamp the cavum conchae 102. However, for most users and the aforementioned standard ear model, the at least one clamping region in the wearing state may clamp the cavum conchae 102 of the user.

In some embodiments, the at least one clamping region and/or an inner side of the at least one clamping region may be equipped with a flexible material. Specific details about flexible material may be referred to elsewhere in the present disclosure, for example, in FIG. 11B and the descriptions thereof.

In some embodiments, as shown in FIG. 3, the sound production component 11 and the ear hook 12 may clamp the ear 100 (e.g., the cavum conchae 102) from the front and rear sides, and the clamping force formed mainly exhibits compressive stress, which is beneficial for improving the stability and comfort of the earphone 10 in the wearing state. As shown in FIG. 5C, the sound production component 11 may include a center CC of the at least one clamping region, and the ear hook 12 may include a clamping pivot point CP and an ear hook clamping point EP.

The clamping pivot point CP mentioned here may be understood as a point on the ear hook 12 that contacts and supports the auricle during wearing. Considering that there is a continuous region on the ear hook 12 that contacts and provides support to the auricle on the side facing the head, for convenience of understanding, in some embodiments, an extremum point of the ear hook 12 located in the continuous region may be regarded as the clamping pivot point CP. The extremal points of the ear hook 12 may be determined as follows. An inner contour of a projected curve of the earphone on the sagittal plane of the user in the wearing state (or an inner contour of a projection of the earphone on an ear hook plane in the non-wearing state) may be obtained, and an extremum point (e.g., a maximum point) of the projected curve in the short-axis direction Z may be determined as the extremum point of the ear hook 12. The extremum point is located near a highest point on the vertical axis direction of the human body (e.g., at a position within 15 mm to the rear of the highest point). It should be noted that an ear hook structure is an arc-shaped structure, and the ear hook plane is a plane formed by three outermost convex points of the ear hook 12, i.e., a plane that supports the ear hook 12 when the ear hook 12 is freely placed. In other embodiments, the ear hook plane may also be a plane formed by a bisector which bisects or roughly bisects the ear hook 12 along its long-axis direction Y. An extremum point of the inner contour of the projected curve in a width direction Z may be determined as follows. A coordinate system may be set up, and a horizontal axis and a vertical axis of the coordinate system may be the long-axis direction Y and the short-axis direction Z of the sound production component 11, respectively. A maximum point (e.g., where the first derivative is 0) of the inner contour of the projected curve on the coordinate system may be determined as the extremum point of the inner contour of the projected curve in the width direction Z. Additionally, when transitioning from the non-wearing state to the wearing state, a portion between the sound production component 11 and an end portion of the ear hook 12 (e.g., a battery compartment) far from the sound production component 11 may be stretched. At this time, a significant strain may occur at the clamping pivot point CP. Therefore, in some alternative embodiments, a cross-section center corresponding to a position of maximum strain on the ear hook 12 before and after wearing may be used as the clamping pivot point CP. Alternatively, to facilitate the generation of significant strain at the clamping pivot point CP, the ear hook 12 may be designed as a variable cross-section structure, where cross-sectional areas at different positions of the ear hook 12 may be different, and a center of a smallest cross-sectional area on the ear hook 12 may be used as the clamping pivot point CP. In some other alternative embodiments, since the ear 100 of the user mainly exerts a supporting force on the ear hook 12 at the highest point on the vertical axis direction of the human body when wearing the earphone, the highest point may also be used as the clamping pivot point CP.

The center CC of the at least one clamping region refers to a point that may represent the at least one clamping region and is used to describe a position of the at least one clamping region relative to other structures. In some embodiments, the center CC of the at least one clamping region may be used to characterize a location of the at least one clamping region where the at least one clamping region exerts a maximum force on the ear 100 under a standard wearing situation. The standard wearing situation may be a situation where the earphone is correctly worn on the aforementioned standard ear model according to wearing specifications. In some embodiments, when the sound production component 11 has a regular shape such as the circular shape, the elliptical shape, the rounded rectangle shape, or the rounded square shape, an intersection point of the long axis of the sound production component 11 with the at least one clamping region may be defined as the center CC of the at least one clamping region. It should be noted that the long axis of the sound production component 11 may be a central axis along the long axis direction Y. The center CC of the at least one clamping region may be determined as follows. An intersection point of a positive projection of the sound production component 11 on a reference plane (e.g., the XZ plane in FIG. 5C) perpendicular to the long axis direction Y and a positive projection of the central axis on the same reference plane may be determined, and the center CC of the at least one clamping region may be defined as a point on the sound production component 11 whose projection on the reference plane forms the above intersection point. In other embodiments, when it is difficult to determine the long axis of the sound production component 11 (e.g., when the sound production component 11 has an irregular shape), as shown in FIG. 5C, the center CC of the at least one clamping region may be defined as an intersection point of the end FE and a tangent plane of the end FE and an end (e.g., the battery compartment) of the ear hook 12 away from the sound production component 11. The center CC of the at least one clamping region may be determined as follows. A positive projection of the sound production component 11 on a reference plane (e.g., the YZ plane in FIG. 5C) perpendicular to the thickness direction X and a tangent line T of a positive projection of the end (e.g., the battery compartment) of the ear hook 12 away from the sound production component 11 on the same reference plane may be determined, an intersection point of the tangent line T on the reference plane and the positive projection of the end FE may be determined, and further the center CC of the at least one clamping region may be defined as a point on the end FE whose projection on the reference plane forms the above intersection point.

In some embodiments, when a shape and a dimension of the sound production component 11 are determined, a distance between the center CC of the at least one clamping region and the clamping pivot point CP may be adjusted to simultaneously change a coverage position of the sound production component 11 in the cavum conchae 102 and a clamping position of the sound production component 11 on the cavum conchae 102 (and even on the tragus near the cavum conchae 102) in the wearing state. This not only affects the stability and comfort of the user wearing the earphone but also affects the audio performance of the earphone. In other words, in the wearing state, the distance between the center CC of the at least one clamping region and the clamping pivot point CP needs to be kept within a certain range. When the shape and the dimension of the sound production component 11 are consistent, if the aforementioned distance is too large, it may cause the position of the sound production component 11 in the cavum conchae 102 to be too low, resulting in a large gap between the upper side US of the sound production component 11 and the cavum conchae 102. In other words, an opening of the formed cavity-like structure is relatively large, and the included sound sources (i.e., the one or more sound outlets located on the inner side IS) radiate directly a large amount of sound into the environment, which reduces sound reaching the listening position. Additionally, external sound entering the cavity-like structure increases, leading to near-field sound cancellation, thereby reducing a listening index. Moreover, if the aforementioned distance is too large, it may cause excessive interference between the sound production component 11 (or a connection region between the ear hook 12 and the sound production component 11) and the tragus, which causes excessive compression of the tragus by the sound production component 11, resulting in discomfort when wearing. When the shape and the dimension of the sound production component 11 are consistent, if the aforementioned distance is too small, it may cause the upper side US of the sound production component 11 to fit with an upper edge of the cavum conchae 102, which generates gaps with too small sizes or too few gaps between the upper surface US and the cavum conchae 102. It may even lead to complete isolation between the internal and external environments, preventing the formation of the cavity-like structure. Additionally, if the aforementioned distance is too small, it may cause excessive compression of the outer contour of the ear (or the connection region between the ear hook 12 and the sound production component) by the sound production component 11, which may also affect comfort when wearing. The listening index may be a reciprocal $1/\alpha$ of a leakage sound index $\alpha$ and is used to evaluate the effectiveness of various structural configurations. The listening index represents a volume of sound when leakage sound is the same. From an application perspective, a higher listening index is preferable. If the gap is too small (i.e., the opening of the cavity-like structure is too small), the sound leakage reduction effect is poor. If the count of formed gaps is too few, it will result in few openings of the cavity-like structure. A cavity structure with more f openings may better raise a resonance frequency of an air-induced sound inside the cavity structure compared to a cavity structure with fewer openings, which provides a better listening index in a high-frequency range (e.g., a sound frequency close to 10,000 Hz). In addition, the high-frequency range is more sensitive to the human ear, so there is a greater need for reducing sound leakage in this range. Therefore, if the gaps are relatively few, it may be impossible to enhance the sound leakage reduction effect in the high-frequency range. In some embodiments, to achieve a better listening index when the earphone is in the wearing state, the distance between the center CC of the at least one clamping region and the clamping pivot point CP may be in a range of 20 mm to 40 mm. In some embodiments, to further improve the sound leakage reduction effect, the distance between the center CC of the at least one clamping region and the clamping pivot point CP may be in a range of 23 mm to 35 mm. In some embodiments, to ensure that the cavity-like structure formed by the sound production component 11 and the cavum conchae 102 has a more suitable volume and opening size/count, the distance between the center CC of the at least one clamping region and the clamping pivot point CP may be in a range of 25 mm to 32 mm.

The ear hook clamping point EP may be a point on the ear hook 12 closest to the center CC of the at least one clamping region, and it may be used to measure a clamping situation of the ear hook 12 on the ear 100 in the wearing state. By adjusting a position of the ear hook clamping point EP, a clamping force of the ear hook 12 on the ear 100 may be changed. In some embodiments, when the sound production component 11 has a regular shape such as the circular shape, the elliptical shape, the rounded rectangle shape, or the rounded square shape, an intersection point of the long axis of the sound production component 11 with the first portion of the ear hook 12 may be defined as the ear hook clamping point EP. The ear hook clamping point EP may be determined as follows. A positive projection of the first portion of the ear hook on the reference plane (e.g., the XZ plane in FIG. 5C) perpendicular to the long axis direction Y has an intersection point with the positive projection of the central axis of the sound production component 11 on the reference plane, and a point on the first portion of the ear hook corresponding to the intersection point may be determined as the ear hook clamping point EP. In some embodiments, when it is difficult to determine the long axis of the sound production component 11 (e.g., when the sound production component 11 has the irregular shape), as shown in FIG. 5C, a portion of the ear hook 12 that is near the end FE has an intersection point with a tangent plane that passes through the center CC of the at least one clamping region and is perpendicular to a tangent plane of the end FE and a portion (e.g., the battery compartment) of the ear hook 12 away from the sound production component 11, and the ear hook clamping point EP may be defined as the intersection point. The ear hook clamping point EP may be determined as follows. A straight line S that is perpendicular to the reference plane (e.g., the YZ plane in FIG. 5C) and passes through the positive projection of the center CC of the at least one clamping region on the reference plane may be determined and the straight line S may be perpendicular to the tangent line T. An intersection point between the straight line S and a portion of the positive projection of the ear hook 12 on the reference plane is determined, and the portion of the positive projection of the ear hook 12 is near the positive projection of the end FE on the reference plane. The ear hook clamping point EP may be defined as a point on the ear hook 12 whose projection on the reference plane forms the above intersection point.

In some embodiments, in the wearing state, a distance between the ear hook clamping point EP on the first portion 121 of the ear hook 12 and the clamping pivot point CP needs to be kept within a certain range. If the distance is too large, it may cause the portion of the ear hook 12 between the ear hook clamping point EP and the clamping pivot point CP to be too straight or difficult to clamp on a rear side of the cavum conchae 102 (e.g., the clamping position is downward relative to the cavum conchae 102), and the end (e.g., the battery compartment) of the ear hook 12 away from the sound production component 11 does not fit well with the ear 100. If the distance is too small, it may cause the portion of the ear hook 12 between the ear hook clamping point EP and the clamping pivot point CP to bend too much or be difficult to clamp on the rear side of the cavum conchae 102 (e.g., the clamping position is upward relative to the cavum conchae 102), and the end (e.g., battery compartment) of the ear hook 12 away from the sound production component 11 compresses the ear 100, resulting in poor comfort. In some embodiments, to meet wearing requirements, in the wearing state, the distance between the ear hook clamping point EP on the first portion 121 of the ear hook 12 and the clamping pivot point CP may be in a range of 25 mm to 45 mm. In some embodiments, to achieve better alignment between the end of the ear hook 12 away from the sound production component 11 and the ear 100 in the wearing state, the distance between the ear hook clamping point EP on the first portion 121 of the ear hook 12 and the clamping pivot point CP may be in a range of 26 mm to 40 mm. In some embodiments, to achieve better comfort, in the wearing state, the distance between the ear hook clamping point EP on the first portion 121 of the ear hook 12 and the clamping pivot point CP may be in a range of 27 mm to 36 mm.

In some embodiments, as shown in FIG. 3, when observed in the direction of the coronal axis of the human body in the wearing state, the connecting end CE is closer to a top of the head compared to the end FE to facilitate extension of the end FE into the cavum conchae 102. Based on this, an included angle between the long axis direction Y and the direction of the sagittal axis of the human body needs to be kept within a certain range. When the shape and the dimension of the sound production component 11 are consistent, if the aforementioned included angle is too small, it may cause the upper side US of the sound production component 11 to fit with the upper edge of the cavum conchae 102, which generates gaps with too small sizes or too few gaps between the upper surface US and the cavum conchae 102. This leads to poor sound leakage reduction effect, and the one or more sound outlets on the sound production component 11 are relatively far from the external ear canal 101. When the shape and the dimension of the sound production component 11 are consistent, if the aforementioned included angle is too large, it may cause the gaps between the upper side US of the sound production component 11 and the cavum conchae 102 to be too large, i.e., the opening of the formed cavity-like structure is too large, resulting in a reduced listening index. In some embodiments, to achieve a better listening index when the earphone is in the wearing state, the included angle between the long axis direction Y and the direction of the sagittal axis of the human body may be in a range of 15° to 60°. In some embodiments, to further improve the sound leakage reduction effect, the included angle between the long axis direction Y and the direction of the sagittal axis of the human body may be in a range of 20° to 50°. In some embodiments, to ensure an appropriate distance between the one or more sound outlets and the external ear canal 101, the included angle between the long axis direction Y and the direction of the sagittal axis of the human body may be in a range of 23° to 46°.

In some embodiments, a direction of the clamping force may be a direction of a line connecting two clamping points on both sides of the auricle (or center points of clamping surfaces) where the earphone is clamped. When the shape and the dimension of the sound production component 11 are constant, the direction of the clamping force is closely relating to an orientation of the sound production component 11 in the cavum conchae 102 and a depth of insertion into the cavum conchae 102. Furthermore, to make the earphone more secure when worn, it is desirable to align the direction of the clamping force the same or approximately the same as a direction of a pressure exerted by the sound production component 11 on the cavum conchae 102 and a direction of a pressure exerted by the ear hook clamping point EP on an ear back, to avoid creating a tendency for relative motion between the sound production component 11 and the ear hook 12. Therefore, the direction of the clamping force also affects the stability of wearing the earphone. Since regions on the back of the ear 100 relative to the cavum conchae 102 are in a limited range and the direction of the pressure exerted by the ear hook 12 on these regions of the ear is usually parallel or approximately parallel to the sagittal plane of the user, an included angle between the direction of the clamping force and the sagittal plane of the user needs to be kept within a certain range. In other words, the direction of the clamping force is parallel or substantially parallel to the sagittal plane of the user. it may cause a large gap between the inner side IS of the sound production component 11 and the cavum conchae 102, resulting in a reduced listening index. If the aforementioned included angle deviates too much from 0°, it may also cause the position of the sound production component 11 in the cavum conchae 102 to shift towards a side of the ear 100 facing the head, and the inner side IS of the sound production component 11 fits with the upper edge of the cavum conchae 102, which generates gaps with relatively small sizes or relatively few gaps between the inner side IS of the sound production component 11 and the cavum conchae 102. It may even lead to completely isolation of the internal and the external environments, resulting in a poor sound leakage reduction effect. Furthermore, if the aforementioned included angle deviates significantly from 0°, it may lead to poorer stability in wearing the earphone, making the earphone prone to shaking. It should be noted that the direction of the clamping force may be determined by attaching force sensors (e.g., strain gauges) or a force sensor array on a side of the auricle facing the head and a side of the auricle away from the head to measure a distribution of forces at clamped positions on the auricle. For example, if there is one point on the side of the auricle facing the head and one point on the side of the auricle away from the head where forces may be measured, the direction of the clamping force may be considered as a direction of a line connecting these two points. In some embodiments, to meet wearing requirements, the included angle between the direction of the clamping force and the sagittal plane of the user may be in a range of −30° to 30°. In some embodiments, to improve the listening index, the included angle between the direction of the clamping force and the sagittal plane of the user may be in a range of −20° to 20°. In some embodiments, to further enhance the sound leakage reduction effect, the included angle between the direction of the clamping force and the sagittal plane of the user may be in a range of −10° to 10°. In some embodiments, to further increase the stability of wearing the earphone, the included angle between the direction of the clamping force and the sagittal plane of the user may be in a range of −8° to 8°. In some embodiments, the direction of the clamping force may be adjusted by designing a curvature configuration of the ear hook 12, and/or the shape and the dimension of the sound production component 11, and/or the position of the center CC of the at least one clamping region.

In some embodiments, a change in area between the first area and the second area (i.e., a difference between the second area and the first area) may affect the clamping force provided by the ear hook 12 in the wearing state. To further measure a relationship between the clamping force provided by the ear hook 12 in the wearing state and the difference between the second area and the first area, in the embodiments described in the present disclosure, a ratio of the clamping force to the difference between the second area and the first area is defined as a first correlation coefficient. In other words, the first correlation coefficient may reflect or characterize an impact of the difference between the second area and the first area on the clamping force. In some embodiments, a value of the first correlation coefficient needs to be within a certain range. If the first correlation coefficient is too large, it may result in excessive clamping force during wearing, causing a strong pressure on the ear 100 of the user, making it difficult to adjust the wearing position after wearing. If the first correlation coefficient is too small, it may result in insufficient stability of the ear hook 12 when worn, and the sound production component 11 is prone to detach from the auricle. In some embodiments, to meet the requirements, the value of the first correlation coefficient may be in a range of 42 $N/m^2$ to 50,000 $N/m^2$. In some embodiments, to meet the requirements, the value of the first correlation coefficient may be in a range of 100 $N/m^2$ to 45,000 $N/m^2$. In some embodiments, to meet the requirements, the value of the first correlation coefficient may be in a range of 500 $N/m^2$ to 35,000 $N/m^2$. In some embodiments, to meet the requirements, the value of the first correlation coefficient may be in a range of 2000 $N/m^2$ to 10,000 $N/m^2$. Furthermore, a magnitude of the first correlation coefficient may also be related to the direction of the clamping force. In some embodiments, when the included angle between the direction of the clamping force and the sagittal plane of the user changes, a ratio of the clamping force to the difference between the first area and the second area (i.e., the first correlation coefficient) changes. Within a certain range (e.g., 0° to 30°), the larger the included angle between the direction of the clamping force and the sagittal plane of the user is, the smaller the impact of the change in area between the first area and the second area on the clamping force may be, and the larger the ratio of the clamping force to the difference between the first area and the second area may be. The smaller the included angle between the direction of the clamping force and the sagittal plane of the user is, the greater the impact of the change in area between the first area and the second area on the clamping force may be, and the smaller the ratio of the clamping force to the difference between the first area and the second area may be. In some embodiments, by configuring the included angle between the direction of the clamping force and the sagittal plane of the user, the ratio of the clamping force to the difference between the first area and the second area may be maintained within the ranges mentioned above.

To further measure the clamping force provided by the ear hook 12 in the wearing state, the present disclosure defines deformability of the ear hook 12 based on the clamping pivot point CP as a clamping coefficient based on the clamping pivot point CP. In some embodiments, a value of the clamping coefficient based on the clamping pivot point CP needs to be within a certain range. If the clamping coefficient mentioned above is too large, it may result in excessive clamping force during wearing, causing a strong pressure on the ear 100 of the user, making it difficult to adjust the wearing position after wearing, and may cause the upper side US of the sound production component 11 to fit with the upper edge of the cavum conchae 102, leading to gaps with too small sizes or too few gaps between the upper side US and the cavum conchae 102, which results in poor sound leakage reduction effect. If the clamping coefficient mentioned above is too small, it may result in insufficient stability of the ear hook 12 when worn, and the sound production component 11 is prone to detach from the auricle, and it is easy to cause a too large gap between the sound production component 11 and the cavum conchae 102, i.e., the opening of the formed cavity-like structure is too large, resulting in a reduced listening index. In some embodiments, to meet wearing requirements, the value of the clamping coefficient based on the clamping pivot point CP may be in a range of 10 N/m to 30 N/m. In some embodiments, to increase adjustability after wearing, the value of the clamping coefficient based on the clamping pivot point CP may be in a range of 11 N/m to 26 N/m. In some embodiments, to increase stability after wearing, the value of the clamping coefficient based on the clamping pivot point CP may be in a range of 15 N/m to 25 N/m. In some embodiments, to obtain better listening index when the earphone is worn, the value of the clamping coefficient based on the clamping pivot point CP may be in a range of 17 N/m to 24 N/m. In some embodiments, to further enhance the sound leakage reduction effect, the value of the clamping coefficient based on the clamping pivot point CP may be in a range of 18 N/m to 23 N/m. The clamping coefficient based on the clamping pivot point CP of the ear hook 12 may reflect how easy to stretch the sound production component 11 away from the ear hook 12. In some embodiments, the clamping coefficient based on the clamping pivot point CP of the ear hook 12 may be expressed as a relationship between a distance (a pulled-away distance) at which the sound production component 11 is pulled away from the ear hook 12 and a clamping force exerted by the ear hook 12 to drive the sound production component 11 closer to the first portion of the ear hook in the wearing state. It should be noted that the pulled-away distance of the sound production component 11 from the ear hook 12 may be a difference between a distance from the sound production component 11 to the ear hook 12 in the long axis direction Y of the sound production component 11 in the non-wearing state and a distance from the sound production component 11 to the ear hook 12 in the long axis direction Y of the sound production component 11 in the wearing state. The value range of the clamping coefficient based on the clamping pivot point CP may be determined by in the following exemplary manner. The ear hook 12 may be considered equivalent to a spring, and the relationship between the spring's pulled-away distance and the clamping force is represented by Equation (1):

$$F=kx, \tag{1}$$

where, F represents the clamping force, k represents the clamping coefficient, and x represents the pulled-away distance.

Based on the above Equation (1), the clamping coefficient may be determined using the following manner. Clamping forces corresponding to different pulled-away distances may be measured using a tension meter. At least one group each of which includes a clamping force and a corresponding pulled-away distance may be determined. At least one intermediate clamping coefficient may be determined according to Equation (1) using the at least one group. Then an average value of the at least one intermediate clamping coefficient may be calculated and the average value may be determined as the clamping coefficient. Alternatively, the clamping coefficient may be determined by measuring a clamping force when pulling the ear hook to a normal wearing state with the tension meter and determining the clamping coefficient by substituting the measured clamping force and the distance at which the ear hook is pulled into Equation (1).

Figure 6:
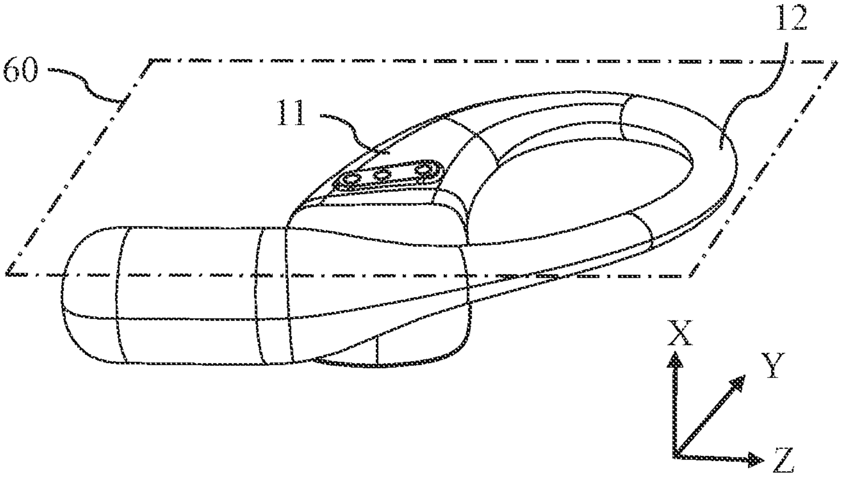
FIG. 6 is a schematic diagram illustrating a first projection formed on a first plane of an earphone in a non-wearing state according to some embodiments of the present disclosure.

FIG. 6 is a schematic diagram illustrating a first projection formed on a first plane of an earphone in a non-wearing state according to some embodiments of the present disclosure.

Combining FIGS. 5A and 6, in some embodiments, the first projection includes an outer contour, a first end contour, an inner contour, and a second end contour. The first end contour may be a projection contour of the end FE of the sound production component 11 on the first plane. Two end points P0 and P1 of the first end contour are projection points of an intersection between the end FE and the other portion of the sound production component 11 on the first plane, the division of the end FE can be seen in the relevant description in FIG. 3 of the present disclosure. The second end contour may be a projection contour of a free end BE of the suspension structure 12 on the first plane. Two end points Q0 and Q1 of the second end contour may be projection points of an intersection between the free end BE and the other portion of the suspension structure 12 on the first plane. The outer contour may be a contour of the first projection that is located between the point P1 and the point Q1. The inner contour may be a contour of the first projection that is located between the point P0 and the point Q0.

It should be noted that the free end BE of the suspension structure 12 may be at least part of a region in an end of the first portion of the suspension structure 12 that is away from the second portion. The end of the first portion of the suspension structure 12 away from the second portion may be a regular or irregularly shaped structure, which is illustrated here exemplarily in order to further illustrate the free end BE of the suspension structure 12. For example, if the end of the first portion of the suspension structure 12 away from the second portion is a rectangular structure, an end wall thereof is a planar surface, in this case, the free end BE of the suspension structure 12 is an end side wall of the end of the first portion of the suspension structure 12 away from the second portion. As another example, when the end of the first portion of the suspension structure 12 away from the second portion is a sphere, an ellipsoid, or an irregular structure, the free end BE of the suspension structure 12 may be a region obtained by extending a specific distance into the second portion from a furthest position away from the second portion in an extension direction of the first portion of the suspension structure 12. A ratio of this specific distance to a total extension distance of the first portion of the suspension structure 12 may be in a range of 0.05 to 0.2.

Taking the projection of the sound production component 11 on the first plane 60 as a rectangular-like shape (e.g., runway shape) as an example, there are parallel or approximately parallel upper and lower side wall projections in the projection of the sound production component 11, and the first end contour connecting the upper and lower side wall projections. The first end contour may be a straight line segment or a circular arc. Points P0 and P1 indicate two ends of the first end contour, respectively. By way of exemplary illustration only, the point P0 may be a junction point between an arc formed by the end FE projection and a line segment of the upper side wall projection. Similar to the point P0, the point P1 may be a junction point between the arc formed by the end FE projection and a line segment of the lower side wall projection. Similarly, the ear hook has a free end at an end away from the sound production component 11. The free end of the ear hook forms the second end contour when projected on the first plane 60. The second end contour may be a straight line segment or an arc, and points Q0 and Q1 represent two ends of the second end contour. In some embodiments, the points Q0 and Q1 may be two end points of a line segment or an arc formed by a projection of the free end of the first portion 121 of the ear hook in a direction away from the second portion 122 of the ear hook on the first plane 60. Furthermore, on the long axis direction Y of the sound production component 11, a point near the sound production component 11 is the point Q0, and a point away from the sound production component 11 is the point Q1.

A shape of the first projection of the earphone 10 on the first plane 60 and its projection on the sagittal plane of the human body may reflect a wearing mode of the earphone 10 on the ear. For example, an area of the first projection may reflect a region of the auricle that the earphone 10 may cover in the wearing state, as well as a contact mode of the sound production component 11 and the ear hook with the ear. In some embodiments, because the sound production component 11 does not contact with the first portion 121 of the ear hook, the inner contour, the outer contour, the first end contour, and the second end contour of the first projection may form a non-enclosed region. A size of the non-closed region is closely related to a wearing effect (e.g., the stability during wear, a sound production position, etc.) of the earphone 10. For convenience of understanding, in some embodiments, a tangent segment 50 connecting the first end contour and the second end contour of the first projection may be determined. The outer contour, the first end contour, the second end contour, and the tangent segment 50 of the first projection jointly define a first closed curve, and an area enclosed by a first closed curve may be considered as an area (also referred to as a first area) of the first projection.

In order to allow an entire or a portion of the sound production component 11 to extend into the cavum conchae to improve sound production efficiency of the sound production component 11. The sound production efficiency may be understood as a ratio of a listening volume at the opening of the ear canal to a volume of a leakage sound in a far field, the dimension of the sound production component 11 may be configured small enough to fit the dimension of the cavum conchae in a position of the sound production component 11B relative to the ear as shown in FIG. 2. Furthermore, to provide appropriate clamping force between the first portion 121 of the ear hook and the sound production component 11 at the edge of the auricle for stability during wear, a distance between the sound production component 11 and the first portion 121 of the ear hook may not be too far in the non-wearing state. In this way, by providing an appropriate clamping force, it may be ensured that the earphone 10 is not solely supported by the upper edge of the ear during wear, thereby improving comfort during wear. Considering the above factors, the first area enclosed by the first closed curve in the non-wearing state may be configured relatively small in some embodiments. In some embodiments, a range of the first area enclosed by the first closed curve is not greater than 1500 mm$^2$.

In some embodiments, because the ear hook is configured to at least partially press against the ear and/or the head in the wearing state, to form the clamping force on the ear, a too small first area may cause discomfort for some individuals (e.g., those with larger auricles) after wearing. Therefore, considering the mode of wearing and the dimension of the ear, the range of the first area enclosed by the first closed curve is not smaller than 1000 mm$^2$. At the same time, in some embodiments, a relative position of the sound production component 11 with respect to the ear canal (e.g., the auricle) of the user affects a count and opening sizes of leakage structures of the cavity-like structure formed by the sound production component 11 and the cavum conchae of the user. The opening sizes of the leakage structures directly affects sound quality, specifically, when the first area is too small, the sound production component 11 may not abut against the edge of the cavum conchae, which results in more sound components radiating outward, less sound reaching the listening position, and thus reducing the sound production efficiency of the sound production component 11. Therefore, in some embodiments, the first area enclosed by the first closed curve may be in a range of 1000 mm$^2$ to 1500 mm$^2$.

In some embodiments, considering an overall structure of the earphone 10 and a need for the shape of the ear hook to adapt to a space between the ear and the head, the range of the first area enclosed by the first closed curve is not smaller than 1150 mm$^2$. In some embodiments, to ensure the sound production efficiency of the sound production component 11 and the appropriateness of the clamping force, the range of the first area enclosed by the first closed curve is not more than 1350 mm$^2$. Therefore, in some embodiments, the first area enclosed by the first closed curve may be in a range of 1150 mm$^2$ to 1350 mm$^2$ to ensure the sound production efficiency of the sound production component 11 and the comfort of the user wearing the earphone 10, while also ensuring the appropriate first area that may maintain the listening volume at the listening position (e.g., the opening of the ear canal), especially for mid-to-low frequencies, while maintaining a good sound leakage cancelling effect in the far field.

Figure 7:
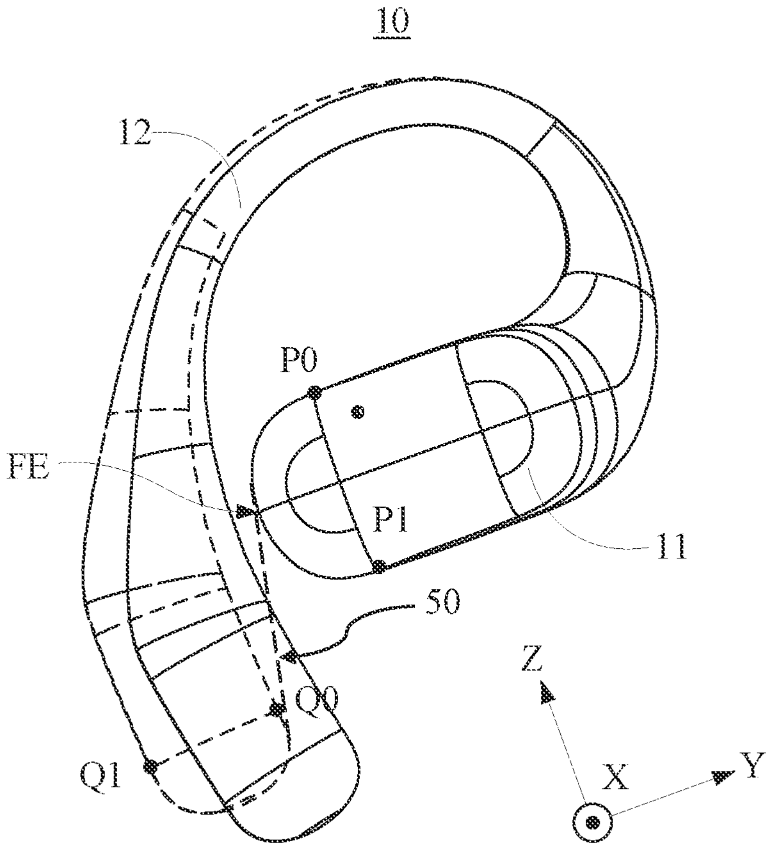
FIG. 7 is a schematic diagram illustrating an exemplary morphological difference of an earphone in a wearing state and a non-wearing state according to some embodiments of the present disclosure.

FIG. 7 is a schematic diagram illustrating an exemplary morphological difference of an earphone in a wearing state and a non-wearing state according to some embodiments of the present disclosure. A dashed region represents the first portion of the ear hook in the wearing state, which is further from the end FE of the sound production component compared to the first portion of the ear hook in the non-wearing state. In the wearing state, the ear hook and the sound production component form a second projection on the sagittal plane of the human body. Similar to the first projection shown in FIG. 5A, the second projection also includes an outer profile, a first end contour, an inner contour, and a second end contour. The outer contour, the first end contour, the second end contour, and a tangent segment connecting the first end contour and the second end contour may jointly define a second closed curve. As mentioned above, the projection shape formed by the earphone 10 on the first plane is close to the projection shape formed by the earphone 10 on the sagittal plane of the human body. Therefore, in the second projection, division of the various contours may still be described using contour boundary points similar to FIG. 5A, i.e., the points P0, P1, Q0, and Q1. In other words, definitions of the outer contour, the first end contour, the inner contour, the second end contour, and the tangent segment in the second projection are similar to those in the first projection and are not repeated here. An area enclosed by the second closed curve is considered as an area (also referred to as the second area) of the second projection. In some embodiments, the second area may reflect a fit of the earphone 10 to the ear of the user in a wearing state.

For reasons similar to those for the first area, an appropriate second area may ensure the listening volume of the earphone 10 at the listening position (e.g., the opening of the ear canal), especially for mid-low frequencies, while maintaining good sound leakage cancellation effect in the far field. In some embodiments, the second area is in a range of 1100 mm$^2$ to 1700 mm$^2$. In some embodiments, to ensure the sound production efficiency in the cavum conchae of the user and the comfort of wearing the earphone 10, the second area may be in a range of 1300 mm$^2$ to 1650 mm$^2$.

In some embodiments, in the wearing state, the sound production component 11 and the first portion 121 of the ear hook clamp the auricle of the user, and the ear hook generates a clamping force to bring the sound production component 11 closer to the first portion 121 of the ear hook. The clamping force needs to be maintained within a certain range. It should be noted that the clamping force may be determined by measuring a clamping force corresponding to a preset distance using the tension meter. The preset distance may be a distance at which the sound production component 11 is pulled away from the ear hook under the standard wearing condition. The clamping force may also be obtained by attaching force sensors (e.g., strain gauges) or a force sensor array on the side of the auricle facing the head and the side of the auricle away from the head to read force values at clamped positions of the auricle. For example, if there are two points corresponding to a same position on the side of the auricle facing the head and the side of the auricle away from the head where forces may be measured, a magnitude of this force (e.g., any one of forces at the above two points) may be considered as the clamping force. If the clamping force is too small, the ear hook 12 and the sound production component 11 not effectively clamp on both sides of the ear 100 in the wearing state, thereby resulting in poor stability in the wearing state. When the sound production component 11 may not effectively clamp the cavum conchae 102, the gap between the sound production component 11 and the cavum conchae 102 becomes too large, that is, the opening of the formed cavity-like structure is too large, resulting in a decrease in the listening index. If the clamping force is too large, it may cause strong pressure on the ear 100 of the user when the earphone 10 is in the wearing state, making it difficult to adjust the wearing position after wearing.

In some embodiments, to meet the wearing requirements, the clamping force generated by the ear hook 12 to drive the sound production component 11 close to the first portion 121 of the ear hook may be in a range of 0.03 N to 1 N. In some embodiments, to increase adjustability after wearing, the clamping force generated by the ear hook 12 to drive the sound production component 11 close to the first portion 121 of the ear hook may be in a range of 0.05 N to 0.8 N. In some embodiments, to enhance stability after wearing, the clamping force generated by the ear hook 12 to drive the sound production component 11 close to the first portion 121 of the ear hook may be in a range of 0.2 N to 0.75 N. In some embodiments, to improve the listening index of the earphone in the wearing state, the clamping force generated by the ear hook 12 to drive the sound production component 11 close to the first portion 121 of the ear hook may be in a range of 0.3 N to 0.7 N. In some embodiments, to further enhance the sound leakage reduction effect, the clamping force generated by the ear hook 12 to drive the sound production component 11 close to the first portion 121 of the ear hook may be in a range of 0.35 N to 0.6 N.

Because the distance between the ear hook 12 and the sound production component 11 increases in the wearing state of the earphone 10, the second area enclosed by the second closed curve is greater than the first area enclosed by the first closed curve. In some embodiments, to ensure that the sound production component 11 may extend into the cavum conchae and that the ear hook may fit better with the ear in the wearing state, a difference between the second area and the first area may be within a certain range. In some embodiments, the difference between the second area and the first area may be in a range of 20 $mm^2$ to 700 $mm^2$. In some embodiments, the difference between the second area and the first area may be in a range of 50 $mm^2$ to 700 $mm^2$. In some embodiments, the difference between the second area and the first area may be in a range of 50 $mm^2$ to 500 $mm^2$. In some embodiments, the difference between the second area and the first area may be in a range of 60 $mm^2$ to 400 $mm^2$. In some embodiments, the difference between the second area and the first area may be in a range of 70 $mm^2$ to 300 $mm^2$. In some embodiments, difference between the second area and the first area may be in a range of 80 $mm^2$ to 200 $mm^2$.

In some embodiments, in the non-wearing state (corresponding to the first projection with the first area formed by the earphone on the first plane), the ear hook 12 does not generate the clamping force to drive the sound production component 11 close to the first portion 121 of the ear hook. In the wearing state (corresponding to the second projection with the second area formed by the earphone on the sagittal plane of the human body), the ear hook 12 generates the clamping force to drive the sound production component 11 close to the first portion 121 of the ear hook. A magnitude of the difference between the second area and the first area may affect the clamping force that clamps the auricle of the user. In some embodiments, the larger the difference between the second area and the first area is, the smaller the clamping force on the auricle of the user may be; the smaller the difference between the second area and the first area is, the greater the clamping force on the auricle of the user may be. If the clamping force on the auricle of the user is too small, it may result in unstable wearing, and if the clamping force is too large, it may hinder adjustability after wearing and cause discomfort in the ear. To ensure stability and comfort in wearing, in some embodiments, the difference between the second area and the first area is in a range of 20 $mm^2$ to 700 $mm^2$, and in the wearing state, the clamping force may be in a range of 0.03 N to 1 N. In some embodiments, the difference between the second area and the first area is in a range of 50 $mm^2$ to 700 $mm^2$, and in the wearing state, the clamping force may be in a range of 0.05 N to 1 N. In some embodiments, the difference between the second area and the first area is in a range of 60 $mm^2$ to 500 $mm^2$, and in the wearing state, the clamping force may be in a range of 0.05 N to 0.8 N. In some embodiments, the difference between the second area and the first area is in a range of 70 $mm^2$ to 300 $mm^2$, and in the wearing state, the clamping force may be in a range of 0.08 N to 0.7 N. In some embodiments, the difference between the second area and the first area is in a range of 80 $mm^2$ to 200 $mm^2$, and in the wearing state, the clamping force may be in a range of 0.1 N to 0.6 N. In some embodiments, the clamping forces generated by the earphone corresponding to different dimensions may be achieved by designing the elastic property (e.g., a clamping coefficient) of the ear hook 12, as described elsewhere in the present disclosure.

Similar to the difference between the second area and the first area affecting the clamping force on the auricle of the user, a ratio of the first area to the second area also affects the clamping force on the auricle of the user. The smaller the ratio of the first area to the second area is, the smaller the clamping force on the auricle of the user may be; the larger the ratio of the first area to the second area is, the greater the clamping force on the auricle of the user may be. In some embodiments, to ensure stability and comfort in wearing, the ratio of the first area to the second area is in a range of 0.6 to 1, and in the wearing state, the clamping force may be in a range of 0.03 N to 1 N. In some embodiments, the ratio of the first area to the second area is in a range of 0.75 to 0.95, and in the wearing state, the clamping force may be in a range of 0.05 N to 0.8 N. In some embodiments, the ratio of the first area to the second area is in a range of 0.8 to 0.9, and in the wearing state, the clamping force may be in a range of 0.1 N to 0.7 N.

Referring again to FIG. 5A and FIG. 6, as mentioned above, considering differences in shapes and dimensions of ears of different users, designing a relative size of the first area relative to a projected area of the auricle on the sagittal plane of the human body can effectively improve the wearing effect of the earphone 10. Since different users may have differences in the shapes and dimensions of their ears, the present disclosure takes a range of an average of the projected area of the auricle on the sagittal plane of the human body as a reference, which is in a range of 1300 $mm^2$ to 1700 $mm^2$. In some embodiments, when the earphone 10 is in the non-wearing state, a ratio of the first area to the projected area of the auricle on the sagittal plane of the human body may be in a range of 0.6 to 0.97. In some embodiments, the ratio of the first area to the projected area of the auricle on the sagittal plane of the human body may be in a range of 0.7 to 0.95. The ratio of the first area to the projected area of the earlobe on the sagittal plane of the human body within the aforementioned ranges can ensure high sound production efficiency and wearing comfort of the earphone 10. It should be noted that for some users, the projected areas of their auricles on the sagittal plane of the human body may be smaller than 1300 $mm^2$ or larger than 1700 $mm^2$. In such cases, the ratio of the first area to the projected area of the auricle on the sagittal plane of the human body may be greater than 0.95 or smaller than 0.7. For example, the ratio of the first area to the projected area of the auricle on the sagittal plane of the human body may be in a range of 0.55 to 1.

In order to allow the entire or partial structure of the sound production component 11 to extend into the cavum conchae, for example, to extend to the position of the sound production component 11B relative to the ear as shown in FIG. 2, so as to form the acoustic model formed with the cavum conchae of the user as shown in FIG. 4, a relative size of the projected area of the sound production component 11 on the first plane 60 relative to the first area may be adjusted. In some embodiments, the projected area of the sound production component 11 on the first plane 60 is relatively small in the non-wearing state to ensure that the opening of the ear canal of the user is not blocked when wearing the earphone 10, and reduce load on the user during wearing, making it easier for the user to obtain environmental sounds or engage in daily communication. For example, the projected area of the sound production component 11 on the first plane 60 is not greater than half of the first area (i.e., the ratio is not greater than 0.5). In some embodiments, the ratio of the projected area of the sound production component 11 on the first plane 60 to the first area may range from 0.25 to 0.4, thereby reducing a sense of wearing for the user.

As shown in FIG. 5A, the first portion 121 of the ear hook includes a battery compartment 13. The battery compartment 13 is provided with a battery that is electrically connected to the sound production component 11. In some embodiments, the battery compartment 13 is located at one end of the first portion 121 that is away from the sound production component 11. The first end contour in the first projection is a projected contour of a free end of the battery compartment on the first plane 60.

In some embodiments, the ear hook has an arc-shaped structure that is adapted to a junction of the auricle and the head. When the user wears the earphone 10, the sound production component 11 and the battery compartment 13 may be located on the front and rear sides of the auricle, respectively. In this configuration, the end FE of the sound production component 11 extends toward the first portion 121 of the ear hook, which allows the entire or partial structure of the sound production component 11 to extend into the cavum conchae and cooperate with a side wall of the cavum conchae to form the cavity-like structure.

In some embodiments, the battery compartment 13 and the sound production component 11 form a lever-like structure with a certain point (e.g., the extremum point T1 of the ear hook in FIG. 8) on the ear hook as a pivot point. A dimension and weight of the battery compartment 13 may not be too large, otherwise it may affect the fit between the sound production component 11 and the cavum conchae. For example, in some embodiments, a ratio of a projected area of the battery compartment 13 on the first plane 60 to the first area may be smaller than the ratio of the projected area of the sound production component 11 on the first plane 60 to the first area, to ensure a balance of the lever-like structure and the fit between the sound production component 11 and the cavum conchae. Additionally, the dimension and weight of the battery compartment 13 may not be too small, otherwise it may cause the earphone 10 to tilt toward the front of the ear when worn, to affect stability. In some embodiments, the ratio of the projected area of the battery compartment 13 on the first plane 60 to the first area may be in a range of 0.12 to 0.28. In some embodiments, the ratio of the projected area of the battery compartment 13 on the first plane 60 to the first area may be in a range of 0.15 to 0.25, to optimize a weight distribution of the earphone 10, so that the earphone 10 does not easily fall off even during vigorous physical activity.

Referring to FIG. 7, in some embodiments, since the second area of the earphone 10 in the wearing state is greater than the first area in the non-wearing state, and the dimension and weight of the battery compartment 13 may not be too large to avoid affecting the fit between the sound production component 11 and the cavum conchae. The dimension and weight of the battery compartment 13 may not be too small to prevent the earphone 10 from tilting toward the front of the ear when worn, affecting stability. Therefore, considering the relationship between the first area and the second area, a ratio of the projected area of the battery compartment 13 on the sagittal plane of the human body to the second area may be in a range of 0.1 to 0.26. In some embodiments, the ratio of the projected area of the battery compartment 13 on the sagittal plane of the human body to the second area may be in a range of 0.13 to 0.23.

Due to the fit between the sound production component 11 and the cavum conchae in the wearing state, an excessively large dimension of the sound production component 11 may obstruct the ear (e.g., the opening of the ear canal), while an excessively small dimension of the sound production component 11 may increase the difficulty of arranging internal structures (e.g., a magnetic circuit, a circuit board) of the sound production component 11. In some embodiments, to ensure that the opening of the ear canal of the user is not blocked when wearing the earphone 10 and to reduce the load on the user during wearing, making it easier for the user to obtain environmental sounds or engage in daily communication, the ratio of the projected area of the sound production component 11 on the sagittal plane of the human body to the second area in the wearing state may be in a range of 0.15 to 0.45. In some embodiments, the ratio of the projected area of the sound production component 11 on the sagittal plane of the human body to the second area may be in a range of 0.2 to 0.35.

To ensure a wearing mode in which the earphone 10 extends into the cavum conchae, and that the sound production component 11 has a high sound production efficiency, while considering the relationship between the first area and the second area, in some embodiments, the ratio of the second area to the projected area of the auricle on the sagittal plane of the human body is in a range of 0.8 to 1.1 in the wearing state of the earphone 10. It should be noted that this ratio is based on the reference range of the average area of the auricle's projection on the sagittal plane of the human body, which is within a range of 1300 $mm^2$ to 1700 $mm^2$. For some users, the projected area of their auricles on the sagittal plane of the human body may be smaller than 1300 $mm^2$ or larger than 1700 $mm^2$. In such cases, the ratio of the first area to the projected area of the auricle on the sagittal plane of the human body may be greater than 1.1 or smaller than 0.8. For example, the ratio of the second area to the projected area of the auricle on the sagittal plane of the human body may be in a range of 0.65 to 1.3.

In addition to the projected areas of the sound production component 11 and/or the battery compartment 13 on the first plane 60, a position of a mass center (also referred to as a mass center position) of each component also have a significant influence on the stability of wearing the earphone 10.

Figure 8:
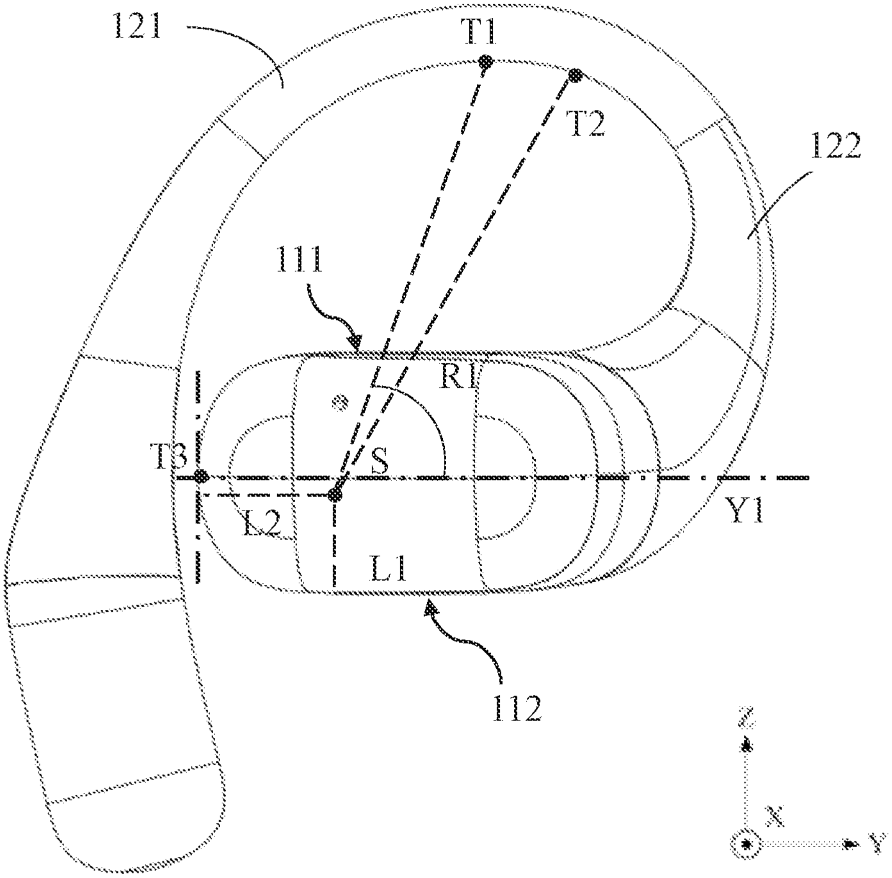
FIG. 8 is a schematic diagram illustrating an exemplary mass center of an earphone according to some embodiments of the present disclosure.

In some embodiments, as shown in FIG. 8, a distance from a mass center position S of the earphone 10 to the extremum point (e.g., the point T1) of the ear hook in the non-wearing state is also related to the stability and a sensation of foreign objects at the junction of the ear and the head of the user when the earphone 10 is worn. The extremum point of the ear hook may be determined in the following way. An inner contour of a projection curve of the earphone 10 on the sagittal plane of the human body in the wearing state (or an inner contour of the projection of the earphone 10 on the first plane in the non-wearing state) may be obtained. An extremum point (e.g., a maximum point) in the short axis direction Z of the inner contour may be determined as the extremum point of the ear hook. The manner for determining the extremum point in the width direction Z of the inner contour may be as follows. A coordinate system may be constructed. The long axis direction Y and the short axis direction Z of the sound production component may be used as a horizontal axis and a vertical axis of the coordinate system, respectively. A maximum point (e.g., where a first derivative is 0) of the inner contour of the projection curve in this coordinate system may be determined as the extremum point of the inner contour of the projection curve in the width direction Z.

In some embodiments, when the distance from the mass center position S of the earphone 10 to the extremum point T1 of the ear hook is too large, it may lead to poor fit between the sound production component 11 and the cavum conchae during wearing, which in turn affects the cavity-like structure and results in unstable wearing. Therefore, in some embodiments, the distance from the mass center position S of the earphone 10 to the extremum point of the ear hook may be not greater than 31 mm. As mentioned above, the earphone 10 may form the lever-like structure at the extremum point of the ear hook. When the distance from the mass center position S of the earphone 10 to the extremum point of the ear hook is too small, the stability of the lever-like structure is poor, resulting in instability during wearing. Therefore, the distance from the mass center position S of the earphone 10 to the extremum point of the ear hook may not be smaller than 24 mm. In summary, in some embodiments, the distance from the mass center position S of the earphone 10 to the extremum point of the ear hook is in a range of 24 mm to 31 mm. It should be noted that due to individual differences in sizes of the ears of the users, to accommodate a wider range of users, the distance from the mass center position S of the earphone 10 to the extremum point of the ear hook may be greater than 31 mm. Alternatively, in designing the earphone 10 for children or teenagers, the distance may be smaller than 24 mm, for example, the distance between the mass center position S of the earphone 10 and the extremum point of the ear hook may be in a range of 18 mm to 40 mm.

In some embodiments, as shown in FIG. 8, when the sound production component 11 has a rectangular or rectangular-like (e.g., runway-shaped) structure, the sound production component 11 has an upper side wall 111 and a lower side wall 112 that are parallel or approximately parallel to each other in the short axis direction of the sound production component 11. In some embodiments, due to the internal structure (e.g., the magnetic circuit, the circuit board, etc.) of the sound production component 11, the sound production component 11 in the earphone 10 has a relatively large mass. Therefore, the mass center position of the earphone 10 is close to a mass center position of the sound production component 11 or greatly influenced by the mass of the sound production component 11. To ensure good wearing comfort of the earphone 10, it is necessary to design a position relationship between the mass center position S of the earphone 10 and the sound production component 11 reasonably. In some embodiments, a distance L1 between the mass center position S of the earphone 10 and a lower surface of the sound production component 11 is related to the dimension of the sound production component 11 in its short axis direction Z. When the distance L1 between the mass center position S of the earphone 10 and the lower surface of the sound production component 11 is too large (or too small), it may result in excessively large dimensions of the leakage structures on the cavity-like structure shown in FIG. 4, which in turn affects the sound production efficiency of the sound production component 11. A distance between the mass center position S and a side wall of the sound production component 11 that faces or is close to the external ear canal of the user, as well as a distance between the mass center position S and a point of the sound production component 11 furthest away from the first end contour in the long axis direction, may also affect the sound production efficiency of the sound production component 11. In some embodiments, in the non-wearing state, the distance L1 between the mass center position S of the earphone 10 and the lower surface of the sound production component 11 is in a range of 2.5 mm to 6.5 mm. In some embodiments, the distance L1 between the mass center position S of the earphone 10 and the lower surface of the sound production component 11 is in a range of 3 mm to 5.5 mm. In some embodiments, a distance between the mass center position S of the earphone 10 and a side wall (a side where the housing is provided with the sound outlet) of the housing of the sound production component 11 that faces or is close to the external ear canal of the user is in a range of 2 mm to 8 mm, or in a range of 3.5 mm to 6.5 mm. In some embodiments, a distance L2 between the mass center position S of the earphone 10 and the point of the sound production component 11 furthest away from the first end contour in the longest axis direction (e.g., the distance from the mass center position S to the point T3) is in a range of 1.8 mm to 7 mm. In some embodiments, the distance L2 between the mass center position S of the earphone 10 and the point of the sound production component 11 furthest away from the first end contour in the longest axis direction is in a range of 3 mm to 6 mm.

In some embodiments, a shape of the internal contour of the earphone 10 depends on an included angle R1 between a line connecting the mass center position S of the earphone 10 and the extremum point of the ear hook and a long axis Y1 of the sound production component 11 in the first projection, and the shape of the internal contour is related to the wearing comfort of the user. Specifically, in order to ensure that the ear hook fits with the ear or the head of the user when the user wears the earphone 10, the included angle being too large or too small may lead to changes in the shape during wearing, thereby affecting the fit, and it may not be possible to form the cavity-like structure as shown in FIG. 4, which affects the sound production efficiency of the sound production component 11. Therefore, in some embodiments, in the non-wearing state, the included angle R1 between the line connecting the mass center position S of the earphone 10 and the extremum point of the ear hook and the long axis Y1 of the sound production component 11 in the first projection is in a range of 50° to 90°. In some embodiments, the included angle R1 may be in a range of 55° to 85°.

In some embodiments, the internal contour of the first projection of the earphone 10 also includes an upper vertex (e.g., a point T2) of the ear hook. In some embodiments, the upper vertex is the highest point of the internal contour in the vertical axis direction of the human body when the earphone 10 is worn. It should be noted that, depending on the shape of the ear of the user and the actual wearing mode, in some cases, the ears of some users may come into contact with or not contact with the upper vertex. In some embodiments, the upper vertex may be close to the extremum point, for example, a distance between the upper vertex and the extremum point may be within 15 mm. The upper vertex may affect a relative position of the sound production component 11 relative to the ear of the user when the earphone 10 is worn. Specifically, when a distance between the mass center position S of the earphone 10 and the upper vertex T2 of the ear hook is too large, the position of the sound production component 11 may be closer to the opening of the ear canal of the user when the user wears the earphone 10. In this case, the opening of the ear canal is partially blocked, and communication between the opening of the ear canal and the external environment may not be achieved, which goes against the original design intention of the earphone 10. When the distance between the mass center position S of the earphone 10 and the upper vertex T2 of the ear hook is too small, it may affect the sound production component 11 entering the cavum conchae (e.g., causing an excessively large gap between the sound production component 11 and the ear canal), which in turn affects the sound production efficiency of the sound production component 11. To ensure that the earphone 10 does not block the opening of the ear canal of the user while improving the acoustic effect of the earphone 10, in some embodiments, the distance between the mass center position S of the earphone 10 and the upper vertex of the ear hook is in a range of 20 mm to 38 mm. In some embodiments, the distance between the mass center position S of the earphone 10 and the upper vertex of the ear hook is in a range of 25 mm to 32.5 mm.

Figure 9:
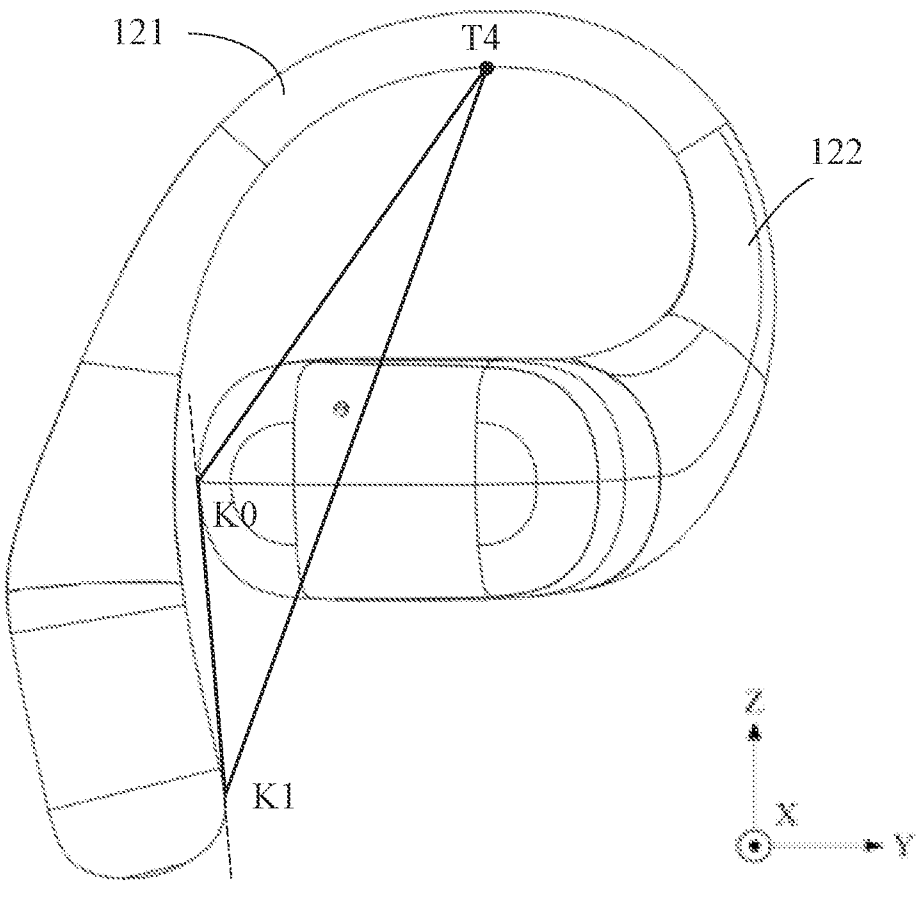
FIG. 9 is a schematic diagram illustrating an exemplary tangent segment of a first projection of an earphone according to some embodiments of the present disclosure.

Referring to FIG. 9, the tangent segment 50, which jointly defines the first closed curve with the first projection, is tangent to the first end contour at a first tangent point K0 and tangent to the second end contour at a second tangent point K1, respectively. A line connecting the first tangent point K0, the second tangent point K1, and an extremum point (e.g., a point T4) of the projection of the ear hook on the first plane may form a triangle. Since positions of the first tangent point K0 and the second tangent point K1 are related to the first area of the first closed curve, a change in an area of the triangle formed by connecting the first tangent point K0, the second tangent point K1, and the extremum point of the projection of the ear hook on the first plane may result in a change in the first area. For example, an increase in the area of the triangle corresponds to a decrease in the first area, thereby affecting the wearing comfort of the user.

In some embodiments, considering the wearing comfort of the user and the practical range of the first area of the first closed curve, when the earphone 10 is in the non-wearing state, the area of the triangle formed by the first tangent point K0, the second tangent point K1, and the extremum point of the projection of the ear hook on the first plane is in a range of 110 $mm^2$ to 230 $mm^2$. In some embodiments, the area of the triangle formed by the first tangent point K0, the second tangent point K1, and the extremum point of the projection of the ear hook on the first plane is in a range of 150 $mm^2$ to 190 $mm^2$, so as to ensure that the range of the first area of the first closed curve is in a range of 1150 $mm^2$ to 1350 $mm^2$.

Referring to FIG. 9, in some embodiments, the positions of the first tangent point K0 and the second tangent point K1 are close to the inner side and the outer side of the cavum conchae clamped by the sound production component 11 and the ear hook, respectively. When the user wears the earphone 10, a dimension of the line (i.e., the tangent segment 50) connecting the first tangent point K0 and the second tangent point K1 is related to the dimension of the cavum conchae. Therefore, the positions of the upper vertex T2, the first tangent point K0, and the second tangent point K1 may jointly determine the force exerted on the cavum conchae when the user wears the earphone 10, which is related to the wearing experience of the user. In some embodiments, a length of the tangent segment 50 is in a range of 11 mm to 25 mm, a distance between the first tangent point K0 and the extremum point of the projection of the ear hook on the first plane is in a range of 31 mm to 58 mm, and a distance between the first tangent point K0 and the extremum point of the projection of the ear hook on the first plane is in a range of 18 mm to 41 mm. If a line segment of the triangle is too long, it may result in poor clamping of the cavum conchae, resulting in poor stability during wear and an increased risk of detachment. On the other hand, the sound production component 11 and the ear hook are driven by elasticity, to provide] a force that drive them close together. If a line segment of the triangle is too short, it may cause discomfort on the side of the cavum conchae or the auricle close to the head, affecting the wearing experience of the earphone 10. In some embodiments, the length of the tangent segment 50 is in a range of 14 mm to 22 mm. In some embodiments, when the earphone 10 is in the non-wearing state, the distance between the first tangent point K0 and the extremum point of the projection of the ear hook on the first plane is in a range of 35 mm to 55 mm. In some embodiments, when the earphone 10 in the non-wearing state, the distance between the first tangent point K0 and the extremum point of the projection of the ear hook on the first plane is in a range of 22 mm to 38 mm. Furthermore, a change in a length of any line segment of the triangle formed by the upper vertex T2, the first tangent point K0, and the second tangent point K1 may lead to changes in the internal angles of the triangle. For the same reasons as mentioned above, in some embodiments, in the triangle formed by the first tangent point K0, the second tangent point K1, and the extremum point of the projection of the ear hook on the first plane, an included angle formed at the first tangent point K0 is in a range of 17° to 37°, an included angle formed at the second tangent point K1 is in a range of 110° to 155°, and an included angle formed at the extremum point of the projection of the ear hook on the first plane is in a range of 9° to 24°. To further enhance the wearing experience of the user and stability, in some embodiments, the included angle formed at the first tangent point K0 is in a range of 20° to 35°, the included angle formed at the second tangent point K1 is in a range of 120° to 150°, and the included angle formed at the extremum point of the projection of the ear hook on the first plane is in a range of 10° to 22°.

Referring to FIG. 5A, in some embodiments, when the earphone 10 is in the non-wearing state, the inner contour, the first end contour, the second end contour, and the tangent segment 50 connecting the first end contour and the second end contour jointly define a third closed curve. For convenience of understanding, similar to the first area, in some embodiments, an area enclosed by the third closed curve defined by the tangent segment 50, the inner contour, the first end contour, and the second end contour is considered as a third projected area (also referred to as a third area). The third closed curve may reflect the degree of fit of the sound production component 11 and the ear hook with the ear when the earphone 10 is worn. A difference between the first area and the third area equals the projected area of the earphone 10 on the first plane (i.e., a sum of the projected area of the sound production component 11 on the first plane and the projected area of the ear hook on the first plane).

Considering the relative position of the sound production component 11 relative to the ear canal (e.g., the cavum conchae) of the user may affect the count and the sizes of the leakage structures formed by the sound production component 11 and the cavum conchae of the user, and the sizes of these leakage structures directly impact sound quality. Specifically, when the third area is too large, the sound production component 11 may fail to abut against the edge of the cavum conchae, leading to an increase in sound components radiated directly outward from the sound production component 11. As a result, less sound reaches the listening position, leading to a decrease in the sound production efficiency of the sound production component 11. In some embodiments, considering the overall structure of the earphone 10 and the requirements for the shape of the ear hook to adapt to the space between the ear and the head, the third area enclosed by the third closed curve is not greater than 600 $mm^2$. In some embodiments, the too small third area may lead to a too small distance between the extremum point of the ear hook and the sound production component 11 or a too large clamping force between the ear hook and the auricle of the user. Therefore, in some embodiments, the third area is not smaller than 200 $mm^2$. In summary, in some embodiments, the third area of the third closed curve is in a range of 200 $mm^2$ to 600 $mm^2$. In some embodiments, the too large third area may result in reduced effectiveness of the clamping of the ear hook, in this case, the weight of the earphone 10 is supported by the upper edge of the ear of the user, which reduces wearing comfort. To ensure user comfort, the third area is not greater than 500 $mm^2$. To reduce the sound radiated directly outward by the sound production component 11, ensure the listening volume at the listening position (e.g., the opening of the ear canal), and improve wearing comfort during user wear, in some embodiments, the third area of the third closed curve is in a range of 300 $mm^2$ to 500 $mm^2$.

In some embodiments, when the earphone 10 is in the wearing state, the inner contour, the first end contour, the second end contour, and the tangent segment 50 connecting the first end contour and the second end contour jointly define a fourth closed curve. Similar to the third area, in some embodiments, an area enclosed by the fourth closed curve defined by the inner contour, the tangent segment 50, the first end contour, and the second end contour is considered as a fourth projected area (also referred to as a fourth area). A difference between the fourth area and the third area may reflect a degree of fit of the sound production component 11 and the ear hook with the ear when the earphone 10 is worn.

In some embodiments, due to the elasticity of the ear hook to a certain extent, the distance between the ear hook and the sound production component 11 increases when the earphone 10 is worn. Therefore, the fourth area formed by the earphone 10 in the wearing state is greater than the third area formed in the non-wearing state. In some embodiments, when the fourth area is excessively large, the sound production component 11 may fail to abut against the edge of the cavum conchae, leading to an increase in sound components radiated directly outward from the sound production component 11. As a result, less sound reaches the listening position, thereby leading to a decrease in the sound production efficiency of the sound production component 11. In some embodiments, considering the overall structure of the earphone 10 and the requirements for the shape of the ear hook to adapt to the space between the ear and the head, the fourth area enclosed by the fourth closed curve is not greater than 900 $mm^2$. In some embodiments, the excessively small fourth area may lead to an excessively small distance between the extremum point of the ear hook and the sound production component 11 or an excessive clamping force between the ear hook and the auricle of the user. Therefore, in some embodiments, the fourth area is not smaller than 350 $mm^2$.

In some embodiments, the fourth area of the fourth closed curve is in a range of 350 $mm^2$ to 900 $mm^2$. In some embodiments, the excessively large fourth area may reduce the clamping effectiveness of the ear hook and result in the weight of the earphone 10 being supported by the upper edge of the ear of the user, which reduces wearing comfort. To ensure user comfort and ensure listening volume at the listening position (e.g., the opening of the ear canal), while also enhancing comfort during user wear, in some embodiments, the fourth area of the fourth closed curve is in a range of 450 $mm^2$ to 750 $mm^2$.

An excessively small ratio of the third area to the fourth area may lead to insufficient clamping force on the auricle of the user, resulting in instability during wear. Conversely, an excessively large ratio of the third area to the fourth area may indicate poor elasticity of the ear hook, making it inconvenient for the user to wear, and may cause a foreign body sensation in the ear after wearing. Therefore, in some embodiments, to ensure appropriate elasticity of the ear hook, the ratio of the third area of the third closed curve to the fourth area of the fourth closed curve is in a range of 0.5 to 0.85. To further enhance the fit of the sound production component 11 and the ear hook with the ear and increase stability during wear, in some embodiments, the ratio of the third area to the fourth area is in a range of 0.59 to 0.77.

Figure 10:
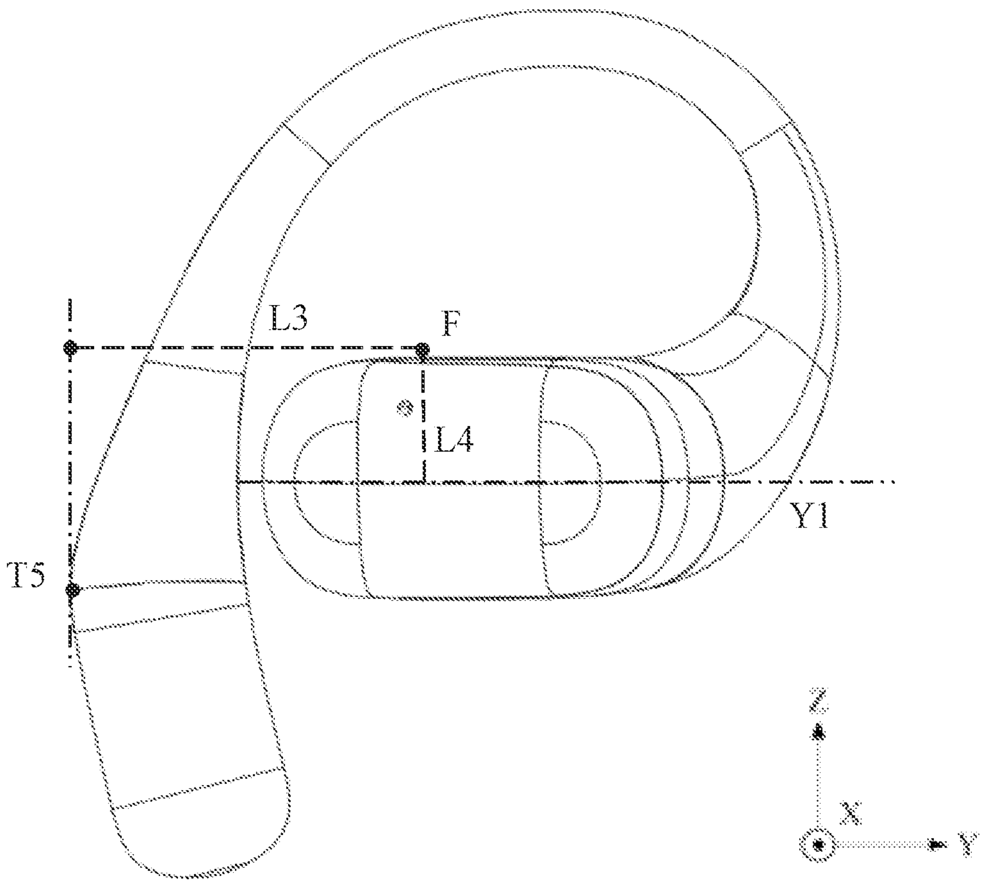
FIG. 10 is a schematic diagram illustrating an exemplary mass center of a hook of an earphone according to some embodiments of the present disclosure.

Referring to FIG. 10, in some embodiments, to ensure comfort during the wearing of the earphone 10, it is necessary to consider a distribution of the weight of the ear hook. To reduce the pressure exerted by pivot points (e.g., the extremum point or the upper vertex) of the ear hook on the auricle, a position of a mass center (e.g., point F) of the ear hook may be set near the sound production component 11. In this way, after the sound production component 11 extends into the cavum conchae, the cavum conchae may simultaneously support a portion of the weight of the sound production component 11 and the ear hook, reducing the pressure of the pivot point of the ear hook on the auricle. The mass center of the ear hook here refers to a center of mass of the entire ear hook (including the battery compartment 13 but excluding the sound production component 11). As shown in FIG. 10, a point T5 represents a point on the outer contour of the first projection that is farthest from the sound production component 11 along the long axis of the sound production component 11. In some embodiments, considering a weight relationship between the ear hook and the sound production component 11, a distance L3 between the mass center position of the ear hook and the point T5 in the long axis direction of the sound production component 11 is in a range of 22 mm to 49 mm. In some embodiments, to drive the mass center position of the ear hook close to the contact area between the sound production component 11 and the edge of the cavum conchae (for better support of the ear hook by the cavum conchae), the distance L3 between the mass center position of the ear hook and point T5 is in a range of 25 mm to 35 mm.

The mass center position of the ear hook is also related to the shape of the ear hook. In some embodiments, when the earphone 10 is in the non-wearing state, if a distance L4 between the mass center position of the ear hook and the long axis Y1 of the sound production component 11 in the short axis direction of the sound production component 11 is too large, the extremum point of the ear hook may be far from the sound production component 11, which may lead to instability in wearing the earphone 10. At the same time, the distance between the mass center of the ear hook and the cavum conchae increases when the ear hook is in the wearing state, which is not conducive to the support of the ear hook by the cavum conchae. Conversely, if the distance L4 between the mass center position of the ear hook and the long axis Y1 of the sound production component 11 in the short axis direction of the sound production component 11 is too small, in the wearing state, the ear hook (e.g., the first portion) may cause friction between the auricle and head of the user, resulting in pressure or foreign body sensation. Therefore, in some embodiments, the distance L4 between the mass center position of the ear hook and the long axis Y1 of the sound production component 11 in the short axis direction of the sound production component 11 is in a range of 3 mm to 13 mm. In some embodiments, the distance L4 is in a range of 4 mm to 11 mm.

Figure 11A:
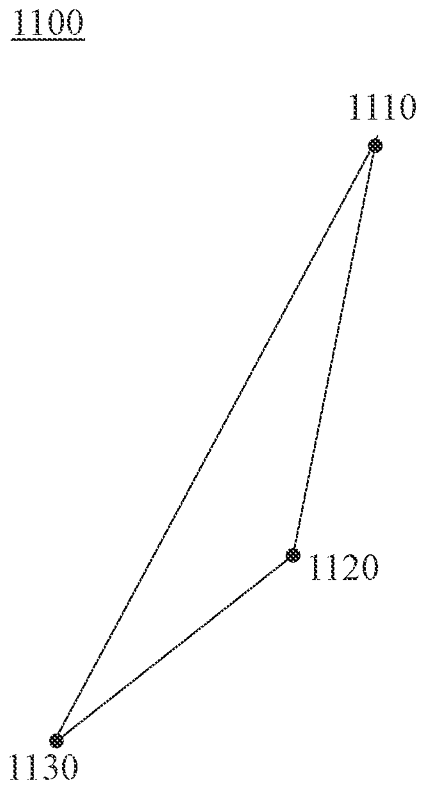
FIG. 11A is a schematic diagram illustrating an exemplary triangle formed by mass centers of an ear hook, a battery compartment, and a sound production component of an earphone according to some embodiments of the present disclosure.

Referring to FIG. 11A, three vertices of a triangle 1100 in the figure correspond to a mass center 1110 of the ear hook, a mass center 1120 of the sound production component, a mass center 1130 of the battery compartment, of the earphone 10, respectively. The triangle 1100 formed by the three mass centers influences the stability and comfort of wearing the earphone 10. In addition, a distribution of the three mass centers also affects the mass center position of the earphone 10. An excessively long line segment in the triangle 1100 may result in poor stability when wearing the earphone 10. For example, if a distance between the mass center 1130 of the battery compartment and the mass center 1110 of the ear hook is too short, it may lead to a tendency for the earphone 10 to tilt towards the sound production component 11 when the earphone 10 is worn. As wearing time increases or when the user wears the earphone 10 while moving, the sound production component 11 may tilt or even fall off, affecting the wearing experience of the user. If the distance between the mass center 1130 of the battery compartment and the mass center 1110 of the ear hook is too long, it may lead to a tendency for the earphone 10 to tilt towards the location of the battery compartment 13 when worn. As wearing time increases or when the user wears the earphone 10 while moving, the sound production component 11 may similarly tilt or even fall off, affecting the wearing experience of the user. Considering wearing stability, in some embodiments, when the earphone 10 is in the non-wearing state, a relative distance between the mass center 1120 of the sound production component and the mass center 1110 of the ear hook is in a range of 15 mm to 40 mm. When the earphone 10 in the non-wearing state, the relative distance between the mass center 1130 of the battery compartment and the mass center 1110 of the ear hook is in a range of 40 mm to 62 mm. A relative distance between the mass center 1120 of the sound production component and the mass center 1130 of the battery compartment is in a range of 11 mm to 35 mm. In some embodiments, to further improve user comfort when wearing the earphone 10, when the earphone 10 in the non-wearing state, the relative distance between the mass center 1120 of the sound production component and the mass center 1110 of the ear hook is in a range of 20 mm to 35 mm; the relative distance between the mass center 1130 of the battery compartment and the mass center 1110 of the ear hook is in a range of 35 mm to 55 mm; the relative distance between the mass center 1120 of the sound production component and the mass center 1130 of the battery compartment is in a range of 15 mm to 30 mm. To improve wearing stability, in some embodiments, in the wearing state, the relative distance between the mass center 1120 of the sound production component and the mass center 1130 of the battery compartment is in a range of n 20 mm to 40 mm. In some embodiments, in the wearing state, the relative distance between the mass center 1120 of the sound production component and the mass center 1130 of the battery compartment is in a range of 25 mm to 35 mm. In some embodiments, to further improve user comfort and stability when wearing the earphone, in the wearing state, the relative distance between the mass center 1120 of the sound production component and the mass center 1130 of the battery compartment is between 20 mm and 30 mm. In the non-wearing state, for convenience of measurement, the relative distances between the mass centers (the mass center 1110 of the ear hook, the mass center 1120 of the sound production component, and the mass center 1130 of the battery compartment) of the earphone 10 may be approximated distances between projection points formed on the first plane by mass centers of various parts (i.e., the ear hook, the sound production component, and the battery compartment) of the earphone 10. In the wearing state, the relative distances between the mass centers (the mass center 1110 of the ear hook, the mass center 1120 of the sound production component, and the mass center 1130 of the battery compartment) of the earphone 10 may be approximated as distances between projection points formed on the sagittal plane of the human body by the mass centers the various parts (i.e., the ear hook, the sound production component, and the battery compartment) of the earphone 10. It should be noted that the relative distances between the mass centers of the earphone 10 here may refer to three-dimensional distances in three-dimensional space, and the approximated distances are relative distances (two-dimensional distances) between the projection points of the mass centers on corresponding planes (the first plane or the sagittal plane). In the present disclosure, on the premise that differences between the three-dimensional distances and the relative distances between the projection points are not greater than 20%, the distances between the projection points may be approximated as the three-dimensional distances.

In some embodiments, the earphone 10 may include both the wearing state and the non-wearing state, and a difference between the distance from the mass center 1120 of the sound production component to the mass center 1130 of the battery compartment in the wearing state and the distance from the mass center 1120 of the sound production component to the mass center 1130 of the battery compartment in the non-wearing state needs to be within a certain range. If the aforementioned difference is too small, the clamping force may be too weak, which may result in ineffective clamping to the sides of the ear 100 after wearing, and it may lead to an excessively large gap between the sound production component 11 and the ear canal 102, i.e., an excessively large opening of the formed cavity-like structure, thereby reducing the listening index. In some embodiments, to ensure better listening index of the earphone in the wearing state, the difference between the distance from the mass center 1120 of the sound production component to the mass center 1130 of the battery compartment in the wearing state and the distance from the mass center 1120 of the sound production component to the mass center 1130 of the battery compartment in the non-wearing state may be not smaller than 1 mm. In some embodiments, to ensure better listening index of the earphone in the wearing state, the difference between the distance from the mass center 1120 of the sound production component to the mass center 1130 of the battery compartment in the wearing state and the distance from the mass center 1120 of the sound production component to the mass center 1130 of the battery compartment in the non-wearing state may be not smaller than 1.2 mm. If the aforementioned difference is too large, the clamping force may be too strong, which may result in excessive restriction of the ear, affecting wearing comfort. In some embodiments, to ensure better wearing comfort of the earphone in the wearing state, the difference between the distance from the mass center 1120 of the sound production component to the mass center 1130 of the battery compartment in the wearing state and the distance from the mass center 1120 of the sound production component to the mass center 1130 of the battery compartment in the non-wearing state may be not greater than 10 mm. In some embodiments, to ensure better wearing comfort of the earphone in the wearing state, the difference between the distance from the mass center 1120 of the sound production component to the mass center 1130 of the battery compartment in the wearing state and the distance from the mass center 1120 of the sound production component to the mass center 1130 of the battery compartment in the non-wearing state may be not greater than 8 mm. In some embodiments, to ensure better wearing comfort of the earphone in the wearing state, the difference between the distance from the mass center 1120 of the sound production component to the mass center 1130 of the battery compartment in the wearing state and the distance from the mass center 1120 of the sound production component to the mass center 1130 of the battery compartment in the non-wearing state may be not greater than 5 mm.

In some embodiments, a change in a length of a line segment (a distance between two mass centers) in the triangle 1100 formed by the mass center 1110 of the ear hook, the mass center 1120 of the sound production component, and the mass center 1130 of the battery compartment may lead to a change in the internal angles of the triangle 1100, thus affecting the actual wearing experience of the earphone 10. For example, if the included angle formed at the mass center 1120 of the sound production component in the triangle 1000 is too large or too small, it may result in a change in the lever-like structure formed between the sound production component 11 and the ear hook, affecting the wearing experience of the user. For similar reasons as mentioned above, in some embodiments, when the earphone 10 is in the non-wearing state, in the triangle 1000 formed by connecting the mass center 1120 of the sound production component, the mass center 1110 of the ear hook, and the mass center 1130 of the battery compartment as the vertices, the included angle formed at the mass center 1130 of the battery compartment is in a range of 12° to 22°; the included angle formed at the mass center 1120 of the sound production component is in a range of 111° to 164°; and the included angle formed at the mass center 1110 of the ear hook is in a range of 11° to 24°. In some embodiments, in the triangle 1100, the included angle formed at the mass center 1130 of the battery compartment is in a range of 15° to 25°; the included angle formed at the mass center 1120 of the sound production component is in a range of 130° to 160°; and the included angle formed at the mass center 1110 of the ear hook is in a range of 12° to 22°.

In some embodiments, in the non-wearing state, a minimum distance from the sound production component 11 to the first portion of the ear hook needs to be within a certain range. It should be noted that the minimum distance here from the sound production component 11 to the first portion of the ear hook refers to a smallest distance between a region (i.e., the at least one clamping region) clamped on both sides of the cavum conchae of the user by the sound production component 11 and a region (i.e., a region near the ear hook clamping point EP) on the first portion of the ear hook. In some embodiments, for convenience of description, the minimum distance from the sound production component 11 to the first portion of the ear hook may be understood as the distance from the center of the at least one clamping region CC to the ear hook clamping point EP. If the aforementioned minimum distance is too large, it may result in ineffective clamping (i.e., reduced wearing stability) on both sides of the ear 100 after wearing, and it may lead to a too large gap between the sound production component 11 and the cavum conchae 102, i.e., an excessively large opening of the formed cavity-like structure, which in turn reduces the listening index. In some embodiments, to ensure better listening index of the earphone in the wearing state, in the non-wearing state, the minimum distance from the sound production component 11 to the first portion of the ear hook may be not greater than 3 mm. In some embodiments, to increase wearing stability, in the non-wearing state, the minimum distance from the sound production component 11 to the first portion of the ear hook may be not greater than 2.6 mm. In some embodiments, to achieve a more appropriate opening size for the cavity-like structure formed by the sound production component 11 and the cavum conchae 102, in the non-wearing state, the minimum distance from the sound production component 11 to the first portion of the ear hook may be not greater than 2.2 mm.

In some embodiments, in the wearing state, the minimum distance from the sound production component 11 to the first portion of the ear hook needs to be within a certain range. If the aforementioned minimum distance is too small, it may lead to a strong oppression on the ear 100 of the user when the earphone 10 is worn, making it difficult to adjust the wearing position after wearing, and it may also result in the side wall of the sound production component 11 fitting tightly with the upper edge of the cavum conchae 102, thereby generating the gaps with too small sizes or relatively few gaps between the side wall of the sound production component 11 and the cavum conchae 102, in turn resulting in poor sound leakage reduction effect. In some embodiments, to meet wearing requirements, in the wearing state, the minimum distance from the sound production component 11 to the first portion of the ear hook may be not smaller than 2 mm. In some embodiments, to improve the sound leakage reduction effect, in the wearing state, the minimum distance from the sound production component 11 to the first portion of the ear hook may be not smaller than 2.5 mm. In some embodiments, to further increase adjustability after wearing, in the wearing state, the minimum distance from the sound production component 11 to the first portion of the ear hook may be not smaller than 2.8 mm.

In some embodiments, the earphone 10 may include the wearing and non-wearing states, and a difference between the minimum distance from the sound production component 11 to the first portion of the ear hook in the wearing state and the minimum distance from the sound production component 11 to the first portion of the ear hook in the non-wearing state needs to be within a certain range. It should be noted that the difference between the minimum distances corresponding to the wearing state and the non-wearing state may correspond to the pulled-away distance. If the aforementioned difference is too small, according to Equation (1), the clamping force may be too small, resulting in ineffective clamping on both sides of the ear 100 after wearing, and it may also lead to a too large gap between the sound production component 11 and the cavum conchae 102, i.e., an excessively large opening of the formed cavity-like structure, which in turn reduces the listening index. In some embodiments, to ensure better listening index of the earphone in the wearing state, the difference between the minimum distance from the sound production component 11 to the first portion of the ear hook in the wearing state and the minimum distance from the sound production component 11 to the first portion of the ear hook in the non-wearing state may be not smaller than 1 mm. In some embodiments, to increase wearing stability, the difference between the minimum distance from the sound production component 11 to the first portion of the ear hook in the wearing state and the minimum distance from the sound production component 11 to the first portion of the ear hook in the non-wearing state may be not smaller than 1.3 mm. In some embodiments, to achieve a more appropriate opening size for the cavity-like structure formed by the sound production component 11 and the cavum conchae 102, the difference between the minimum distance from the sound production component 11 to the first portion of the ear hook in the wearing state and the minimum distance from the sound production component 11 to the first portion of the ear hook in the non-wearing state may be not smaller than 1.5 mm.

In some embodiments, when the clamping coefficient of the clamping point CP is determined, in the non-wearing state, the included angle between a first connection line from the center CC of the at least one clamping region to the clamping point CP and a second connection line from the ear hook clamping point EP to the clamping point CP needs to be within a certain range, so that the earphone may provide appropriate clamping force to the ear 100 in the wearing state and placing the sound production component 11 in an expected position within the cavum conchae 102. When the clamping coefficient of the clamping point CP is consistent with the shape and dimension of the sound production component 11, if the aforementioned included angle is too large, it may result in ineffective clamping on both sides of the ear 100 after wearing, and it may also lead to a too large gap between the sound production component 11 and the cavum conchae 102, i.e., an excessively large opening of the formed cavity-like structure, which in turn reduces the listening index. When the clamping coefficient of the clamping point CP is consistent with the shape and dimension of the sound production component 11, if the aforementioned included angle is too small, it may result in a large difference between the included angle formed by first connection line and the second connection line in the wearing state and the included angle formed by first connection line and the second connection line in the non-wearing state, causing the clamping force of the ear hook 12 on the ear 100 to be too great in the wearing state, leading to a strong oppression on the ear 100 of the user after wearing, making it difficult to adjust the wearing position after wearing. In addition, it may also result in the side wall of the sound production component 11 fitting tightly with the upper edge of the cavum conchae 102, to generate the gaps with too small sizes or relatively few gaps between the side wall of the sound production component 11 and the cavum conchae 102, resulting in poor sound leakage reduction effect. In some embodiments, to meet wearing requirements, in the non-wearing state, the included angle between the first connection line from the center CC of the at least one clamping region to the clamping point CP and the second connection line from the ear hook clamping point EP to the clamping point CP may be in a range of 3° to 9°. In some embodiments, to increase adjustability after wearing, in the non-wearing state, the included angle between the first connection line from the center CC of the at least one clamping region to the clamping point CP and the second connection line from the ear hook clamping point EP to the clamping point CP may be in a range of 3.1° to 8.4°. In some embodiments, to increase wearing stability, in the non-wearing state, the included angle between the first connection line from the center CC of the at least one clamping region to the clamping point CP and the second connection line from the ear hook clamping point EP to the clamping point CP may be in a range of 3.8° to 8°. In some embodiments, to ensure better listening index of the earphone in the wearing state, in the non-wearing state, the included angle between the first connection line from the center CC of the at least one clamping region to the clamping point CP and the second connection line from the ear hook clamping point EP to the clamping point CP may be in a range of 4.5° to 7.9°. In some embodiments, to further improve the sound leakage reduction effect, in the non-wearing state, the included angle between the first connection line from the center CC of the at least one clamping region to the clamping point CP and the second connection line from the ear hook clamping point EP to the clamping point CP may be in a range of 4.6° to 7°.

In some embodiments, when the clamping coefficient of the clamping point CP and the shape and dimension of the earphone 10 are determined, in the wearing state, the included angle between the first connection line from the center CC of the at least one clamping region to the clamping point CP and the second connection line from the ear hook clamping point EP to the clamping point CP needs to be within a certain range to provide appropriate clamping force to the ear 100 and place the sound production component 11 in the expected position within the cavum conchae 102. When the clamping coefficient of the clamping point CP and the shape and dimension of the earphone 10 are consistent, if the aforementioned included angle is too small, it may result in a strong oppression on the ear 100 of the user after wearing, making it difficult to adjust the wearing position after wearing, and it may also result in the side wall of the sound production component 11 fitting tightly with the upper edge of the cavum conchae 102, to generate the gaps with too small sizes or relatively few gaps between the side wall of the sound production component 11 and the cavum conchae 102, resulting in poor sound leakage reduction effect. When the clamping coefficient of the clamping point CP and the shape and dimension of the earphone 10 are consistent, if the aforementioned included angle is too large, it may result in ineffective clamping on both sides of the ear 100 after wearing, and it may also lead to a too large gap between the sound production component 11 and the cavum conchae 102, i.e., an excessively large opening of the formed cavity-like structure, which in turn reduces the listening index. In some embodiments, to meet wearing requirements, in the wearing state, the included angle between the first connection line from the center of the at least one clamping region CC to the clamping point CP and the second connection line from the ear hook clamping point EP to the clamping point CP may be in a range of 6° to 12°. In some embodiments, to increase adjustability after wearing, in the wearing state, the included angle between the first connection line from the center of the at least one clamping region CC to the clamping point CP and the second connection line from the ear hook clamping point EP to the clamping point CP may be in a range of 6.3° to 10.8°. In some embodiments, to increase wearing stability, in the wearing state, the included angle between the first connection line from the center of the at least one clamping region CC to the clamping point CP and the second connection line from the ear hook clamping point EP to the clamping point CP may be in a range of 7° to 10.5°. In some embodiments, to ensure better listening index of the earphone in the wearing state, in the wearing state, the included angle between the first connection line from the center of the at least one clamping region CC to the clamping point CP and the second connection line from the ear hook clamping point EP to the clamping point CP may be in a range of 7.3° to 10°. In some embodiments, to further improve the sound leakage reduction effect, in the wearing state, the included angle between the first connection line from the center of the at least one clamping region CC to the clamping point CP and the second connection line from the ear hook clamping point EP to the clamping point CP may be in a range of 8° to 9.8°.

In some embodiments, the earphone 10 may include the wearing state and the non-wearing state, and the difference between the included angle formed by the connection lines in the wearing state and the included angle formed by the connection lines in the non-wearing state needs to be within a certain range. It should be noted that the included angle formed by the connection lines in the wearing state is the included angle between the first connection line from the center CC of the at least one clamping region to the clamping point CP and the second connection line from the ear hook clamping point EP to the clamping point CP in the wearing state; the included angle formed by the connection lines in the non-wearing state is the included angle between the first connection line from the center CC of the at least one clamping region to the clamping point CP and the second connection line from the ear hook clamping point EP to the clamping point CP in the non-wearing state. When the clamping coefficient of the clamping point CP is consistent, if the difference is too small, the clamping force may be too small, making it unable to effectively clamp on both sides of the ear 100 after wearing, and it may also result in a too large gap between the sound production component 11 and the cavum conchae 102, i.e., an excessively large opening of the formed cavity-like structure, thereby reducing the listening index. When the clamping coefficient of the clamping point CP is consistent, if the difference is too large, the clamping force may be too large, resulting in a strong oppression on the ear 100 of the user after wearing, making it difficult to adjust the wearing position after wearing, and it may also result in the side wall of the sound production component 11 fitting tightly with the upper edge of the cavum conchae 102, to generate the gaps too small sizes or relatively few gaps between the side wall of the sound production component 11 and the cavum conchae 102, resulting in poor sound leakage reduction effect. In some embodiments, to meet wearing requirements, the difference between the included angle formed by the connection lines in the wearing state and the included angle formed by the connection lines in the non-wearing state may be in a range of 2° to 4°. In some embodiments, to increase adjustability after wearing, the difference between the included angle formed by the connection lines in the wearing state and the included angle formed by the connection lines in the non-wearing state may be in a range of 2.1° to 3.8°. In some embodiments, to increase post-wearing stability, the difference between the included angle formed by the connection lines in the wearing state and the included angle formed by the connection lines in the non-wearing state may be in a range of 2.3° to 3.7°. In some embodiments, to ensure better listening index of the earphone in the wearing state, the difference between the included angle formed by the connection lines in the wearing state and the included angle formed by the connection lines in the non-wearing state may be in a range of 2.5° to 3.6°. In some embodiments, to further improve the sound leakage reduction effect, the difference between the included angle formed by the connection lines in the wearing state and the included angle formed by the connection lines in the non-wearing state may be in a range of 2.6° to 3.4°.

Figure 11B:
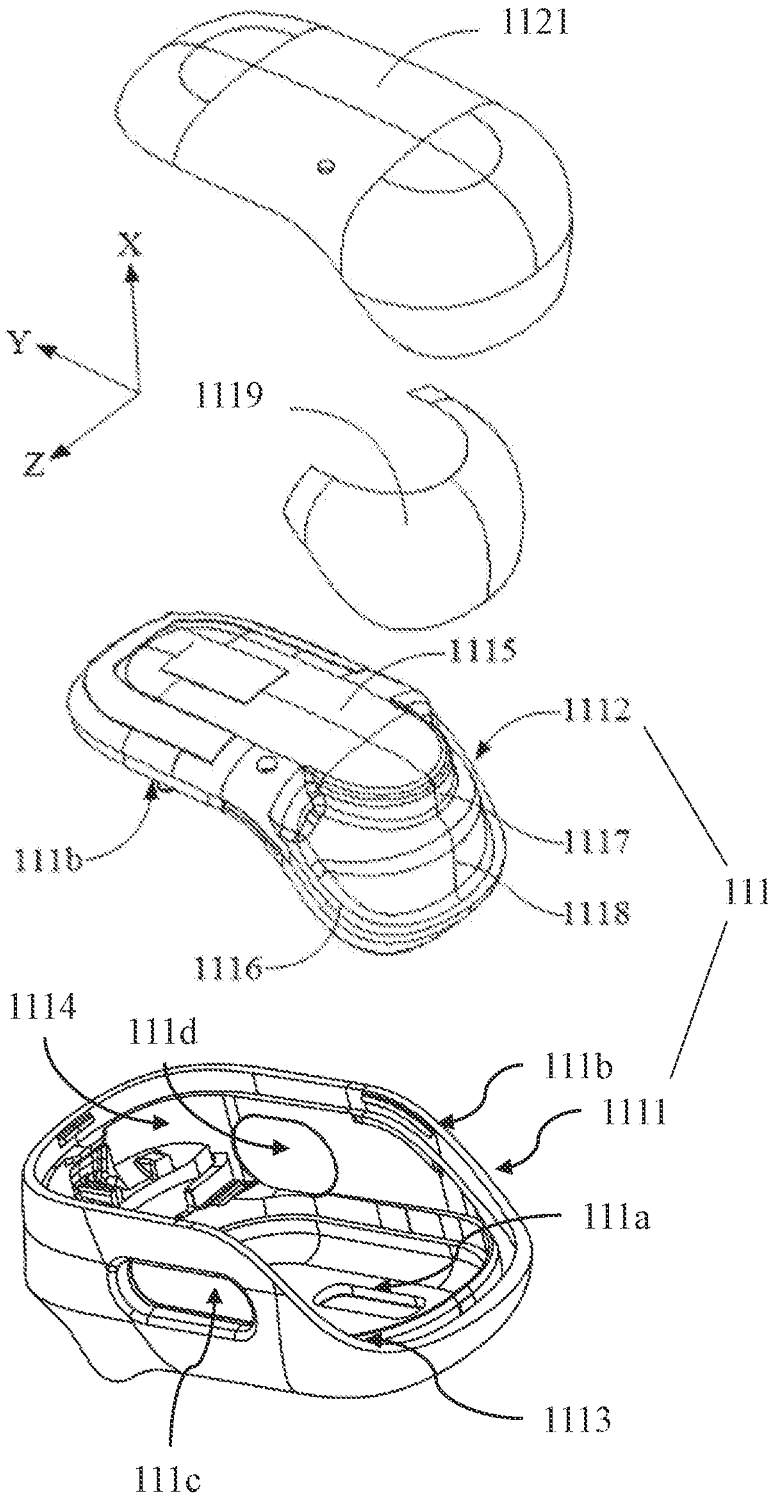
FIG. 11B is a schematic diagram illustrating an exemplary exploded view of the sound production component of the earphone shown in FIG. 3.

FIG. 11B is a schematic diagram illustrating an exemplary exploded view of the sound production component according to some embodiments of the present disclosure. As shown in FIG. 11B, in some embodiments, a flexible material is provided at the at least one clamping region and/or an inner side of the at least one clamping region of the housing 111 that inserts into the cavum conchae 102 of the user, and a Shore hardness of the flexible material needs to be within a certain range. If the Shore hardness of the flexible material is too high, it may lead to a deterioration in comfort in the wearing state. In some embodiments, to meet wearing requirements, the Shore hardness of the flexible material may be in a range of 0 HA to 40 HA. In some embodiments, to improve comfort, the Shore hardness of the flexible material may be in a range of 0 HA to 20 HA.

The flexible material may be a flexible embedding block 1119, and a hardness of the flexible embedding block 1119 may be smaller than that of the housing 111. The housing 111 may be made of plastic. A material of the flexible embedding block 1119 may be a silicone rubber, a rubber, etc., and the flexible embedding block 1119 may be formed on the inner side of the at least one clamping region and/or the at least one clamping region by injection molding. Furthermore, the flexible embedding block 1119 may at least partially cover the region corresponding to the end FE of the housing 111, that is, the flexible embedding block 1119 may cover the inner side of the at least one clamping region and/or the at least one clamping region, so that the sound production component 11 may at least partially abut against the cavum conchae 102 through the flexible embedding block 1119 when it abuts against the cavum conchae 102. In other words, the part of the housing 111 that extends into the cavum conchae 102 and contacts with the cavum conchae 102 may be covered by the flexible embedding block 1119. In this way, when the sound production component 11 abuts against the cavum conchae 102, for example, when the sound production component 11 and the suspension structure 12 are configured to jointly clamp an ear region corresponding to the cavum conchae 102 on the front and rear sides of the ear 100, the flexible embedding block 1119 may play a buffering role between the housing 111 and the ear 100 (e.g., the aforementioned ear region), which helps to relieve the pressure of the earphone 10 on the ear 100, thereby improving the comfort of the earphone 10 in the wearing state.

In some embodiments, the flexible embedding block 1119 may continuously cover at least a portion of the housing 111 corresponding to the rear side RS, the upper side US, and the lower side LS along the thickness direction X. For example, a region of the housing 111 corresponding to the rear side RS may be covered by the flexible embedding block 1119 more than 90%, and regions of the housing 111 corresponding to the upper side US and the lower side LS may be covered by the flexible embedding block 1119 by about 30%. This configuration balances the comfort of the earphone 10 in the wearing state with the need to arrange structural components such as the transducer inside the housing 111.

In some embodiments, when observed along the thickness direction X, the flexible embedding block 1119 may be U-shaped.

In some embodiments, a portion of the flexible embedding block 1119 corresponding to the lower side LS may abut against an antitragus. A thickness of the portion of the flexible embedding block 1119 corresponding to the rear side RS may be smaller than a thickness of the portions of the flexible embedding block 1119 corresponding to the upper side US and the lower side LS, so that good comfort can be obtained even when the sound production component 11 abuts against an uneven position in the cavum conchae 102 when the sound production component 11 abuts against the cavum conchae 102.

In some embodiments, the housing 111 may include an inner housing 1111 and an outer housing 1112 that are engaged with each other along the thickness direction X. The inner housing 1111 is closer to the ear 100 than the outer housing 1112 in the wearing state. A sound outlet 111*a*, a first pressure relief hole 111*c*, and a second pressure relief hole 111*d* may be provided on the inner housing 1111. A diaphragm of a transducer is oriented toward the inner housing 1111 to form a first acoustic chamber between the transducer and the inner housing 1111. A dividing surface 111*b* between the outer housing 1112 and the inner housing 1111 tilts toward a side where the inner housing 1111 is located in a direction close to the end FE, so that the flexible embedding block 1119 may be set in the region of the outer housing 1112 corresponding to the end FE as much as possible. For example, the flexible embedding block 1119 may be entirely set in the region of the outer housing 1112 corresponding to the end FE, which simplifies the structure of the sound production component 11 and reduce manufacturing costs.

In some embodiments, a wrapping layer may be further provided outside the housing 111, and a Shore hardness of the wrapping layer needs to be within a certain range. If the Shore hardness of the wrapping layer is too high, it may lead to a deterioration in comfort in the wearing state, and when a flexible cover layer 1121 may integrally cover at least part of the outer surface of the flexible embedding block 1119, the flexible embedding block 1119 may not perform its intended function (e.g., relieving the pressure of the earphone 10 on the ear 100 and improving the comfort of the earphone 10 in the wearing state). If the Shore hardness of the wrapping layer is too small, it may lead to the complete fit of the side wall of the sound production component 11 with the cavum conchae 102 structure, thus completely sealing the internal environment from the external environment, which may not create the cavity-like structure to reduce the sound leakage effect in the far field, and also make it difficult to shape the wrapping layer during the assembly process. In some embodiments, to improve the sound leakage reduction effect, the Shore hardness of the wrapping layer may be in a range of 10 HA to 80 HA. In some embodiments, to improve the comfort of the sound production component 11 in the wearing state, the Shore hardness of the wrapping layer may be in a range of 15 HA to 70 HA. In some embodiments, to generate the cavity-like structure between the sound production component 11 and the cavum conchae 102, the Shore hardness of the wrapping layer may be in a range of 25 HA to 55 HA. In some embodiments, to better shape the wrapping layer during assembly, the Shore hardness of the wrapping layer may be in a range of 30 HA to 50 HA.

The wrapping layer may be the flexible cover layer 1121, and a hardness of the flexible cover layer 1121 is smaller than that of the housing 111. The housing 111 may be made of plastic. A material of the flexible cover layer 1121 may be a silicone rubber, a rubber, etc., and the flexible cover layer 1121 may be formed in a predetermined region of the housing 111 by injection molding, adhesive bonding, etc. Furthermore, the flexible cover layer 1121 may integrally cover at least part of the outer surface of the flexible embedding block 1119 and at least part of the outer surface of the outer housing 1112 that is not covered by the flexible embedding block 1119, which helps to enhance visual consistency of the sound production component 11. Of course, the flexible cover layer 1121 may further cover the outer surface of the inner housing 1111. In this case, the hardness of the flexible embedding block 1119 is smaller than that of the flexible cover layer 1121 to allow the flexible embedding block 1119 to be sufficiently soft. In addition, an area of the outer surface of the flexible embedding block 1119 may be in a range of 126 $mm^2$ to 189 $mm^2$. If the area of the outer surface of the flexible embedding block 1119 is too small, it may lead to a deterioration in comfort in the wearing state; if the area of the outer surface of the flexible embedding block 1119 is too large, it may lead to an excessively large volume of the sound production component 11 and an excessively large area where the flexible embedding block 1119 does not abut against the cavum conchae 102, which is against the original intention of providing the flexible embedding block 1119. In some embodiments, a thickness of the flexible cover layer 1121 may be smaller than a thickness of the outer housing 1112.

In some embodiments, the inner housing 1111 may include a bottom wall 1113 and a first side wall 1114 connected to the bottom wall 1113, and the outer housing 1112 may include a top wall 1115 and a second side wall 1116 connected to the top wall 1115. The second side wall 1116 and the first side wall 1114 may be engaged with each other along the dividing surface 111*b* and support each other. When observed along the short axis direction Z, in a reference direction (e.g., an opposite direction of the arrow indicating the long axis direction Y in FIG. 7) where the connection end CE points to the end FE, a portion of the first side wall 1114 close to the end FE gradually approaches the bottom wall 1113 in the thickness direction X, and a portion of the second side wall 1116 close to the end FE gradually moves away from the top wall 1115 in the thickness direction X, so that the dividing surface 111*b* tilts toward a side where the inner housing 1111 is located in the direction close to the end FE. At this time, the flexible embedding block 1119 is at least partially set on an outer side of the second side wall 1116. For example, combining with FIG. 11B, in addition to the flexible embedding block 1119 being set on the outer side of the second side wall 1116, the flexible embedding block 1119 is also partially set on an outer side of the top wall 1115.

In some embodiments, the outer housing 1112 may have at least a portion of an embedding groove located on the second side wall 1116, and the flexible embedding block 1119 may be embedded in the embedding groove, so that the outer surface of the region of the outer housing 1112 that is not covered by the flexible embedding block 1119 may have a continuous transition with the outer surface of the flexible embedding block 1119. The region where the flexible embedding block 1119 is located in FIG. 7 may simply be considered as the embedding groove. This design only helps the flexible embedding block 1119 to accumulate on the outer housing 1112 during injection molding, avoiding the overflow of the flexible embedding block 1119, but also helps to improve the appearance quality of the sound production component 11, avoiding surface irregularities of the sound production component 11.

In some embodiments, the second side wall 1116 may include a first sub-side wall segment 1117 and a second sub-side wall segment 1118 connected to the first sub-side wall segment 1117. The first sub-side wall segment 1117 is closer to the top wall 1115 in the thickness direction X than the second sub-side wall segment 1118, and the second sub-side wall segment 1118 protrudes outward from the housing 111 relative to the first sub-side wall segment 1117. In short, the second side wall 1116 may have a stepped structure. The stepped structure not only enable the flexible embedding block 1119 to be easily accumulated on the outer housing 1112 during injection molding to avoid overflow of the flexible embedding block 1119, but also helps the sound production component 11 to better abut against the cavum conchae 102 through the flexible embedding block 1119, thereby improving the comfort of the earphone 10 in the wearing state.

In some embodiments, as described earlier, the sound production component may have other wearing modes different from extending into the cavum conchae. Taking an earphone 1200 shown in FIG. 12 as an example, a detailed description of the earphone 1200 is provided. It should be noted that, without violating relevant acoustic principles, a structure of the earphone 1200 shown in FIG. 12 and its corresponding parameters may also be applied to the earphone 10 mentioned above, where the sound production component extends into the cavum conchae.

Figure 13:
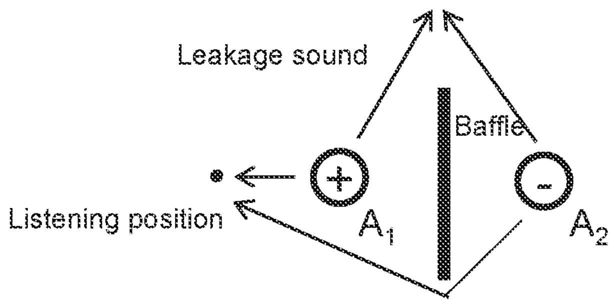
FIG. 13 is a schematic diagram illustrating an exemplary acoustic model formed by an earphone according to some other embodiments of the present disclosure

By placing at least a portion of the sound production component 1201 at the antihelix 105 of the user, the output performance of the earphone 1200 may be improved, i.e., increasing a sound intensity at a listening position in a near field and simultaneously reducing a volume of the leakage sound in the far field. When the user wears the earphone 1200, one or more sound outlets may be set on a side of the housing of the sound production component 1201 that is close to or facing the ear canal of the user, and one or more pressure relief holes may be set on other side walls (e.g., side walls that are away from or depart from the ear canal of the user) of the sound production component 1201. The sound emitted from the one or more sound outlets is acoustically coupled to a front chamber of the earphone 1200, and the sound emitted from the one or more pressure relief holes is acoustically coupled to a rear chamber of the earphone 1200. Taking the sound production component 1201 comprising one sound outlet and one pressure relief hole as an example, the sound emitted from the sound outlet and the sound emitted from the pressure relief hole may be approximately regarded as two sound sources, and sounds emitted from the two sound sources have equal sound levels but with opposite phases. The sound emitted from the sound outlet may be directly transmitted to the ear canal of the user without obstruction, while the sound emitted from the pressure relief hole needs to bypass the housing of the sound production component 1201 or pass through the sound production component 1201 to form an acoustic model similar to that shown in FIG. 13. As shown in FIG. 13, when there is a baffle between point source A1 and point source A2, in the near field, a sound field of the point source A2 needs to bypass the baffle to interfere with the sound wave of the point source A1 at the listening position, which is equivalent to increasing a sound path from the point source A2 to the listening position. Therefore, assuming that the point source A1 and the point source A2 have a same amplitude, compared to a case without the baffle, an amplitude difference of the sound wave at the listening position between the point source A1 and the point source A2 increases, thereby reducing the degree of cancellation of the two sounds at the listening position and increasing the sound volume at the listening position in the near field. In the far field, due to the interference of the sound waves generated by the point source A1 and the point source A2, the sound waves propagate over a larger spatial range without having to bypass the baffle (similar to the case without the baffle), so the volume of the leakage sound in the far field does not significantly increase compared to the case without the baffle. Therefore, setting a baffle structure around one of the sound sources A1 and A2 can significantly increase the sound volume at the listening position in the near field without significantly increasing the volume of the leakage sound in the far field.

Figure 14:
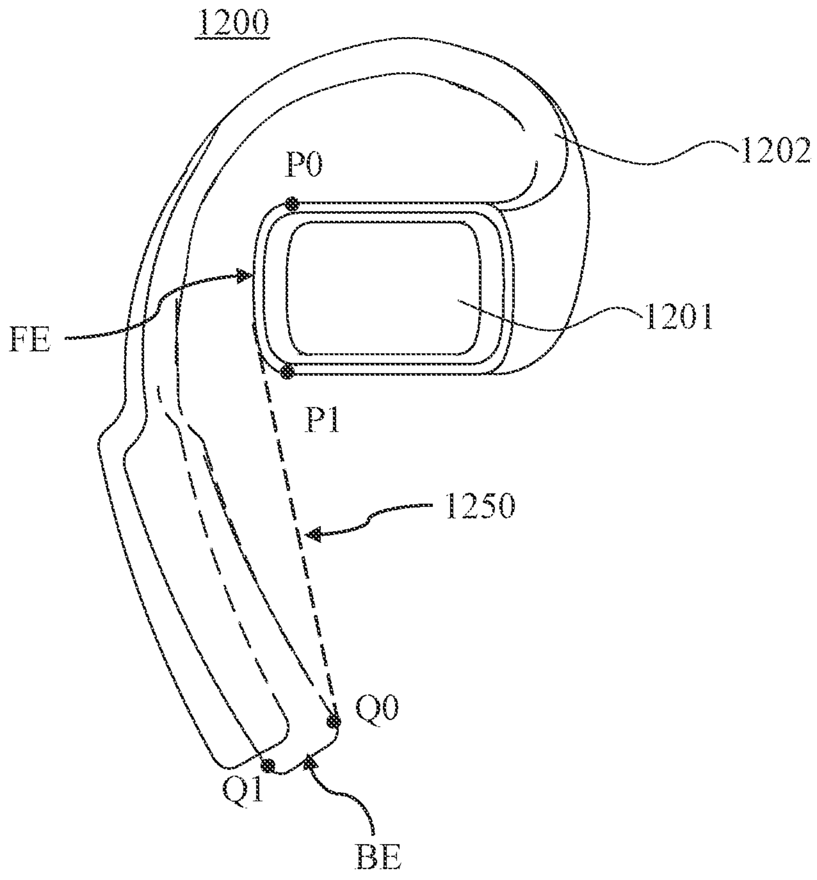
FIG. 14 is a schematic diagram illustrating an exemplary morphological difference of an earphone in a wearing state and a non-wearing state according to some embodiments of the present disclosure.

As shown in FIG. 14, the ear hook 1202 and the sound production component 1201 form a fifth projection in the first plane, which includes an outer contour, a first end contour, an inner contour, and a second end contour. Similar to the structure of the earphone 10 in FIG. 3, the first end contour in the fifth projection may be a projection contour of an end FE of the sound production component 1201 on the first plane, and two end points P0 and P1 of the first end contour are the projection points of an intersection between the end FE and the other portion of the sound production component 1201 on the first plane. The second end contour may be a projection contour of a free end BE of a suspension structure 1202 on the first plane, and two end points Q0 and Q1 of the second end contour may be projection points of an intersection between the free end BE and the other portion of the suspension structure 12 on the first plane. The outer contour may be a contour located between the point P1 and point Q1 in the fifth projection. The inner contour may be a contour located between point P0 and point Q0 in the fifth projection. The division of the end FE and the free end BE may refer to the relevant description (e.g., the description in FIG. 3 and FIG. 5A) of earphone 10 in the present disclosure.

Taking the projection of the sound production component 1201 on the first plane as a rectangular shape (e.g., a runway shape) as an example, there are an upper wall projection and a lower wall projection that are parallel or approximately parallel in the projection of the sound production component 1201, as well as a first end contour connecting the upper wall projection and the lower wall projection. The first end contour may be a straight line segment or an arc, and the points P0 and P1 represent two ends of the first end contour. Merely by way of example, the point P0 may be an intersection point of the arc formed by the projection of the free end of the sound production component 1201 and the line segment of the upper wall projection, and similar to the point P0, the point P1 may be an intersection point of the arc formed by the projection of the free end of the sound production component 1201 and the line segment of the lower wall projection. Similarly, at one end of the ear hook 1202 away from the sound production component 1201, there is also a free end, and the projection of the free end of the ear hook 1202 on the first plane forms a second end contour, which may be a straight line segment or an arc, and the points Q0 and Q1 represent two ends of the second end contour. In some embodiments, the points Q0 and Q1 may be two end points of a line segment or arc formed by the projection of the free end of the first portion of the ear hook 1202 on the first plane 60 in a direction away from the second portion of the ear hook. Furthermore, in the long axis direction Y of the sound production component 11, an end point close to the sound production component 11 is the point Q0, and an end point away from the sound production component 11 is the point Q1.

As shown in FIG. 14, shapes of the projection of the earphone 1200 on the first plane and the sagittal plane of the human body reflect the wearing mode of the earphone 1200 on the ear. For example, the area of the first projection may reflect the area of the auricle covered by the earphone 1200 in the wearing state, as well as a contact mode of the sound production component 1201 and the ear hook 1202 with the ear. In some embodiments, since the sound production component 1201 does not contact with the first portion of the ear hook 1202, the inner contour, the outer contour, the first end contour, and the second end contour in the fifth projection form a non-closed region. A size of the non-closed region is closely related to a wearing effect (e.g., the stability of wearing, the sound production position, etc.) of the earphone 1200. For the purpose of explanation, in some embodiments, a tangent segment 1250 connecting the first end contour and the second end contour may be determined, and an area enclosed by a fifth closed curve jointly defined by the tangent segment 1250, the outer contour, the first end contour, and the second end contour is determined as an area (also referred to as a fifth area) of the fifth projection.

In some embodiments, differences between the earphone 1200 and the earphone 10 shown in FIG. 5A include that the sound production component 1201 of the earphone 1200 is located at the antihelix 105 of the user in the wearing state, so a range of the fifth area is smaller than that of the first area. In some embodiments, the fifth area may be 0.2 times to 0.6 times of the first area. In some embodiments, the fifth area may be 0.3 times to 0.5 times of the first area. In some embodiments, the range of the fifth area defined by the fifth closed curve may be in a range of 250 $mm^2$ to 1000 $mm^2$. To ensure the sound production efficiency of the sound production component 1201 and a moderate clamping force and to avoid the foreign body sensation generated when wearing the earphone 1200, the fifth area defined by the fifth closed curve is in a range of 400 $mm^2$ to 800 $mm^2$.

FIG. 14 is a schematic diagram illustrating an exemplary morphological difference of the earphone in a wearing state and a non-wearing state according to some embodiments of the present disclosure. A dashed line region represents the first portion of the ear hook in the wearing state, which is further away from the free end of the sound production component than the first portion of the ear hook in the non-wearing state. In the wearing state, the ear hook 1202 and the sound production component 1201 form a sixth projection on the sagittal plane of the human body. Similar to the fifth projection shown in the figure, the sixth projection also includes an outer contour, a first end contour, an inner contour, and a second end contour. The outer contour, the first end contour, the second end contour, and the tangent segment 1250 connecting the first end contour and the second end contour of the sixth projection jointly define a sixth closed curve. As mentioned above, the definition of the inner and outer contours, the first end contour, the second end contour, and the tangent segment 1250 in the sixth projection may be similar to those in the fifth projection, and are not repeated here. An area enclosed by the sixth closed curve in the sixth projection is regarded as an area (also referred to as a sixth area) of the sixth projection.

Based on the reasons similar to those of the fifth area, an appropriate sixth area may ensure the listening volume of the earphone 1200 at the listening position (e.g., at the antihelix) and at the same time maintain a good effect of sound leakage cancelling effect in the far field. In some embodiments, the sixth area is in a range of 400 $mm^2$ to 1100 $mm^2$. In some embodiments, considering the elasticity of the ear hook 1202, the sixth area is in a range of 500 $mm^2$ to 900 $mm^2$.

In some embodiments, the sound production component 1201 may include a transducer and a housing accommodating the transducer, and at least a portion of the housing may be located at the antihelix 105 of the user. The housing includes at least one clamping region that contacts the antihelix 105 of the user. Since the distance of the sound production component 1201 in the thickness direction X relative to the ear hook plane is increased after wearing, the sound production component 1201 tends to move close to the ear hook plane, thereby forming clamping in the wearing state. In some embodiments, a positive projection of the ear hook 1202 on a reference plane (e.g., the YZ plane in FIG. 8) perpendicular to the thickness direction X partially overlaps with a positive projection of a middle or front-middle portion of the sound production component 1201 on the reference plane (as shown by the shaded region on the side of the housing facing the antihelix 105 of the user in the figure). Here, the overlap region formed by the positive projection of the ear hook 1202 on the reference plane and the positive projection of the end FE on the reference plane is located on the side facing the antihelix 105 of the user. In this way, the sound production component 1201 and the ear hook 1202 can jointly clamp the ear 100 from the side of the ear 100 away from the head and the side of the ear 100 facing the head, and the clamping force is mainly compressive stress, which is advantageous for improving the stability and comfort of the earphone 1200 in the wearing state. It should be noted that the at least one clamping region mentioned above refers to at least one region clamping the antihelix 105, but due to individual differences in different users, resulting in differences in the shape, size, and other dimensions of the ear 100, in actual wearing state, the at least one clamping region may not necessarily clamp the antihelix 105.

In some embodiments, an included angle between a direction of the clamping force and the sagittal plane of the user needs to be maintained within a certain range. For example, the direction of the clamping force may be perpendicular or substantially perpendicular to the sagittal plane of the user. If the aforementioned included angle deviates too far from 90°, the baffle structure between the sound outlet and the pressure relief hole may not be formed. For example, one side of the housing where the pressure relief hole is located is raised, and the antihelix 105 may not block the pressure relief hole to the other side of the sound outlet. As a result, it may not increase the sound volume at the listening position in the near field, and the end FE or the battery compartment may exert pressure on the ear. It should be noted that the direction of the clamping force may be obtained by applying patches (i.e., force sensors) or patch arrays on a side of the ear facing the head and on a side of the ear away from the head, and reading a distribution of forces at clamped positions of the ear. For example, if there are one point on the side of the ear facing the head and one point on the side of the ear away from the head where force may be measured, the direction of the clamping force may be considered as a direction of a line connecting the two points. In some embodiments, to meet the wearing requirements, the included angle between the direction of the clamping force and the sagittal plane of the user may be in a range of 60° to 120°. In some embodiments, to increase the sound volume at the listening position in the near field, the included angle between the direction of the clamping force and the sagittal plane of the user may be in a range of 80° to 100°. In some embodiments, to further improve the fit of the earphone to the antihelix 105 in the wearing state, the included angle between the direction of the clamping force and the sagittal plane of the user may be in a range of 70° to 90°.

In some embodiments, in the wearing state, the housing and the first portion of the ear hook clamp the ear of the user and provide a clamping force to the ear of the user, which needs to be within a certain range. It should be noted that the clamping force may be measured using a tension meter. For example, the housing of the sound production component 1201 in the non-wearing state is pulled away from the ear hook 1202 according to a wearing mode to a predetermined distance, and a magnitude of the tensile force is equal to the clamping force. The clamping force may also be obtained by fixing patches to the wearer's ear. If the clamping force is too small, it may lead to the inability to form the baffle structure between the sound outlet and the pressure relief hole. For example, the sound production component 1201 is loose, and the antihelix 105 may not block the pressure relief hole to the other side of the sound outlet, which is equivalent to reducing a height of the baffle as shown in FIG. 13. As a result, it does not increase the sound volume at the listening position in the near field, and results in poor wearing stability of the earphone 1200. If the clamping force is too large, it may generate a strong pressure on the ear, thereby resulting in poor adjustability of the earphone 1200 after wearing. In some embodiments, to meet the wearing requirements, in the wearing state, the housing and the first portion of the ear hook clamp the ear of the user and provide a clamping force of 0.03 N to 3 N to the ear of the user. In some embodiments, to increase adjustability after wearing, in the wearing state, the housing and the first portion of the ear hook clamp the ear of the user and provide a clamping force of 0.03 N to 1 N to the ear of the user. In some embodiments, to increase the sound volume at the listening position in the near field, in the wearing state, the housing and the first portion of the ear hook clamp the ear of the user and provide a clamping force of 0.4 N to 0.9 N to the ear of the user.

In some embodiments, a distance between the first portion of the ear hook 1202 and the sound production component 1201 increases in the wearing state compared to the non-wearing state, resulting in the sixth area being greater than the fifth area. In some embodiments, to ensure that the sound production component 1201 may better fit to the antihelix 105 in the wearing state, a difference between the sixth area and the fifth area may be within a certain range. In some embodiments, the difference between the sixth area and the fifth area is in a range of 50 $mm^2$ to 500 $mm^2$. In some embodiments, the difference between the sixth area and the fifth area is in a range of 60 $mm^2$ to 450 $mm^2$. In some embodiments, the difference between the sixth area and the fifth area is in a range of 80 $mm^2$ to 400 $mm^2$. In some embodiments, the difference between the sixth area and the fifth area is in a range of 100 $mm^2$ to 300 $mm^2$.

In some embodiments, in the non-wearing state (corresponding to the fifth projection with the fifth area of the earphone on the first plane), the first portion of the ear hook 1202 does not generate a clamping force that drives the sound production component close to the first portion of the ear hook in the wearing state (corresponding to the sixth projection with the sixth area of the earphone on the sagittal plane of the human body), in order to ensure that the sound production component 1201 of the earphone 1200 may fit to the antihelix 105 or a position near the antihelix 105, while allowing the earphone 1200 to clamp to the ear of the user (i.e., to provide an appropriate clamping force without affecting the wearing stability), the difference between the sixth area and the fifth area may be within an appropriate range. In some embodiments, the larger the difference between the sixth area and the fifth area is, the smaller the clamping force applied to the ear of the user by the earphone 1200 may be; the smaller the difference between the sixth area and the fifth area is, the greater the clamping force applied to the ear of the user by the earphone 1200 may be. In some embodiments, the difference between the sixth area and the fifth area is in a range of 50 $mm^2$ to 500 $mm^2$, and in the wearing state, the clamping force may be in a range of 0.03 N to 1 N. In some embodiments, the difference between the sixth area and the fifth area is in a range of 100 $mm^2$ to 450 $mm^2$, and in the wearing state, the clamping force may be is in a range of 0.04 N to 0.9 N. In some embodiments, the difference between the sixth area and the fifth area is in a range of 150 $mm^2$ to 400 $mm^2$, and in the wearing state, the clamping force may be is in a range of 0.05 N to 0.8 N. In some embodiments, the difference between the sixth area and the fifth area is in a range of 200 $mm^2$ to 350 $mm^2$, and in the wearing state, the clamping force may be is in a range of 0.06 N to 0.7 N. It should be noted that, comparing the structure and wearing mode of the earphone 10 in FIG. 5A and the structure and wearing mode of the earphone 1200 in FIG. 12, the direction of the clamping force in FIG. 5A is approximately parallel to the sagittal plane of the human body. Therefore, the magnitude of the clamping force is greatly influenced by the difference between the second area and the first area. In contrast, in FIG. 12, the direction of the clamping force is approximately perpendicular to the sagittal plane of the user. Therefore, the magnitude of the clamping force is less affected by the difference between the sixth area and the fifth area compared to the situation in FIG. 5A.

Similar to the difference between the sixth area and the fifth area affecting the position of the sound production component 1201 of the earphone 1200 in the ear and the clamping force in the wearing state, a ratio of the fifth area to the sixth area may also affect the position of the sound production component 1201 of the earphone 1200 in the ear and the clamping force in the wearing state. For example, the ratio of the fifth area to the sixth area may be configured such that the sound production component 1201 is positioned at the antihelix 105 or a position near the antihelix 105 to provide an appropriate clamping force without compromising wear stability. The smaller the ratio of the fifth area to the sixth area is, the smaller the tendency (e.g., the smaller the clamping coefficient) of the earphone to return to a natural state (e.g., a shape in the non-wearing state) may be, i.e., the smaller the clamping force applied to the ear of the user by the earphone may be. The larger the ratio of the fifth area to the sixth area is, to some extent, the greater the tendency (e.g., the larger the clamping coefficient) of the earphone to return to the natural state (e.g., the shape in the non-wearing state) may be, i.e., the greater the clamping force applied to the ear of the user by the earphone may be. An excessively large ratio of the fifth area to the sixth area may generate an excessively small clamping force applied to the ear of the user, leading to instability in wearing. On the other hand, an excessively small ratio of the fifth area to the sixth area may result in poor elasticity of the ear hook section and inconvenience for the user to wear, as well as the foreign body sensation in the ear after wearing. Therefore, in some embodiments, to ensure that the ear hook 1202 has an appropriate elasticity, the ratio of the fifth area to the sixth area is in a range of 0.6 to 0.98. In some embodiments, as the sound production component 1201 does not need to clamp the auricle like the earphone 10 shown in FIG. 5A, the ratio of the fifth area to the sixth area is in a range of 0.75 to 0.95.

In some embodiments, the ratio of the fifth area to the sixth area is in the range of 0.75 to 0.95, and the clamping force in the wearing state may be in a range of 0.03 N to 1 N. In some embodiments, the ratio of the fifth area to the sixth area is in a range of 0.8 to 0.9, and the clamping force in the wearing state may be in a range of 0.04 N to 0.95 N. It should be noted that, similarly, in FIG. 5A, where the direction of the clamping force is approximately parallel to the sagittal plane of the human body, the clamping force is influenced to a greater extent by the ratio of the first area to the second area; whereas in FIG. 12, where the direction of the clamping force is approximately perpendicular to the sagittal plane of the user, the magnitude of the clamping force is influenced to a lesser extent by the ratio of the fifth area to the sixth area compared to the situation in FIG. 5A.

In some embodiments, to ensure that when the user wears earphone 1200, the sound production component 1201 is placed at a position near the antihelix while reducing the load on the user when wearing, in some embodiments, when the earphone 1200 is in the non-wearing state, a ratio of a projected area of the sound production component 1201 on the sagittal plane of the human body to the fifth area is in a range of 0.3 to 0.85. In some embodiments, the ratio of the projected area of the sound production component 1201 on the sagittal plane of the human body to the fifth area is in a range of 0.4 to 0.75. For similar reasons to the fifth area, an appropriate ratio of the projected area of the sound production component 1201 on the sagittal plane of the human body to the sixth area may reduce the load on the user when wearing. In some embodiments, when the earphone 1200 is in the wearing state, the ratio of the projected area of the sound production component 1201 on the sagittal plane of the human body to the sixth area is in a range of 0.25 to 0.9. In some embodiments, the ratio of the projected area of the sound production component 1201 on the sagittal plane of the human body to the sixth area is in a range of 0.35 to 0.75.

Taking into account the differences in the shape and size of ears of different users, designing relative sizes of the fifth area and the sixth area with respect to the projected area of the ear on the sagittal plane of the human body can effectively improve the wearing effect of the earphone 1200. In some embodiments, when the earphone 1200 is in the non-wearing state, a ratio of the fifth area to the projected area of the ear on the sagittal plane of the human body is in a range of 0.25 to 0.5; when the earphone 1200 is in the wearing state, a ratio of the sixth area to the projected area of the ear on the sagittal plane of the human body is in a range of 0.3 to 0.5. By maintaining the ratios of the fifth and sixth areas to the projected area of the ear on the sagittal plane of the human body to be within the above ranges, the earphone can have better sound production efficiency and wearing comfort. It is to be noted that the ratios are determined based on a range of an average of the projected area of the ear on the sagittal plane of the human body as a reference, which is in a range of 1300 $mm^2$ to 1700 $mm^2$. For some users, the projected area of their ears on the sagittal plane of the human body may be smaller than 1300 $mm^2$ or larger than 1700 $mm^2$. In such cases, the ratios of the fifth area or the sixth area to the projected area of the ear on the sagittal plane of the human body may be greater than 1.1 or smaller than 0.8, for example, the ratio of the fifth area to the projected area of the ear on the sagittal plane of the human body is in a range of 0.2 to 0.65; and the ratio of the sixth area to the projected area of the ear on the sagittal plane of the human body is in a range of 0.2 to 0.65.

Figure 15:
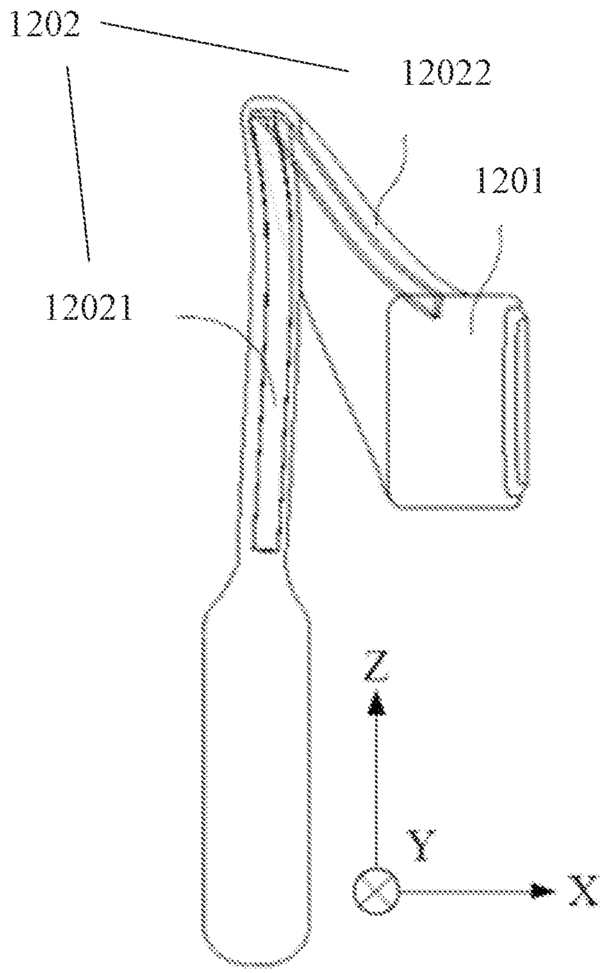
FIG. 15 is a schematic diagram illustrating an exemplary perspective view of some components of an earphone according to some embodiments of the present disclosure.

FIG. 15 is a schematic diagram illustrating an exemplary perspective view of some components of an earphone according to some embodiments of the present disclosure.

In some embodiments, the ear hook of the earphone may be composed of a metal wire and a wrapping layer, where the metal wire provides support and clamping, and the wrapping layer may wrap around an outer side of the metal wire to make the ear hook softer and provide better fit with the auricle, thereby enhancing user comfort.

Figure 12:
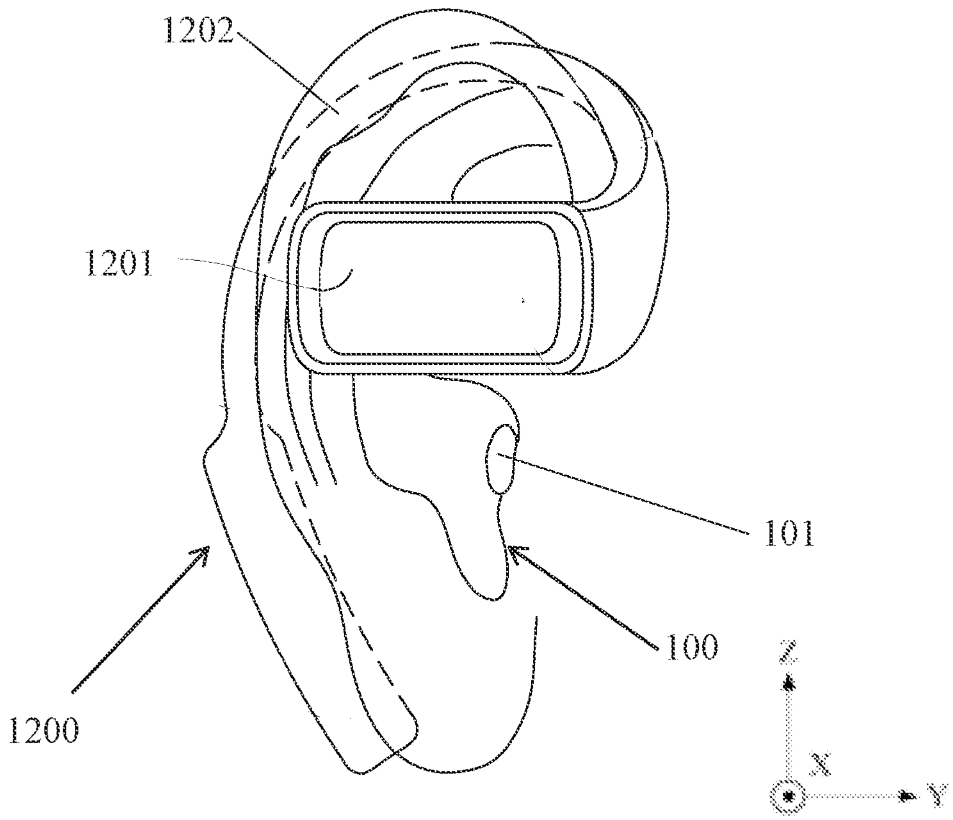
FIG. 12 is a schematic diagram illustrating an exemplary wearing of an earphone according to some other embodiments of the present disclosure.

Hereinafter, the earphone 1200 as shown in FIG. 12 is used as an example for detailed description. It should be noted that without departing from corresponding acoustic principles, the structure of earphone 1200 in FIG. 12 and corresponding parameters may also be similarly applied to other configurations of the earphone mentioned previously in the present disclosure.

In some embodiments, the ear hook 1202 of the earphone 1200 may be composed of a metal wire 12021 and a wrapping layer 12022. The metal wire 12021 may include materials such as a spring steel, a titanium alloy, a titanium-nickel alloy, a chromium-molybdenum steel, an aluminum alloy, a copper alloy, or combinations thereof. In some embodiments, parameters such as a count, a shape, a length, a thickness, a diameter, etc., of the metal wire 12021 may be set according to actual needs (e.g., requirements for diameters and strengths of earphone components). A shape of the metal wire 12021 may include any suitable shape, for example, a cylinder, a cube, a rectangular prism, a hexahedron, an elliptical cylinder, etc.

Figure 16:
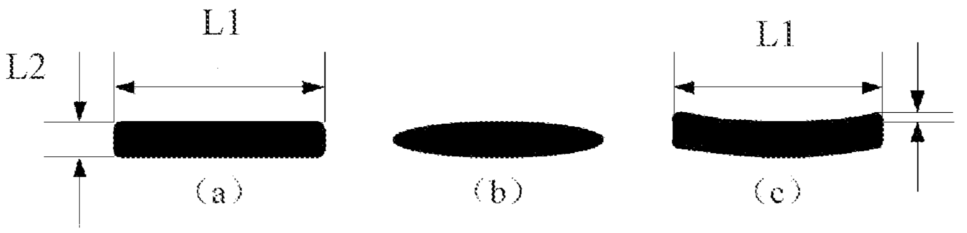
FIG. 16 is a schematic diagram illustrating an exemplary cross-sectional view of a metal wire according to some embodiments of the present disclosure.

FIG. 16 is a schematic diagram illustrating an exemplary cross-sectional view of a metal wire according to some embodiments of the present disclosure. As shown in FIG. 16, the metal wire 12021 may have a flat structure, allowing it to have different deformation capabilities in various directions. In some embodiments, a cross-sectional shape of the metal wire 12021 may be a square, a rectangle, a triangle, a polygon, a circle, an ellipse, an irregular shape, etc. As shown in FIG. 16(*a*), the cross-sectional shape of the metal wire 12021 may be a rounded rectangle. As shown in FIG. 16(*b*), the cross-sectional shape of the metal wire 12021 may be an ellipse. In some embodiments, a length of a long side (or a long axis, L1) and/or a length of a short side (or a short axis, L2) of the metal wire 12021 may be set according to actual needs (e.g., a diameter of an earphone component where the metal wire 12021 is located). In some embodiments, a ratio of the long side to the short side of the metal wire 12021 may be in a range of 1.1:1 to 2:1. In some embodiments, the ratio of the long side to the short side of the metal wire 12021 may be 1.5:1.

In some embodiments, the metal wire 12021 may be shaped into a specific shape through processes such as stamping and pre-bending. Merely by way of example, an initial state (i.e., before processing) of the metal wire 12021 in the ear hook 1202 of the earphone may be in a coiled shape, and the metal wire 12021 may be straightened and then shaped into an arc shape (as shown in FIG. 16(*c*)) in a short axis direction through a stamping process. This allows the metal wire 12021 to store a certain internal stress and maintain a straight shape, becoming a "memory metal wire."

When subjected to a relatively small external force, the metal wire 12021 may revert to the coiled shape, effectively conforming the ear hook 1202 to wrap around the ear of the user. In some embodiments, a ratio of an arc height (L3 as shown in FIG. 16) of the metal wire 12021 to the long side of the metal wire 12021 may be in a range of 0.1 to 0.4. In some embodiments, the ratio of the arc height of the metal wire 12021 to the long side of the metal wire 12021 may be in a range of 0.1 to 0.35. In some embodiments, the ratio of the arc height of the metal wire 12021 to the long side of the metal wire 12021 may be in a range of 0.15 to 0.3. In some embodiments, the ratio of the arc height of the metal wire 12021 to the long side of the metal wire 12021 may be in a range of 0.2 to 0.35. In some embodiments, the ratio of the arc height of the metal wire 12021 to the long side of the metal wire 12021 may be in a range of 0.25 to 0.4. By configuring the metal wire 12021 in this manner, the strength of the earphone component (e.g., the ear hook 1202) along its length direction can be enhanced, thereby improving the effectiveness of the earphone in clamping onto the ear of the user. Furthermore, after processing, the metal wire 12021 may be bent in the length direction of the ear hook, to obtain strong elasticity, further enhancing the effectiveness in securing and applying pressure to the ear 100 of the user or head.

In some embodiments, an elastic modulus of the metal wire 12021 may be determined according to GB/T 24191-2009/ISO 12076:2002. In some embodiments, the elastic modulus of the metal wire 12021 needs to be kept within a certain range. When the shape and dimension of the earphone 1200 are consistent, if the aforementioned elastic modulus is too large, it may make the ear hook 1202 difficult to deform, making it challenging for the user to adjust a wearing angle, etc., of the ear hook 1202. When the shape and dimension of the earphone 1200 are consistent, if the aforementioned elastic modulus is too small, it may make the ear hook 1202 too easy to deform, resulting in ineffective clamping on the two sides of the ear 100 after wearing. In some embodiments, to ensure that the ear hook 12 may effectively clamp on the two sides of the ear of the user after wearing, the elastic modulus of the metal wire 12021 may be in a range of 20 GPa to 50 GPa. In some embodiments, to make the ear hook 12 easy to adjust, the elastic modulus of the metal wire 12021 may be in a range of 25 GPa to 43 GPa. In some embodiments, the elastic modulus of the metal wire 12021 may also be in a range of 30 GPa to 40 GPa.

In some embodiments, a diameter of the metal wire 12021 needs to be maintained within a certain range. It should be noted that when the cross-sectional shape of the metal wire 12021 is a circle, the diameter of the metal wire 12021 may be equal to a diameter of the circular cross-section of the metal wire 12021. When the cross-sectional shape of the metal wire 12021 is an ellipse, the diameter of the metal wire may be equal to a length of a long axis of the elliptical cross-section of the metal wire 12021. When the cross-sectional shape of the metal wire 12021 is a square, a rectangle, a triangle, a polygon, an irregular shape, etc., the diameter of the metal wire 12021 may be defined as a length of a longest line segment in the cross-section of the metal wire 12021 that connects two end points on the cross-section of the metal wire 12021 and passes through a center of the cross-section of the metal wire 12021.

In some embodiments, the diameter of the metal wire 12021 needs to be maintained within a certain range. When the material of the metal wire 12021 and the shape and dimension of the earphone 1200 are consistent, if the aforementioned diameter is too large, it may lead to the ear hook 1202 being too heavy, causing discomfort and pressure on the ear 100 of the user. It may also result in the ear hook 1202 having an excessive strength and difficult for the user to adjust the wearing angle. Conversely, if the diameter is too small, it may result in the ear hook 1202 having insufficient strength and clamping force, making it ineffective in clamping on the two sides of the ear 100 after wearing. In some embodiments, to ensure that the ear hook 1202 does not cause discomfort to the ear 100 after wearing and is easy to adjust for the wearing angle, the diameter of the metal wire 12021 may be in a range of 0.5 mm to 1 mm. In some embodiments, to increase the strength of the ear hook 1202, the diameter of the metal wire 12021 may be in a range of 0.6 mm to 1 mm. In some embodiments, to ensure that the ear hook 1202 effectively clamps on the two sides of the ear 100 after wearing, the diameter of the metal wire 12021 may be in a range of 0.7 mm to 0.9 mm.

In some embodiments, a density of the metal wire 12021 needs to be maintained within a certain range. If the density is too large, it may result in the ear hook 1202 being too heavy and causing discomfort and pressure on the ear 100. If the density is too small, it may result in the ear hook 1202 having insufficient strength, making it prone to damage and reducing its lifespan. In some embodiments, to ensure that the ear hook 1202 does not cause discomfort to the ear 100 after wearing, the density of the metal wire 12021 may be in a range of 5 $g/cm^3$ to 7 $g/cm^3$. In some embodiments, to increase the strength of the ear hook 1202, the density of the metal wire 12021 may be in a range of 5.5 $g/cm^3$ to 6.8 $g/cm^3$. In some embodiments, the density of the metal wire 12021 may be in a range of 5.8 $g/cm^3$ to 6.5 $g/cm^3$.

In some embodiments, the wrapping layer 12022 may include a material with a relatively soft texture, a material with a relatively hard texture, or a combination thereof. The material with the relatively soft texture refers to a material with a hardness (e.g., Shore hardness) smaller than a first hardness threshold (e.g., 15A, 20 A, 30 A, 35 A, 40 A, etc.). For example, the Shore hardness of the material with the relatively soft texture may be in a range of 45 A-85 A or 30 D-60 D. The material with the relatively hard texture refers to a material with a hardness (e.g., Shore hardness) greater than a second hardness threshold (e.g., 65 D, 70 D, 75 D, 80 D, etc.). The material with the relatively soft texture may include a Polyurethane (PU) (e.g., Thermoplastic polyurethane elastomer (TPU)), a Polycarbonate (PC), a Polyamide (PA), an Acrylonitrile Butadiene Styrene (ABS), a Polystyrene (PS), a High Impact Polystyrene (HIPS), a Polypropylene (PP), a Polyethylene Terephthalate (PET), a Polyvinyl Chloride (PVC), a Polyurethanes (PU), a Polyethylene (PE), a Phenol Formaldehyde (PF), an Urea-Formaldehyde (UF), a Melamine-Formaldehyde (MF), a silicone, or a combination thereof. The material with the relatively hard texture may include a Poly(estersulfones) (PES), a Polyvinylidenechloride (PVDC), a PolymethylMethacrylate (PMMA), a Poly-ether-ether-ketone (PEEK), or a combination thereof, possibly mixed with a reinforcing agent such as glass fibers, carbon fibers, etc. In some embodiments, the choice of wrapping layer 12022 may be based on specific requirements. For example, the metal wire 12021 may be directly coated by the material with the relatively soft texture. Alternatively, the metal wire 12021 may first be coated with the material with the relatively hard texture, followed by a coating of the material with the relatively soft texture. Additionally, in the wearing state, the portion of the ear hook 1202 that contacts with the user may be made of the material with the relatively soft texture, while the remaining portion may be made of the material with the relatively hard texture. In some embodiments, different materials may be molded together using processes like two-color injection molding, spray-coating with tactile paint, etc. The spray-coating with tactile paint may include rubber tactile paint, elastic tactile paint, plastic elastic paint, or a combination thereof. In this embodiment, the material with the relatively soft texture can enhance user comfort while the material with the relatively hard texture can improve the strength of the ear hook 1202.

In some embodiments, the Shore hardness of the wrapping layer 12022 needs to be within a certain range. If the Shore hardness is too large, it may result in lower user comfort when wearing the ear hook 1202. In some embodiments, to enhance user comfort when wearing the ear hook 1202, the Shore hardness of the wrapping layer 12022 may be in a range of 10 HA to 80 HA. In some embodiments, the Shore hardness of the wrapping layer 12022 may be in a range of 15 HA to 70 HA. In some embodiments, the Shore hardness of the wrapping layer 12022 may be in a range of 25 HA to 55 HA. In some embodiments, the Shore hardness of the wrapping layer 12022 may be in a range of 30 HA to 50 HA.

The basic concepts have been described above, and it is apparent to those skilled in the art that the foregoing detailed disclosure is intended as an example only and does not constitute a limitation of the present disclosure. Although not expressly stated herein, those skilled in the art may make various modifications, improvements, and amendments to the present disclosure. Such modifications, improvements, and amendments are suggested in the present disclosure, so such modifications, improvements, and amendments remain within the spirit and scope of the exemplary embodiments of the present disclosure.

At the same time, specific terms are employed to describe the embodiments of the present disclosure. Terms such as "an embodiment," "one embodiment," and/or "some embodiments" are intended to refer to one or more features, structures, or characteristics associated with at least one embodiment of the present disclosure. Thus, it should be emphasized and noted that the terms "an embodiment," "one embodiment," or "an alternative embodiment," mentioned at different locations in the present disclosure two or more times, do not necessarily refer to a same embodiment. Additionally, certain features, structures, or characteristics of one or more embodiments of the present disclosure may be appropriately combined.

Furthermore, those skilled in the art may understand that various aspects of the present disclosure may be explained and described through several categories or situations that may be patentable, including any new and useful processes, machines, combinations of products, or substances, or any new and useful improvements to them. Accordingly, the various aspects of the present disclosure may be entirely executed by hardware, entirely by software (including firmware, resident software, microcode, etc.), or may be executed by a combination of hardware and software. The above hardware or software may be referred to as a "data block," "module," "engine," "unit," "component," or "system." Furthermore, the various aspects of the present disclosure may be embodied as computer products residing on one or more computer-readable media, which include computer-readable program code.

Additionally, unless explicitly stated in the claims, the order of processing elements and sequences, the use of numerical or alphabetical characters, or the use of other names in the present disclosure are not intended to limit the order of the processes and methods. While various examples have been discussed in the disclosure as presently considered useful embodiments of the invention, it should be understood that such details are provided for illustrative purposes only. The appended claims are not limited to the disclosed embodiments, but instead, the claims are intended to cover all modifications and equivalent combinations that fall within the scope and spirit of the present disclosure. For example, although system components described above may be implemented through hardware devices, they may also be implemented solely through software solutions, such as installing the described system on existing processing equipment or mobile devices.

Similarly, it should be noted that, for the sake of simplifying the disclosure of the embodiments of the present disclosure to aid in understanding of one or more embodiments, various features are sometimes grouped together in one embodiment, drawing, or description. However, this manner of disclosure is not to be interpreted as requiring more features than are expressly recited in the claims. In fact, the features of various embodiments may be smaller than all of the features of a single disclosed embodiment.

Some embodiments use numbers to describe the number of components, and attributes, and it should be understood that such numbers used in the description of the embodiments are modified in some examples by the modifiers "about", "approximately", or "generally". Unless otherwise stated, "about", "approximately" or "generally" indicates that a variation of ±20% is permitted. Accordingly, in some embodiments, the numerical parameters used in the present disclosure and claims are approximations, which may change depending on the desired characteristics of the individual embodiment. In some embodiments, the numeric parameters should be considered with the specified significant figures and be rounded to a general number of decimal places. Although the numerical domains and parameters configured to confirm the breadth of their ranges in some embodiments of the present disclosure are approximations, in specific embodiments such values are set as precisely as possible within the feasible range.

With respect to each patent, patent application, patent application disclosure, and other material, such as articles, books, manuals, publications, documents, etc., cited in the present disclosure, the entire contents thereof are hereby incorporated herein by reference. Application history documents that are inconsistent with or conflict with the contents of the present disclosure are excluded, as are documents (currently or hereafter appended to the present disclosure) that limit the broadest scope of the claims of the present disclosure. It should be noted that in the event of any inconsistency or conflict between the descriptions, definitions, and/or use of terminology in the materials appended to the present disclosure and those described in the present disclosure, the descriptions, definitions, and/or use of terminology in the present disclosure shall prevail.

In closing, it should be understood that the embodiments described in the present disclosure are intended only to illustrate the principles of the embodiments of the present disclosure. Other deformations may also fall within the scope of the present disclosure. Thus, by way of example and not limitation, alternative configurations of embodiments of the present disclosure may be considered consistent with the teachings of the present disclosure. Accordingly, the embodiments of the present disclosure are not limited to the embodiments expressly presented and described herein.

What is claimed is:

1. An earphone, comprising:

a sound production component, including a transducer and a housing accommodating the transducer; and an ear hook, including a first portion and a second portion, wherein the first portion is hung between an auricle and the head of a user, and the second portion extends toward a side of the auricle away from the head and is connected to the sound production component, the sound production component is worn near an ear canal without blocking an opening of the ear canal;

wherein, in a non-wearing state, the ear hook and the sound production component form a first projection on a first plane; in a wearing state, the ear hook and the sound production component form a second projection on a sagittal plane of a human body; each of the first projection and the second projection includes an outer contour, a first end contour, an inner contour, and a second end contour; the outer contour, the first end contour, the second end contour, and a tangent segment connecting the first end contour and the second end contour of the first projection jointly define a first closed curve; and the outer contour, the first end contour, the second end contour, and a tangent segment connecting the first end contour and the second end contour of the second projection jointly define a second closed curve;

the first closed curve has a first area, and the second closed curve has a second area, the first area being smaller than the second area;

in the wearing state, the housing and the first portion of the ear hook clamp the auricle of the user and provide a clamping force of 0.03 N to 1 N to the auricle of the user.

2. The earphone of claim 1, wherein a difference between the second area and the first area is in a range of 50 $mm^2$ to 700 $mm^2$, or a ratio of the first area to the second area is in a range of 0.75 to 0.95.

3. The earphone of claim 2, wherein the clamping force in the wearing state is in a range of 0.05 N to 0.8 N.

4. The earphone of claim 1, wherein in the non-wearing state, the first area is in a range of 1000 $mm^2$ to 1500 $mm^2$.

5. The earphone of claim 1, wherein in the wearing state, the second area is in a range of 1100 $mm^2$ to 1700 $mm^2$.

6. The earphone of claim 1, wherein a difference between a minimum distance from the sound production component to the first portion in the wearing state and a minimum distance from the sound production component to the first portion in the non-wearing state is not smaller than 1 mm.

7. The earphone of claim 6, wherein in the non-wearing state, the minimum distance from the sound production component to the first portion is not greater than 3 mm.

8. The earphone of claim 6, wherein in the wearing state, the minimum distance from the sound production component to the first portion is not smaller than 2 mm.

9. The earphone of claim 1, wherein in the wearing state, at least a portion of the housing is inserted into a cavum concha of the user, and the at least the portion of the housing inserted into the cavum concha of the user includes at least one clamping region in contact with a side wall of the cavum concha of the user.

10. The earphone of claim 9, wherein in the wearing state, an included angle between a direction of the clamping force and a sagittal plane of the user is in a range of −30° to 30°.

11. The earphone of claim 9, wherein the ear hook includes a clamping pivot point located at a position that has a smallest cross-sectional area on the ear hook, and a clamping coefficient of the ear hook based on the clamping pivot point is in a range of 10 N/m to 30 N/m.

12. The earphone of claim 11, wherein in the wearing state, a distance between a center of the at least one clamping region and the clamping pivot point is in a range of 20 mm to 40 mm.

13. The earphone of claim 11, wherein in the wearing state, a distance between an ear hook clamping point on the first portion and the clamping pivot point is in a range of 25 mm to 45 mm.

14. The earphone of claim 1, wherein one end of the first portion of the ear hook away from the second portion includes a battery compartment, and a difference between a distance from a mass center of the sound production component to a mass center of the battery compartment in the wearing state and a distance from the mass center of the sound production component to the mass center of the battery compartment in the non-wearing state is not smaller than 1 mm.

15. The earphone of claim 14, wherein in the non-wearing state, the distance from the mass center of the sound production component to the mass center of the battery compartment is in a range of 15 mm to 30 mm.

16. The earphone of claim 1, wherein in the non-wearing state, the tangent segment is tangent to the second end contour at a second tangent point, and a distance between the second tangent point and an extremum point of the ear hook in a first direction is in a range of 15 mm to 35 mm.

17. The earphone of claim 1, wherein in the non-wearing state, the tangent segment is tangent to the first end contour at a first tangent point, and a distance between the first tangent point and an extremum point of the ear hook in a first direction is in a range of 35 mm to 55 mm.

18. An earphone, comprising:

a sound production component, including a transducer and a housing accommodating the transducer; and an ear hook, including a first portion and a second portion, wherein the first portion is hung between an auricle and the head of a user, and the second portion extends toward a side of the auricle away from the head and is connected to the sound production component, the sound production component is worn near an ear canal without blocking an opening of the ear canal;

wherein, in a non-wearing state, the ear hook and the sound production component form a fifth projection on a first plane; in a wearing state, the ear hook and the sound production component form a sixth projection on a sagittal plane of a human body; each of the fifth projection and the sixth projection includes an outer contour, a first end contour, an inner contour, and a second end contour; the outer contour, the first end contour, the second end contour, and a tangent segment connecting the first end contour and the second end contour of the fifth projection jointly define a fifth closed curve; and the outer contour, the first end contour, the second end contour, and a tangent segment connecting the first end contour and the second end contour of the sixth projection jointly define a sixth closed curve;

the fifth closed curve has a fifth area, and the sixth closed curve has a sixth area, the fifth area being smaller than the sixth area;

in the wearing state, the housing and the first portion of the ear hook clamp the auricle of the user and provide a clamping force of 0.03 N to 3 N to the auricle of the user.

19. The earphone of claim 18, wherein a difference between the sixth area and the fifth area is in a range of 50 $mm^2$ to 500 $mm^2$, or a ratio of the fifth area to the sixth area is in a range of 0.75 to 0.95.

20. The earphone of claim 18, wherein in the wearing state, at least a portion of the housing is located at an antihelix of the user, and a side of the housing facing the antihelix of the user includes a clamping region in contact with the antihelix of the user.

* * * * *